(12) United States Patent
Kaler et al.

(10) Patent No.: US 6,691,254 B2
(45) Date of Patent: Feb. 10, 2004

(54) METHOD AND APPARATUS FOR ANALYZING PERFORMANCE OF DATA PROCESSING SYSTEM

(75) Inventors: Christopher G. Kaler, Redmond, WA (US); Martyn S. Lovell, Seattle, WA (US); Robert S. Wahbe, Seattle, WA (US); William J. Ferguson, Bellevue, WA (US); Oliver J. Sharp, New York, NY (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 10/216,353

(22) Filed: Aug. 12, 2002

(65) Prior Publication Data

US 2003/0061541 A1 Mar. 27, 2003

Related U.S. Application Data

(63) Continuation of application No. 09/325,469, filed on Jun. 3, 1999, now Pat. No. 6,467,052.

(51) Int. Cl.⁷ .............................................. G06F 11/34
(52) U.S. Cl. ........................... 714/39; 714/46; 717/125; 709/318
(58) Field of Search ............................... 714/39–47, 57; 709/318; 717/124, 125, 127, 128, 130

(56) References Cited

U.S. PATENT DOCUMENTS

| | | | |
|---|---|---|---|
| 5,099,436 A | * 3/1992 | McCown et al. ............. 702/82 |
| 5,682,328 A | * 10/1997 | Roeber et al. ............... 702/187 |
| 5,740,440 A | * 4/1998 | West ........................... 717/125 |
| 5,745,693 A | 4/1998 | Knight et al. .......... 395/200.54 |
| 5,752,159 A | 5/1998 | Faust et al. .................... 455/5.1 |
| 5,768,614 A | 6/1998 | Takagi et al. ................ 395/821 |
| 5,819,094 A | * 10/1998 | Sato et al. .................... 717/131 |
| 6,138,121 A | 10/2000 | Costa et al. .................. 707/100 |
| 6,199,199 B1 | * 3/2001 | Johnston et al. ............. 717/107 |
| 6,219,826 B1 | * 4/2001 | De Pauw et al. ............ 717/116 |
| 6,243,838 B1 | 6/2001 | Liu et al. ....................... 714/57 |
| 6,249,755 B1 | 6/2001 | Yemini et al. ............... 702/183 |
| 6,314,533 B1 | 11/2001 | Novik et al. ................... 714/39 |
| 6,446,136 B1 | * 9/2002 | Pohlmann et al. ........... 709/318 |

* cited by examiner

*Primary Examiner*—Scott Baderman
(74) *Attorney, Agent, or Firm*—Woodcock Washburn LLP

(57) ABSTRACT

A method and apparatus for analyzing the performance of a data processing system, particularly a distributed data processing system, provide a system user with tools for analyzing an application running thereon. Information about the flow and performance of the application can be specified, captured, and analyzed, without modifying it or degrading its performance or data security characteristics, even if it is distributed across multiple machines. The user interface permits the system user to filter the performance information, to set triggers which the performance analyzer is able to reduce and/or combine, to observe multiple time-synchronized displays of performance data either in real time or post mortem, and to play and re-play the operation of an automatically generated application model. The invention is implemented in part by providing suitable Application Program Interfaces (APIs) in the operating system of the data processing system.

23 Claims, 33 Drawing Sheets

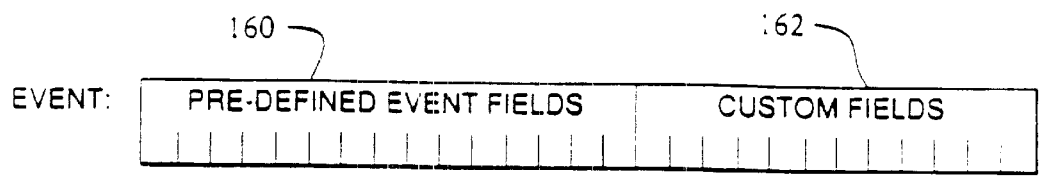
FIG. 4
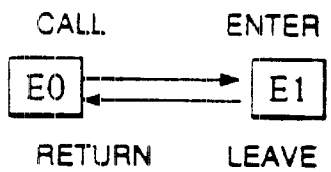
FIG. 5
|  | | SOURCE | | | | | TARGET | | | | | |
|---|---|---|---|---|---|---|---|---|---|---|---|---|
| EVENT: | MACHINE | PROCESS | ENTITY | INSTANCE | HANDLE | MACHINE | PROCESS | ENTITY | INSTANCE | HANDLE | CORRELATION | CAUSALITY |
| CALL | M0 | P0 | E0 | I0 | H0 |  |  |  |  | H1 | CA | UA |
| ENTER |  |  |  |  | H0 | M1 | P1 | E1 | I1 | H1 | CB | UA |
| LEAVE |  |  |  |  | H0 | M1 | P1 | E1 | I1 | H1 | CB | UA |
| RETURN | M0 | P0 | E0 | I0 | H0 |  |  |  |  | H1 | CB | UA |
FIG. 6

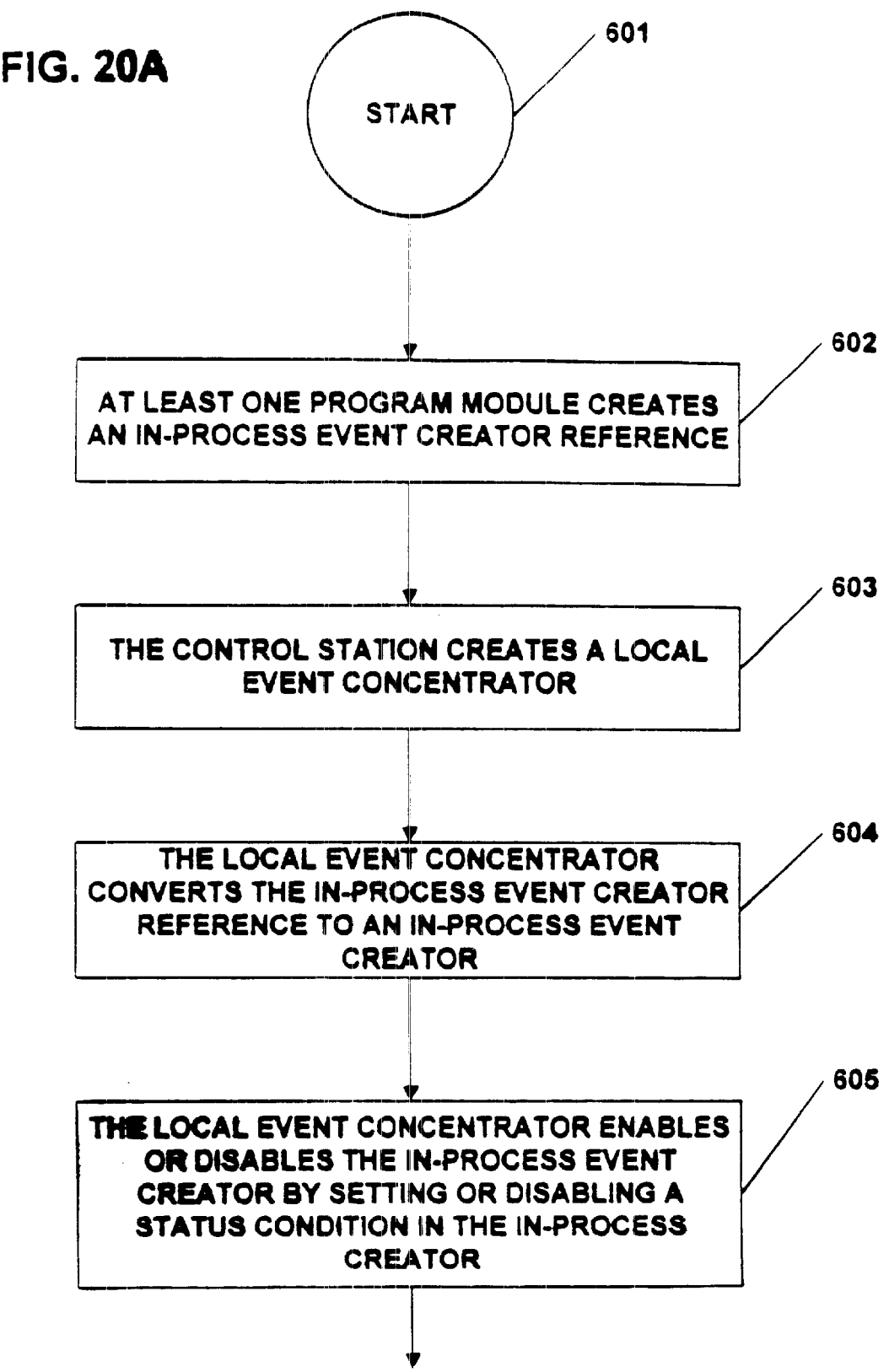

METHOD AND APPARATUS FOR ANALYZING PERFORMANCE OF DATA PROCESSING SYSTEM

CROSS-REFERENCE TO RELATED APPLICATIONS

This application is a continuation of patent application Ser. No. 09/325,469, filed Jun. 3, 1999, now U.S. Pat. No. 6,467,052, the entire disclosure of which is hereby incorporated by reference in its entirety.

TECHNICAL FIELD

This invention relates generally to data processing and, more particularly, to a method and apparatus for analyzing the performance of a data processing system.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the U.S. Patent and Trademark Office patent file or records, but otherwise reserves all copyright rights whatsoever. The following notice applies to the software and data as described below and in the drawings hereto: Copyright © 1997–1999, Microsoft Corporation, All Rights Reserved.

BACKGROUND OF THE INVENTION

In the field of data processing it is a well known problem that software developers usually require a period of time to identify and resolve functional and performance issues in the code they have written or integrated. There can be many reasons for such issues, including the basic system and software architecture; non-optimized and/or flawed coding; the choice of, utilization of, and contention for system resources; timing and synchronization; system loading; and so forth.

Particularly in the area of distributed computer networks, it can be extremely difficult for software developers to observe and isolate undesirable system performance and behavior. A distributed computer network is defined herein to mean, at a minimum, a data processing system that utilizes more than one software application simultaneously or that comprises more than one processor.

For example, a single box or machine which is running two or more processes, such as a data base application and a spreadsheet application simultaneously, fulfills this definition. Also, a single article such as a hand-held computer may comprise more than one microprocessor and thus fulfills the definition.

More commonly, however, distributed computer networks may comprise two or more physical boxes or machines, often hundreds or even millions (in the case of the Internet). A software developer trying to monitor and analyze the operation and behavior of such complex computer networks is faced with a very daunting task.

For example, a developer may be writing or have written a server component that performs credit checks. This software component is used in a larger application that performs order entry processing. There are several other server components in the system (such as inventory verification, order validation, etc.) some of which run on the same server and some which run on a separate server (where the inventory database resides). To complicate matters, each component could reside on a computer system in a different state or country. If the application is not performing or behaving well, the developer needs to figure out if there is a performance or behavioral problem and, if so, be able to determine exactly where the trouble spots are.

In the prior art the developer had to modify his or her application, by writing trace statements in the code and having the application write to a log file what was going on at different places in the network. Then all of the log files would need to be collected, merged, and sorted. The developer would then have to sift through the data in a time-intensive fashion and attempt to determine the performance problem.

There are several serious deficiencies with the prior approach.

One problem is that only instrumented code can be analyzed. That means source code must be modified, recompiled, and re-deployed. This is a serious issue with the widespread use of operating system services and component technology in today's applications. Users are typically unable to recompile operating system and third party components, because they do not have physical or legal access to the source code. When they do have access to the source code, they are still unable to instrument them effectively, because they do not understand the component source code that they do have.

Another problem is that the modifications to code made by developers in an attempt to analyze its performance themselves adversely impact the application's performance. Further, the development of a highly efficient mechanism for recording the application data is non-trivial. Typical implementations involve writing data to disk. Even if the input/output (I/O) is buffered asynchronously, it can have an adverse impact on the application being monitored (e.g. masking actual application I/O).

A further problem is that understanding control flow during transitions is very hard. Typically, in a large distributed application, transitions to separate processes, or to processes running on separate machines, are common, and may happen simultaneously. Since events have to be manually merged by the developer, it is typically hard to determine which suspension in one process corresponds to resumption in another.

An additional problem is that frequently there are a large number of application areas that might need to be analyzed; however, not all of them may need to be analyzed at the same time. Developers who manually instrument their code must incorporate a selection technology to enable different portions to be analyzed. Otherwise, the load of all of the instrumentation has a severe impact on the analysis. This also requires a complex mechanism for developers to specify which information to collect on which machine.

Yet another problem is that for distributed applications, logs from multiple machines (and often multiple logs per machine) must be merged and sorted. Without synchronized clocks, this task is very difficult. As well, if the log files are in different formats (which is likely if they are from different developers or companies), then the data must be translated into common formats.

The result of all the effort described in this section is a very long list of analysis data. Manually analyzing and isolating performance problems from this amount of data is a very complex and difficult task.

One further problem with known performance analysis of data processing systems is that very often such analysis provides opportunities for breaching the data security of such systems.

There exists known performance monitoring software in various forms. Among them is software known as PerfMon software, which is commercially available from Microsoft Corporation. PerfMon software is a utility which, among other things, can provide an indication of the utilization of the computer's central processor unit (CPU) and memory unit. PerfMon software operates by sampling. That is, it tracks continuous data by monitoring a machine and looking at its behavior. It can track the free space on a disk, monitor network usage, and so on, but it cannot gather event-based information, such as what function was most recently started.

There also exist known tools called profilers. These look at a single executing software application and try to understand its performance. They do this either by monitoring the program (in a similar way to PerfMon software), or else they hook into the program they are monitoring and generate "events" each time a program subcomponent (function) commences or completes. Profilers typically have a massive impact on the performance and behavior of an application, because they are intrusive, and they typically require special compiler support. Their data is so detailed that it is normally impractical to use them, particularly in a distributed computing environment such as the one described above.

The Windows NT ® PerfMon utility, commercially available from Microsoft Corporation, provides an extensible architecture for the collection and display of arbitrary application and system counters and metrics. Windows NT provides base counters for the system for the purpose of monitoring CPU and memory utilization. It also provides counters for networks, disks, devices, processes, and so forth. Most system objects export counters. Many applications available from Microsoft Corporation (such as MTS and SQL Server) and other suppliers provide additional counters.

Therefore, there is a substantial need to provide software developers with automated tools for efficiently analyzing the performance, function, and behavior of their applications.

There is also a substantial need to provide such developers with tools for analyzing the performance, function, and behavior of their applications, either while the applications are executing or post mortem, and without significantly affecting the performance or data security characteristics of the applications In addition, there is a substantial need, in a commercial environment, to provide Application Program Interfaces (APIs) to such tools.

SUMMARY OF THE INVENTION

The above-mentioned shortcomings, disadvantages and problems are addressed by the present invention, which will be understood by reading and studying the Detailed Description of the Invention. However, a brief summary of the invention will first be provided.

The present invention includes a number of different aspects for analyzing the performance of a data processing system. For the purposes of describing this invention, the term "performance" is intended to include within its meaning not only the operational performance, but also the function, structure, operation, and behavior of a data processing system.

While the invention has utility in analyzing the performance of a software application that is executing on a distributed data processing system, its utility is not limited to such, and it has utility in analyzing the performance of computer hardware, computer software of all types including data structures, and a wide spectrum of data processing systems comprising both computer hardware and computer software.

Insofar as the overall architecture and operation of the present invention is concerned, each machine where a portion of a distributed software application executes has at least one local event concentrator (LEC). In addition, there is at least one in-process event creator (IEC) and at least one dynamic event creator (DEC) per machine. The function of an IEC is to monitor the executing process for particular situations that occur which the developer wants to be monitored and to create an "event" that can be captured and later analyzed. The function of a DEC is similar to that of an IEC, but it monitors some aspect of the system operation that the developer wants to be monitored on a periodic or time basis and creates an "event" that can also be captured and later analyzed.

The developer can specify by means of a "filter" what to look for in the system under examination. This narrows the scope of the search to what is of interest to the developer and reduces the burden on the performance monitoring system.

When the IEC and DEC create events, they send them to the LEC, which collects them and temporarily stores them, either until the developer requests them or a developer-defined condition or "trigger" occurs, whereupon the LEC sends the events to the developer's control station. The control station analyzes the events and visually displays the results of the analysis to the developer in a multi-windowed, time-synchronized display.

In order to prevent the collection of information from adversely affecting the performance of the system, the IEC and DEC are only active when they are carrying out the developer's orders to monitor certain things. Otherwise they are dormant and do not affect the performance. When an IEC is activated and is monitoring process execution for particular situations, it creates a stream of events during "normal" execution and sends them to the LEC. However, the LEC doesn't send them through the network to the developer's control station until they are needed.

In another aspect of the invention, a data design structure allows two communicating entities to describe their inter-actions and inter-relationships despite knowing almost nothing about each other. The data design structure includes pre-defined event fields and custom fields, and it breaks up the application into a series of black boxes and maps out the entities of the network and their inter-relationships for displaying to the developer an animated model of the application as it is executing, either in real time or "post mortem".

In another aspect, the invention provides for user-defined triggers which cause the performance analysis software to passively buffer events until a malfunction occurs, then dump the buffered data and analyze it. This allows low-impact monitoring, since no information is stored until something of interest happens.

In another aspect, the invention comprises filter reduction features with which the developer can specify exactly what information within the network is of interest. Filter reduction is used to narrow the scope of the filter to extract only the information of interest and hence reduce the performance impact of monitoring.

In another aspect, the invention comprises filter combination features with which different users can specify individual filters that can be combined. The LEC can be multi-threaded and combine filters submitted by multiple users.

In another aspect, the invention comprises a filter user interface which is a graphical representation of the machines, entities, and events making up the network. The user can easily pick those of interest, using displayed lists and Boolean operator tabs, or can simply write an order in text format which is converted to the appropriate filter.

In another aspect, the invention comprises APIs for registration, in-process event creators, dynamic event creators, and other functions implementing the various aspects of the invention.

In another aspect, the invention provides for the automatic generation of an animated application model of the process under examination. A dynamic diagram of the application is automatically displayed as the various constituents interact. A video cassette recorder (VCR) paradigm is used to "play, replay, stop, pause, change speed, and reverse" the display, to enable the user to see what's happening as the application executes.

In another aspect, the invention provides for automatic, synchronized display of all performance analysis data. A number of user-customized, synchronized display windows show the constituent parts of the application execution and the corresponding performance characteristics, in both Gantt chart and graphical modes, either in real-time or post-mortem. A timeline window displays a visual representation of the timing of all related events. A summary window displays a distillation of the system performance during a user-selected time slice.

In another aspect, the invention provides suitable data security mechanisms throughout the network being monitored. Discretionary access is applied to the collection of data from a specific machine.

The present invention describes systems, clients, servers, methods, and computer-readable media of varying scope. In addition to the aspects and advantages of the present invention described in this summary, further aspects and advantages of the invention will become apparent by reference to the drawings and by reading the Detailed Description that follows.

BRIEF DESCRIPTION OF THE DRAWINGS

The invention is pointed out with particularity in the appended claims. However, other features of the invention will become more apparent and the invention will be best understood by referring to the following Detailed Description in conjunction with the accompanying drawings in which:

FIG. 4 illustrates in schematic fashion pre-defined event fields and custom fields, which are included in an event packet within an exemplary embodiment of the invention;

FIG. 5 illustrates a transition between two entities within the hardware and operating environment;

FIG. 6 is a table which illustrates how pre-defined event fields are used to establish a relationship between a source and a target entity;

FIGS. 20A–C is a flowchart of a method illustrating an exemplary embodiment of overall data collection architecture and how data is collected via the IECs, DECs, and LECs;

DETAILED DESCRIPTION OF THE INVENTION

Figure 1:
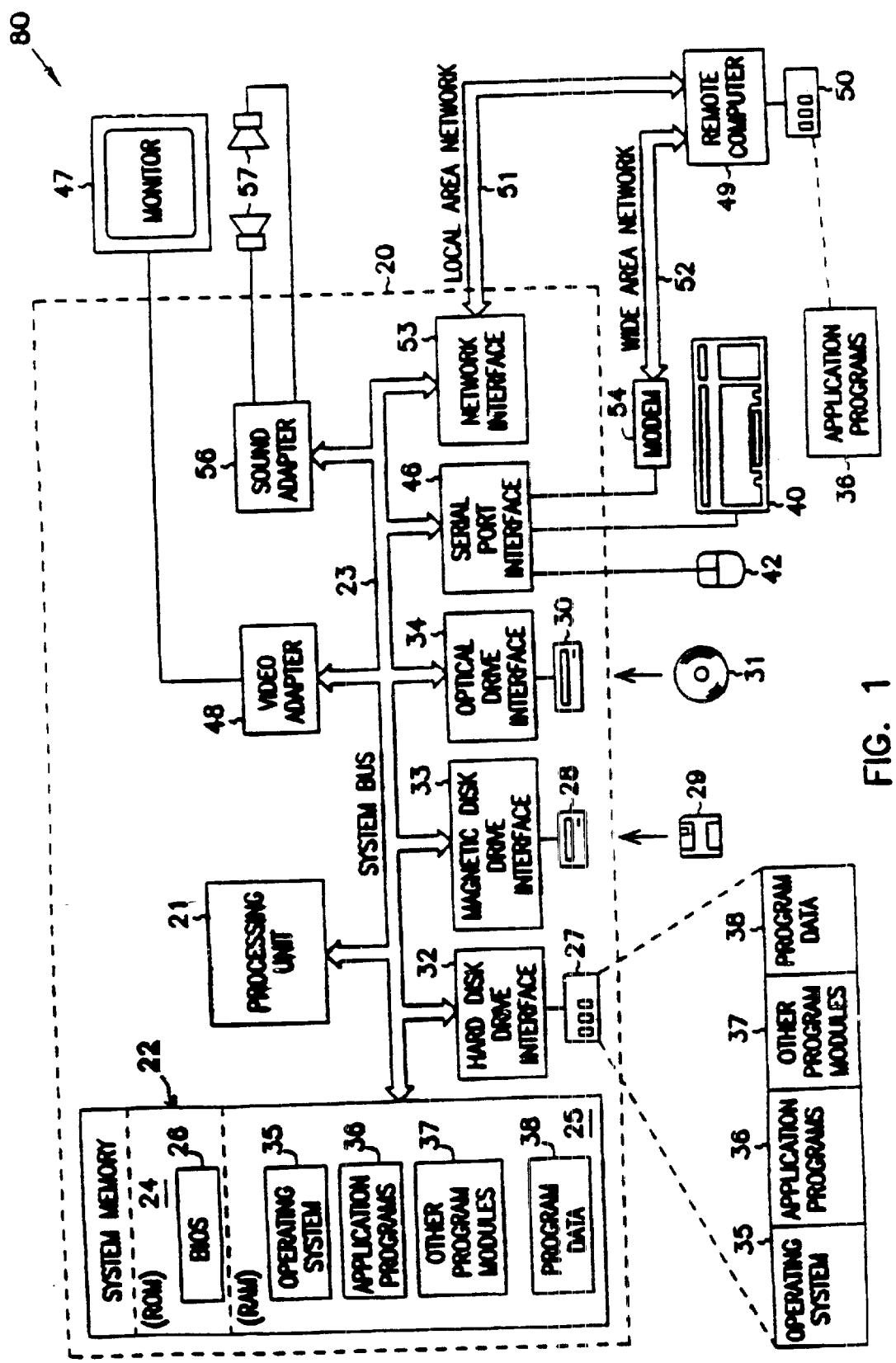
FIG. 1 illustrates a hardware and operating environment in conjunction with which embodiments of the invention can be practiced.

In the following Detailed Description of exemplary embodiments of the invention, reference is made to the accompanying drawings that form a part hereof, and which show by way of illustration specific exemplary embodiments in which the invention can be practiced. These embodiments are described in sufficient detail to enable those skilled in the art to practice the invention. It is to be understood that other embodiments can be utilized and that logical, mechanical, electrical, and other changes can be made without departing from the spirit and scope of the present invention. The following Detailed Description is, therefore, not to be taken in a limiting sense, and the scope of the present invention is defined only by the appended claims.

The Detailed Description is divided into six sections. In the first section, a Glossary of Terms is provided. In the second section, an Exemplary Hardware and Operating Environment in conjunction with which embodiments of the invention can be practiced is described. In the third section, a System Level Overview of the invention is presented. In the fourth section, Exemplary Embodiments of the Invention are provided. In the fifth section, Methods of Exemplary Embodiments of the Invention are provided. Finally, in the sixth section, a Conclusion of the Detailed Description is provided.

Glossary of Terms

The following section provides definitions of various terms used in the Detailed Description:

ADO—ActiveX ® Data Objects, a high-level programming interface from Microsoft Corporation for data objects which can be used to access different types of data, including web pages, spreadsheets, and other types of documents. It is designed to provide a consistent way of accessing data regardless of how the data is structured.

API—Application Program Interface, a language and message format used by an application program to communicate with the operating system, middleware, or other system program such as a database management system. APIs are generally implemented by writing function calls in the application program, which provide the linkage to a specific subroutine for execution. Operating environments typically provide an API so that programmers can write applications consistent with the operating environment.

COM—Component Object Model, a component software architecture from Microsoft Corporation which defines a structure for building program routines or objects that can be called up and executed in a Microsoft Windows ® operating system environment.

DCOM—Distributed Component Object Model, developed by Microsoft Corporation, it is an extension of the Component Object Model (COM), which enables object-oriented processes distributed across a network to communicate with one another.

Entity—a functional component in a data processing system, such as a client, server, or data source.

GUID—a Globally Unique Identifier within a data processing system. Within the present invention it is used to identify, for example, a COM object, an event source, an event, an event category, and any other system object that requires guaranteed unique identification from multiple independent generators.

Machine—a minimal data processing system comprising at least a processor and a memory, the processor executing software instructions which are stored in the memory.

Middleware—a category of processes between the application itself and backend processes such as databases, network connections, and so forth. Applications that run on currently available operating systems typically require services above and beyond those provided by the operating system. These services are often no longer written by the application developer but by a third party (which can be the operating system vendor). The term "middleware" indicates the position of these common services within the software architecture relative to the application.

MTS—Microsoft Transaction Server (MTS), a feature of the Microsoft Windows NT Server ® operating system that facilitates the development and deployment of server-centric applications built using Microsoft's Component Object Model (COM) technologies.

NTS—Windows NT Server ®, a version of the Microsoft Windows ® operating system. There are currently two commercially available versions of Windows NT: Windows NT Server ®, designed to act as a server in networks, and Windows NT Workstation ® for stand-alone or client workstations.

PerfMon—Performance Monitor, a utility provided with Microsoft Corporation's Windows NT ® operating system which enables the performance monitoring of all services running on a system.

RPC—Remote Procedure Call, a programming interface that allows a program on one computer to execute a program on a server computer. Using RPC, a system developer need not develop specific procedures for the server. The client program sends a message to the server with appropriate arguments, and the server returns a message containing the results of the program executed.

Windows ® operating system—an operating system commercially available from Microsoft Corporation for several different computing platforms.

Exemplary Hardware and Operating Environment

FIG. 1 illustrates a hardware and operating environment in conjunction with which embodiments of the invention can be practiced. The description of FIG. 1 is intended to provide a brief, general description of suitable computer hardware and a suitable computing environment with which the invention can be implemented. Although not required, the invention is described in the general context of computer-executable instructions, such as program modules, being executed by a computer, such as a personal computer (PC). This is one embodiment of many different computer configurations, some including specialized hardware circuits to analyze performance, that can be used to implement the present invention. Generally, program modules include routines, programs, objects, components, data structures, etc. that perform particular tasks or implement particular abstract data types.

Moreover, those skilled in the art will appreciate that the invention can be practiced with other computer-system configurations, including hand-held devices, multiprocessor systems, microprocessor-based or programmable consumer electronics, network personal computers ("PCs"), minicomputers, mainframe computers, and the like. The invention can also be practiced in distributed computing environments where tasks are performed by remote processing devices linked through a communications network. In a distributed computing environment, program modules can be located in both local and remote memory storage devices.

FIG. 1 shows a general-purpose computing or information-handling system 80. This embodiment includes a general purpose computing device such as personal computer (PC) 20, that includes processing unit 21, a system memory 22, and a system bus 23 that operatively couples the system memory 22 and other system components to processing unit 21. There may be only one or there may be more than one processing unit 21, such that the processor computer 20 comprises a single central-processing unit (CPU), or a plurality of processing units, commonly referred to as a parallel processing environment. The computer 20 can be a conventional computer, a distributed computer, or any other type of computer; the invention is not so limited.

In other embodiments other configurations are used in PC 20. System bus 23 can be any of several types, including a memory bus or memory controller, a peripheral bus, and a local bus, and can use any of a variety of bus architectures. The system memory 22 may also be referred to as simply the memory, and it includes read-only memory (ROM) 24 and random-access memory (RAM) 25. A basic input/output system (BIOS) 26, stored in ROM 24, contains the basic routines that transfer information between components of personal computer 20. BIOS 26 also contains start-up routines for the system.

Personal computer 20 further includes hard disk drive 27 having one or more magnetic hard disks (not shown) onto which data is stored and retrieved for reading from and writing to hard-disk-drive interface 32, magnetic disk drive 28 for reading from and writing to a removable magnetic disk 29, and optical disk drive 30 for reading from and/or writing to a removable optical disk 31 such as a CD-ROM, DVD or other optical medium. Hard disk drive 27, magnetic disk drive 28, and optical disk drive 30 are connected to system bus 23 by a hard-disk drive interface 32, a magnetic-disk drive interface 33, and an optical-drive interface 34, respectively. The drives 27, 28, and 30 and their associated computer-readable media 29, 31 provide nonvolatile storage of computer-readable instructions, data structures, program modules and other data for personal computer 20. Although the exemplary environment described herein employs a hard disk, a removable magnetic disk 29 and a removable optical disk 31, those skilled in the art will appreciate that other types of computer-readable media which can store data accessible by a computer can also be used in the exemplary operating environment. Such media may include magnetic tape cassettes, flash-memory cards, digital video disks (DVD), Bernoulli cartridges, RAMs, ROMs, and the like.

In various embodiments, program modules are stored on the hard disk drive 27, magnetic disk 29, optical disk 31, ROM 24 and/or RAM 25 and can be moved among these devices, e.g., from hard disk drive 27 to RAM 25. Program modules include operating system 35, one or more application programs 36, other program modules 37, and/or program data 38. A user can enter commands and information into personal computer 20 through input devices such as a keyboard 40 and a pointing device 42. Other input devices (not shown) for various embodiments include one or more devices selected from a microphone, joystick, game pad, satellite dish, scanner, or the like. These and other input devices are often connected to the processing unit 21 through a serial-port interface 46 coupled to system bus 23, but in other embodiments they are connected through other interfaces not shown in FIG. 1, such as a parallel port, a game port, or a universal serial bus (USB) interface. A monitor 47 or other display device also connects to system bus 23 via an interface such as a video adapter 48. In some embodiments, one or more speakers 57 or other audio output transducers are driven by sound adapter 56 connected to system bus 23. In some embodiments, in addition to the monitor 47, system 80 includes other peripheral output devices (not shown) such as a printer or the like.

In some embodiments, personal computer 20 operates in a networked environment using logical connections to one or more remote computers such as remote computer 49. Remote computer 49 can be another personal computer, a server, a router, a network PC, a peer device, or other common network node. Remote computer 49 typically includes many or all of the components described above in connection with personal computer 20; however, only a storage device 50 is illustrated in FIG. 1. The logical connections depicted in FIG. 1 include local-area network (LAN) 51 and a wide-area network (WAN) 52, both of which are shown connecting PC 20 to remote computer 49; typical embodiments would only include one or the other. Such networking environments are commonplace in offices, enterprise-wide computer networks, intranets and the Internet.

When placed in a LAN networking environment, PC 20 connects to local network 51 through a network interface or adapter 53. When used in a WAN networking environment such as the Internet, PC 20 typically includes modem 54 or other means for establishing communications over network 52. Modem 54 may be internal or external to PC 20 and connects to system bus 23 via serial-port interface 46 in the embodiment shown. In a networked environment, program modules depicted as residing within PC 20 or portions thereof may be stored in remote-storage device 50. Of course, the network connections shown are illustrative, and other means of establishing a communications link between the computers can be substituted.

Software can be designed using many different methods, including object-oriented programming methods. C++ and Java are two examples of common object-oriented computer programming languages that provide functionality associated with object-oriented programming. Object-oriented programming methods provide a means to encapsulate data members (variables) and member functions (methods) that operate on that data into a single entity called a class. Object-oriented programming methods also provide a means to create new classes based on existing classes.

An object is an instance of a class. The data members of an object are attributes that are stored inside the computer memory, and the methods are executable computer code that act upon this data, along with potentially providing other services. The notion of an object is exploited in the present invention in that certain aspects of the invention are implemented as objects in some embodiments.

An interface is a group of related functions that are organized into a named unit. Some identifier can uniquely identify each interface. Interfaces have no instantiation; that is, an interface is a definition only without the executable code needed to implement the methods that are specified by the interface. An object can support an interface by providing executable code for the methods specified by the interface. The executable code supplied by the object must comply with the definitions specified by the interface. The object can also provide additional methods. Those skilled in the art will recognize that interfaces are not limited to use in or by an object-oriented programming environment.

System Level Overview

Figure 2:
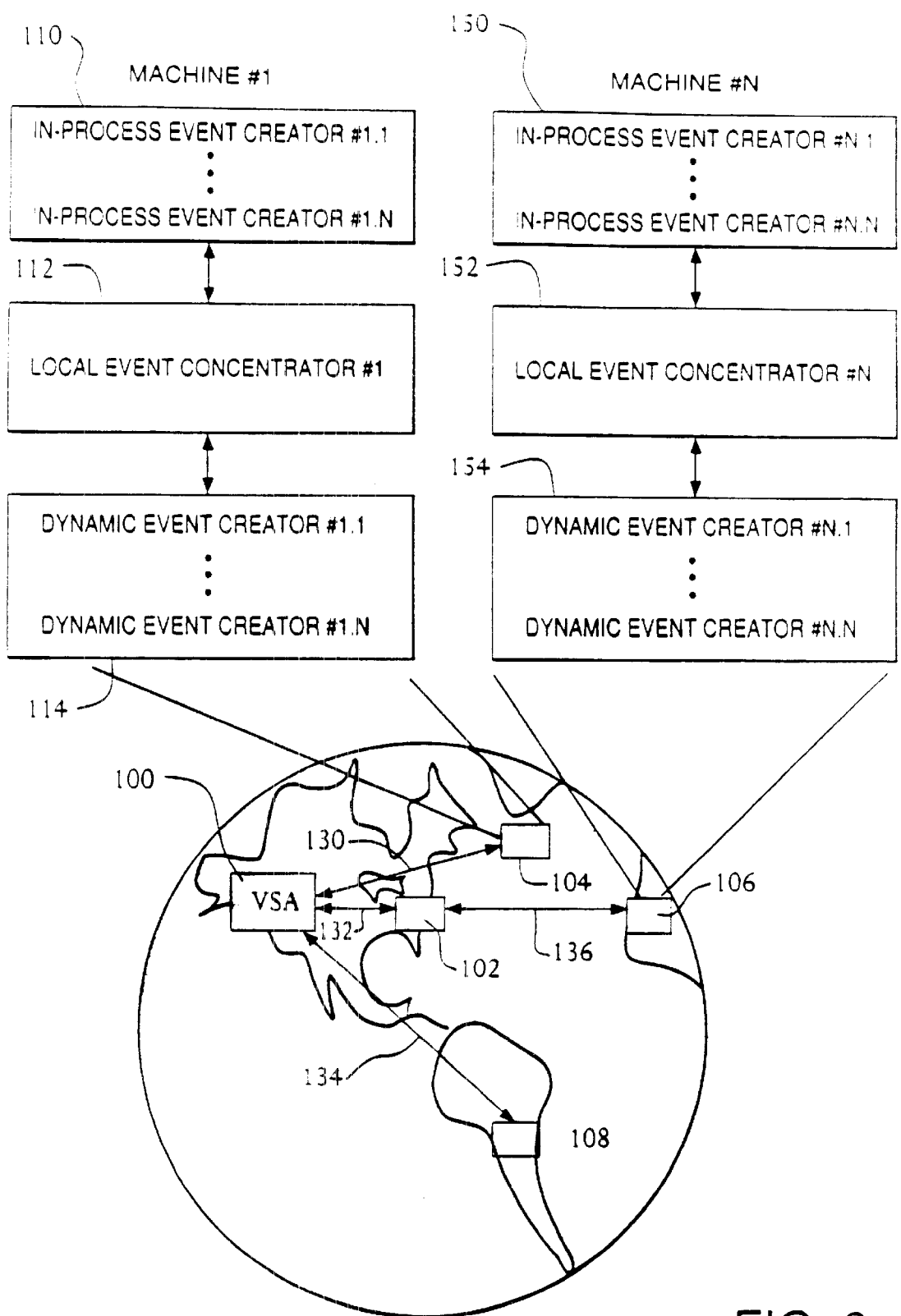
FIG. 2 illustrates a system-level overview of an exemplary embodiment of the invention.

FIG. 2 illustrates a system-level overview of an exemplary implementation of the invention. The invention has utility in the area of data processing, where it can be used to analyze the performance of a data processing system, and in particular application software, whether under development, undergoing testing, or in full utilization. The invention is commercially available from Microsoft Corporation as the "Visual Studio" ® development system or "Visual Studio Analyzer" ®. In addition, certain portions of the invention are provided within the Microsoft Windows ® operating system.

The "Visual Studio" development system collects application data by use of instrumentation within the application environment in an efficient, distributed collection architecture. Any application built with any development tool can be automatically analyzed and diagnosed, provided it uses standard middleware and operating system components. There is no requirement for any changes to the application itself.

As mentioned in the Background section earlier, distributed data processing systems can be relatively simple or extremely complex. The developer of software operating on a distributed data processing system is usually faced with serious challenges in understanding the functional operation and behavior of such software as it is executing.

The system illustrated in FIG. 2 is a globally distributed system in which different machines 100, 102, 104, 106, and 108 are physically located on several different continents. These machines are shown as interconnected via hardwire, fiber-optic cable, radio frequency, or other suitable links 130, 132, 134, and 136 in an arbitrary network arrangement spanning a large portion of the globe. The difficulties in understanding and trouble-shooting systems of this complexity have been significant until the present invention.

The present invention enables complex distributed applications to be readily understood and analyzed, notwithstanding that the machines on which they are running may be thousands of miles apart, and notwithstanding that the developer may not have access to source code for the underlying software upon which his or her application is running.

With reference to FIG. 2, the box identified as VSA 100 is a control and display station that comprises computer hardware and software. VSA 100 is coupled to one or more machines, e.g. machines 102, 104, 106, and 108. Each machine includes a Local Event Concentrator (LEC) 112, 152. One LEC is provided per physical machine, although in a different implementation more could be provided if desired. VSA 100 activates an LEC when it wants that LEC to start collecting events, and VSA 100 deactivates an LEC when it wants it to stop collecting events. In addition to VSA 100, other client machines can also activate or deactivate an LEC 112 or 152.

Each LEC 112, 152 is coupled to a respective process space 110, 150. Each process space 110, 150 can each comprise a group of In-process Event Creators (IECs), such as IECs #1.1 through #1.N in group 110.

Each LEC 112, 152 is further coupled to a respective process space 114, 154. Each process space 114, 154 can each comprise a group of Dynamic Event Creators (DECs), such as DECs #1.1 through #1.N in group 114. Process spaces 110 and 114 can be identical or different for machine 104; likewise for the process spaces 150, 154 associated with machine 106. While all DECs are shown in FIG. 2 as residing in process spaces 114, 154, in one embodiment DECs that capture global machine state (such as PerfMon data) reside only within the LEC process space.

Machine-Level Overview

Figure 3:
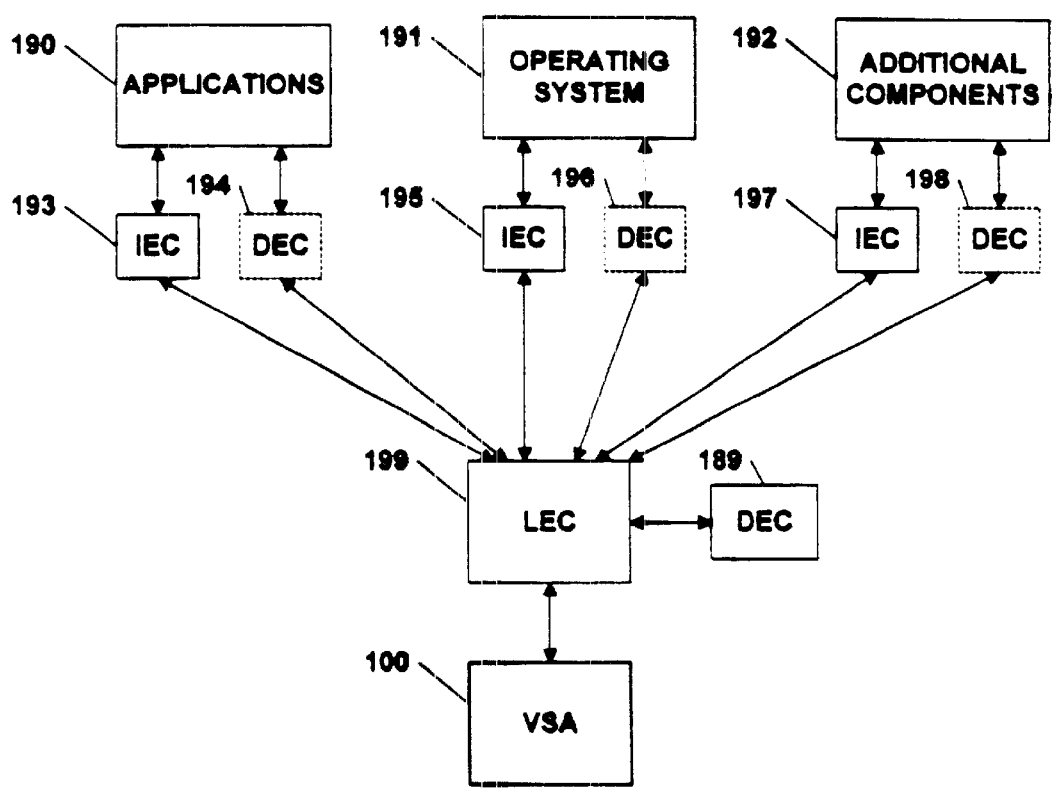
FIG. 3 illustrates a machine-level overview of an exemplary embodiment of the invention.
Figure 7:
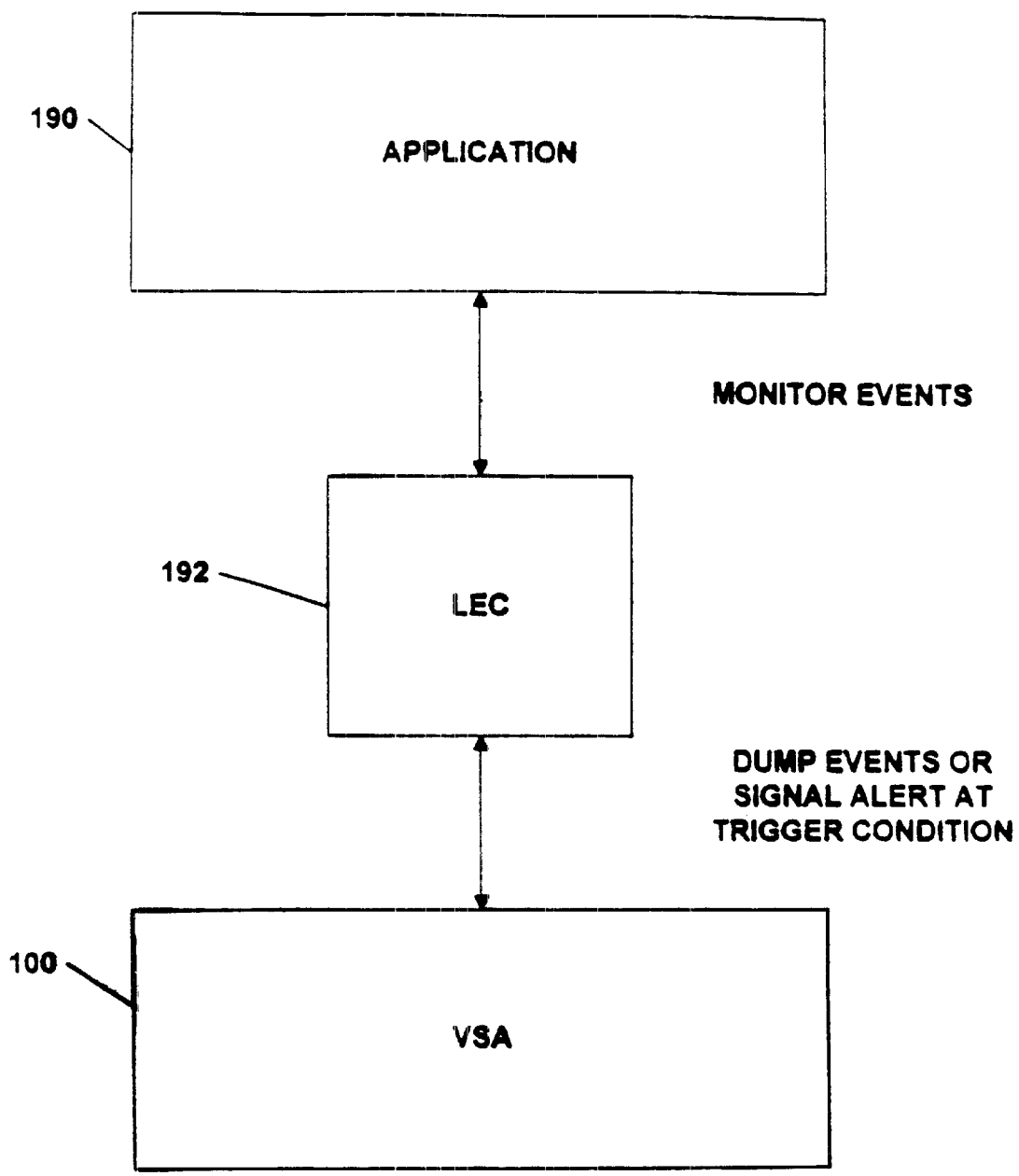
FIG. 7 illustrates in schematic fashion how events selected by a user are monitored.

FIG. 3 illustrates a machine-level overview of an exemplary embodiment of the invention. In FIG. 7 three major portions of the process space of a machine are shown in the form of Applications 190, Operating System 191, and Additional Components 192.

In one aspect, the invention comprises one local event concentrator (LEC) 199 for each machine. Applications portion 190 has an IEC 193 associated with it; Operating Systems portion 191 has an IEC 195 associated with it; and Additional Components portion 192 has an IEC 197 associated with it.

There is at least one dynamic event creator (DEC) per machine, such as DEC 189, which is in the process space of LEC 199. It will be apparent to one of ordinary skill in the art that DECs could be provided for each portion 190, 191, 192 of the machine's process space. This is shown in FIG. 3 by DEC boxes 194, 196, 198 having dashed lines.

Events created by TECs 193, 195, 197 and DECs 189, 194, 196, 198 are collected by LEC 199. The LEC 199 collects events generated by the IECs and DECs and sends these events to the user's control station, VSA 100, for analysis and display in a user-determined format.

IECs and DECs reside in the process space of data sources within a machine, and they "report on" these data sources. They each do this by creating events that are sent to and collected by the LEC. They are active only when the user is interested in knowing about these events and in understanding the system performance.

IECs and DECs differ in their purpose. An IEC creates an event when a user-specified condition (other than time-valued data) occurs. An example could be "a COM event in Machine A". A DEC, on the other hand, creates an event to reflect data whose value is measured on a periodic or time basis. An example could be PerfMon data reflecting CPU utilization.

As mentioned in the Summary section above, the system described herein for analyzing the performance of a data processing system is a comprehensive one with many different aspects, each of which will now be described in the section below entitled Exemplary Embodiments of the Invention.

EXEMPLARY EMBODIMENTS OF THE INVENTION

Collection, Capture & Transmission of Data

Data collection begins in the IECs. An IEC is a subroutine that marshals the desired data into a special format and puts it in a shared memory buffer. As mentioned above, IECs reside in the process space of a data source.

An IEC exports two main functions: IsActive and FireEvent. The IsActive function is used by data sources to determine if any analysis is being performed against a particular data source. When a piece of code reaches a point of interest, the IsActive function is called, which returns True or False as to whether or not anyone is interested. If the IsActive status condition is set True for a particular data source, the FireEvent function is used to dispatch an event to the centralized collection system of the requesting user. If IsActive returns False, an entity can reduce any adverse performance impact by not formatting data for FireEvent. The FireEvent function is implemented in both a synchronous and an asynchronous manner in the present invention.

When an LEC has been activated by the VSA 100, it can turn an IEC on or off, i.e. it switches its IsActive status to True or False. That Boolean status is maintained in the process, so there are really never any in-process transitions, and the code never changes. When IsActive is True, events are generated. When the VSA 100 user wants to stop monitoring events, everything can be quickly disconnected. IsActive is set to False, and the application never changes.

Also, when an LEC has been activated by VSA 100, it can turn a DEC on or off, depending upon whether the DEC is to collect events. When a DEC is to stop collecting events, an LEC simply turns it off. As for IECs, an LEC starts and stops DECs as specified by a user-specified filter, as will be discussed further below.

Instead of turning individual IECs on and off, a portion of the IECs or all of the IECs can be turned on or off. The same applies to other structures of the invention, including DECs and LECs.

To improve system-wide efficiency, the operating system or middleware defers the creation of an IEC until the user actually begins collection of events. IECs are only created for users who desire to monitor system performance. They are automatically created when needed. This ensures that, if the system is not under analysis, the performance impact of operating the performance analyzer is negligible. Additionally, the system is able to remove all of the IECs from memory when analysis completes, so that a system wherein analysis has finished behaves with the same characteristics as before performance began, unlike many traditional tools.

IECs and DECs are created by the operating system, middleware, and application components that are sourcing the events. The creation of an IEC will now be described. Assume that a middleware entity wants to fire events. It asks the operating system to create an IEC. The operating system creates an IEC "reference", ready for the IEC in case the user wants to start monitoring data. When the user wants to start monitoring data, the LEC tells the operating system to convert the IEC "reference" into a real IEC. The operating system converts all the IEC references into real IECs the first time they are used.

Events from IECs in process spaces 110, 150 are passed to a respective LEC 112,152 via shared memory buffers. This allows the event to be communicated without requiring a process context switch. Each IEC has its own buffer in shared memory, to ensure that conflicts between events and locking do not distort system performance.

In one currently implemented embodiment there is only one LEC per machine. It collects events from all IECs in all processes on the system that are being analyzed, and it sends the desired events back to the VSA 100. Since this communication is likely to be cross-machine, an efficient batching mechanism is used to reduce network traffic, and transmission is scheduled for low-system load times. To ensure efficient dispatch of events across the network, the LEC process runs at a lower than normal priority. This means that events will tend to be flashed across the network when the machine is not busy running the real application or when the real application is blocked, e.g., when it is waiting for data to be read from disk. To further reduce performance impact, events from many IECs are collected together and will not be sent more than some fixed period of time, e.g. every one-half to one second in one embodiment. If the number of events to be sent exceeds the buffering capacity, events will either be sent immediately or thrown away, depending upon a setting made at the control station.

Communication between the VSA 100 and the LECs also exists to establish clock skews so that event times throughout the distributed application can be synchronized. Any known clock skew calculators can be used for this purpose.

A DEC is similar to an IEC except that it deals with data whose value can be measured continuously, and whose values need to be recorded at regularly scheduled intervals. To reduce system complexity and increase flexibility in handling data, these "measured" events are treated internally just like events that are triggered by the system's behavior. This allows collection, synchronization, and analysis of both event-driven and time-driven data.

As opposed to an IEC which reports on the occurrence of events (i.e. "this thing happened"), a DEC gathers information on a time basis, such as memory usage within the system, not necessarily events coming from within the application. For example, a DEC might every second measure the memory usage of the system and send back an event that says "current memory usage is 2 megabytes". A DEC could also report on disk usage or CPU usage. A DEC could be created within the application itself to measure application-specific parameters such as, for example, the number of queries currently executing within a database system or the number of words currently misspelled in a word-processing document. Generally speaking, a DEC can measure any continuously varying data, i.e., anything which could be represented by a graph.

The VSA 100 collects all reported information and stores it in an efficient centralized store. The centralized store can simply be a data file in which data is organized in a certain way, i.e. a memory-mapped file. Other embodiments of an efficient data store could be a relational database, an in-memory data structure, a regular file, or any other suitable structure which can handle large volumes of data with an efficient access time.

Once written to, it can be read many times. Data is organized so it's easy to write, since incoming data volume can be very high, and also so it's easy to read directly from disk, since dataset size will typically preclude loading all data into memory.

Since data collection for one embodiment of the invention doesn't involve a multiple update problem, this was taken into consideration in designing the data structure. File-mapped memory buffers were used so that information could be quickly retrieved from disk and stored into memory in an efficient way. Thus the system is able to receive potentially many thousands of events per second. It is stored on disk in the order that it arrives.

It will be apparent to one of ordinary skill in the art that the present invention is equally applicable to a distributed system in a single machine. A single machine can be running more than one process, for example an operating system and a data base application.

It will further be apparent to one of ordinary skill that if the performance cost of a context switch is not of great concern, then it could in fact be carried out, provided that one appropriately factors it into the performance analysis.

It will be appreciated that just because the LEC is collecting something doesn't mean that it is necessarily what the VSA user wants. As will be explained below, user-specified filtering can occur in the IEC or in the LEC to reduce the information. In addition, the LEC, in a currently implemented embodiment, can buffer all or a substantial portion of the information that it sends out to the VSA, so it sends bursts on the network rather than continuous traffic. In addition, it can also run as a lower priority, so it's buffering up all of the information rather than directly slowing down the application. In addition, it can further compress data to reduce network overhead.

Operation of VSA

The operation of the VSA will now be described. When an application starts up, the operating system software or the "middleware" that the application is using creates an IEC reference, and if there's an LEC on the system the IEC reference hooks itself up to the LEC. However, if no one is analyzing the system yet, there will be no LEC yet, and the IEC reference will remain unhooked up.

Then the IEC reference goes into quiescent mode. The application keeps running, and nothing special is going on to slow it down.

Now, if someone wants to analyze what's going on, they turn on the VSA 100, and they indicate that they want to hook up to a particular machine, so it turns on an LEC on that system. That LEC connects to all of the IECs on that system, and it starts any DECs, for example to monitor CPU usage. DECs measure and report on time-based interval events, while IECs watch for and report on the occurrence of events. It will be apparent to one of ordinary skill that while the LEC is created by the VSA 100 in a currently implemented embodiment, it could be automatically created when the first IEC reference exists.

The VSA user specifies what information is to be collected. That information is broken down per machine and passed to the LEC for each machine. The LEC then breaks that down, per IEC, and basically turns the IECs on or off where appropriate. When IsActive is set True in an IEC, it is no longer quiescent, and that IEC starts sending collected data to its associated LEC. When the user shuts down the VSA, the IECs, DECs, and LECs revert back to their quiescent states.

The interface between the VSA and an LEC can operate under DCOM. Everything else can run under COM, except for the shared memory communication between the IEC and the LEC. The IEC writes information into a shared memory buffer and never takes a process context switch. COM is used basically only for initialization.

A third party developer is able to write a COM interface for its application and use the VSA to analyze its performance. It doesn't have to link any additional libraries.

Data Design—Pre-Defined Event Fields and Custom Fields

FIG. 4 illustrates in schematic fashion pre-defined event fields and custom fields, which are included in an event packet within an exemplary embodiment of the invention. Pre-defined event fields are generally always present in an event packet, whether the user specifies them or not. Custom fields can also be assigned by a user. In the invention each event may include a number of pre-defined or standard pieces of information, as well as custom or arbitrary user-specified information. This information becomes important when filter reduction occurs, as will be described further below.

As shown in FIG. 4, a VSA event comprises pre-defined event fields 160 and custom fields 162. Not all pre-defined event fields have to be provided for every event. Pre-defined event fields 160 enable the data structure of the invention. If the user doesn't specify pre-defined event fields, intelligent default values are automatically provided for them.

Custom fields 162 can be generated by the user, but none of them is essential to the data design.

What distinguishes pre-defined event fields from custom fields is that pre-defined event fields have pre-defined semantics and are therefore useable by the analysis mechanism to determine the interrelationship among events. Without pre-defined event fields, the analysis mechanism would be unable to make any reasonable deductions about the events and would only be able to provide a useless list of events. Further, the set of pre-defined event fields is optimized for effective and efficient analysis. The specific names and functions are described in Table 1 below.

Some important pre-defined event fields are the Machine, Process, Entity (referred to as "Component" in Table 1 below and in the APIs), Instance (referred to as "Session" in Table 1 below and in the APIs), and Handle fields, both for the Source as well as for the Target. Their use will be explained in greater detail below.

Pre-defined event fields are listed in Table 1 below:

TABLE 1

| Pre-Defined Event Fields |
| --- |
| Arguments |
| CausalityID |
| CorrelationID |
| DynamicEvent Data |
| Exception |
| ReturnValue |
| SecurityIdentity |
| SourceComponent |
| SourceHandle |
| SourceMachine |
| SourceProcess |
| SourceProcessName |
| SourceSession |
| SourceThread |
| TargetComponent |
| TargetHandle |
| TargetMachine |
| TargetProcess |
| TargetProcessName |
| TargetSession |
| TargetThread |
| Time |
| Entity |
| Instance |

Because the default set of events is large, pre-defined event categories are provided to visually organize the events in the filter editor. Each event belongs to exactly one category, and each category may have any number of different events. Each category may also have any number of child categories. The combination of all of the events and categories makes a tree where the leaves are events and the branches are categories. Event categories have no semantic impact on the event but do allow the filter to be displayed, stored, and processed more efficiently. Event categories have merely an organizational function, in that they help the user understand events.

Pre-defined event categories are listed in Table 2 below:

TABLE 2

| Pre-Defined Event Categories |
| --- |
| All |
| Call/Return |
| Measured |
| Query/Result |
| Start/Stop |
| Transaction |

Each event has a type. The type is used to distinguish events that come from DECs. The event type is also used to distinguish events that are outbound (CALL or ENTER) from those that are inbound (LEAVE or RETURN). This distinction is important to matching up the steps of four events mentioned later regarding a CALL/ENTER/LEAVE/RETURN sequence. If an event belongs to either of these categories, then it is called generic.

Event types are unrelated to event categories. Events of the same type may be in different categories, and, conversely, events in the same categories may be of different types.

There are different types of events. The event type is used to specify how VSA 100 should interpret the event. Event types are listed in Table 3 below:

TABLE 3

Event Types

Begin/End—correspond to a set of events that surround an action.
Default—for a default event (or unspecified event type).
Generic—for a simple event (not a grouped event).
Measured—for DEC events.
Outbound/Inbound—for call/return events. Outbound means the transition is "out" of the component. Inbound means the transition is "into" the component.

The data design of the present invention allows the user to define his or her own events and event taxonomy. However, to provide some basic interoperability between data (so that generic analysis tools can be written and/or used), in one embodiment of the invention some typical events are defined. Compliant event generators within this embodiment are encouraged to use these events rather than to define their own. This helps simplify the filter editor. Alternative embodiments could either have no typical events or a very large set of typical events. The choice of typical events is merely dictated by the kind of events that are expected to be common within the embodiment of the invention which is implemented.

Table 4 below identifies pre-defined events and their categories and types:

TABLE 4

Pre-Defined Events and Categories

| Event | Category | Type |
| --- | --- | --- |
| Call | Call/Return | Outbound |
| Call Data | Call/Return | Outbound |
| Component Start | Start/Stop | Begin |
| Component Stop | Start/Stop | End |
| Enter | Call/Return | Inbound |
| Enter Data | Call/Return | Inbound |
| Events Lost | Transaction | Generic |
| Leave Data | Call/Return | Outbound |
| Leave Exception | Call/Return | Outbound |
| Leave Normal | Call/Return | Outbound |
| Query Enter | Query/Result | Inbound |
| Query Leave | Query/Result | Outbound |
| Query Result | Query/Result | Inbound |
| Query Send | Query/Result | Outbound |
| Return | Call/Return | Inbound |
| Return Data | Call/Return | Inbound |
| Return Exception | Call/Return | Inbound |
| Return Normal | Call/Return | Inbound |
| Transaction Commit | Transaction | End |
| Transaction Rollback | Transaction | End |
| Transaction Start | Transaction | Begin |
| User | All | Generic |

In Table 4, the "Category" descriptors are merely annotational, not semantic.

A brief description of each Event listed in the "Event" column will now be given:

A "Call" event is the first step of a four-part Call/Enter/Leave/Return transition. A function call is departing from a caller.

"Call Data" means subsidiary data to a call is being transmitted. This always follows a Call.

"Component Start" means a component has been created and is starting to execute (note that "component" in this sense is not the same as an "entity" as used herein; it means a real component).

"Component Stop" means a component has been destroyed and is stopping its execution (note the comment above).

"Enter" means the second step in a four-step transition. A function call is arriving at the callee.

"Enter Data" means subsidiary data to an Enter has been received.

"Events Lost" means the system has had to discard events to avoid overloading the eventing infrastructure.

"Leave Data" means subsidiary data to a leave has been transmitted from a callee to the caller.

"Leave Exception" means an exception (error) has been transmitted from the callee to the caller. This is the third step in the four-part transition.

"Leave Normal" means a success has been transmitted from the callee to the caller. This is the third step in the four-part transition.

"Query Enter" means a database query has arrived at the database.

"Query Leave" means a database query has been completed.

"Query Result" means a database query result set has started transmitting back to the caller.

"Query Send" means a database query has left the caller.

"Return" means the fourth step in the four-part transition. Control has returned to the caller.

"Return Data" means subsidiary data to a Return has been received at the caller.

"Return Exception" means an exception (error) has been received at the caller. This is the fourth step in the four-part transition.

"Return Normal" means a success has been received at the caller. This is the fourth step in the four-part transition.

"Transaction Commit" means a transaction has been committed successfully.

"Transaction Rollback" means a transaction was aborted.

"Transaction Start" means a new transaction was created and started.

"User" means an unknown event.

Data Design—E0/E1 Entity Transition

FIG. 5 illustrates a transition between two entities, E0 and E1, within the hardware and operating environment. A "transition" occurs when one entity (e.g. a program, process, or object) turns execution over to another to complete a specific task. In FIG. 5 the illustrated transition comprises four events, a Call event, an Enter event, a Leave event, and a Return event.

When understanding the structure and behavior of distributed systems, understanding transitions between different applications entities is important. The VSA employs an innovative data design that allows two communicating entities to describe their interactions despite knowing almost nothing about each other. Each participant in a transition provides only information about its environment, plus a unique identifier that allows the entity at the other end of the transition to link the pair of events. Every destination called needs to have a unique i.d., and every source of a Call has a unique i.d. In an embodiment which was implemented, these unique i.d.'s are GUIDs.

This design has a number of benefits. First, because entity systems typically already include a quasi-unique identifier for transitions, no extra information needs to be transmitted between the two entities. Second, each entity data load is reduced through less duplicated data.

Each application is treated as a series of black boxes. A "transition" is defined as when an application moves from one of those boxes to another one. So if we have a Client and a Server, a transition occurs when we go to the Server, and another occurs when we go back. In a three-tier design, a transition occurs for Client to Server, Server to Database, Database to Server, and Server to Client movements. These are entity to entity transitions and not necessarily machine to machine transitions.

One example of an entity to entity transition is one COM client component calling a COM server component. Essentially four events represent that transition, which can be a remote procedure Call (RPC) within a distributed system. An event from the client says "I'm initiating a Call". An event at the server says "I've entered the server". An event at the server says "I'm leaving the server". And finally an event at the client says "I've returned". In the case of COM, an event occurs at both sides of the transition.

By looking at all or nearly all of these events and taking appropriate pieces of information about them and correlating them, a great deal of information is derived about the structure and performance of the system, and accordingly a performance model of the system can be constructed.

Data Design—Determination of Source/Target Relationship

FIG. 6 is a table which illustrates how pre-defined event fields are used to establish a relationship between a source entity and a target entity.

For each of the events involved in a Call, Enter, Leave, and Return sequence, the event producer specifies the Machine of the source, the Process of the source, the Entity (e.g. class, such as ADO) of the source, and the Instance of the source.

Thus the VSA knows the Machine, Process, Entity, and Instance at the Source for a Call event, but it doesn't know the Machine, Process, Entity, and Instance at the Target for a Call event. And for the Enter event, the situation is reversed. The VSA doesn't know it for the Source, but it does know it for the Target. In almost all cases the events are fired at the place the event is happening.

Using this information the VSA is able to piece together a functional block diagram of the system as described below.

There are basically two kinds of users that use VSA. There are people who give us events, and there is the actual end user who is collecting data to understand it. The data design of the invention is manipulated and used by the portion of the operating system that gives us events, and the end user doesn't really need to understand it in great depth. This format makes it possible to draw a block diagram of the system, even though no one piece knows what the system should look like.

In most existing systems, E0 and E1 have a very weak relationship. The data design of the present invention is innovative in that it can tolerate this weak relationship and still provide useful results. E0 doesn't really need to know what machine E1 is on, and vice versa. Even though these two entities communicate through the system, e.g. via COM, they don't really know about each other. So when a Call event is fired by E0, it doesn't really know whom it's talking to. When E1 fires the Enter event that goes with that Call event, it doesn't really know that that Enter event goes with that Call event. So the small amount of information that the operating system has is leveraged to make sure that the Call event maps the Enter event. The Handle, the Correlation i.d., and the Causality i.d. fields are largely responsible for enabling an Enter event to be linked with a Call event.

There are generally two kinds of events. There are asynchronous events, e.g. "this thing happened". And there are transition events, e.g. going from E0 to E1. When you have a transition event, you typically have a transition back. The user firing the event specifies a Correlation i.d., which enables the Call event to be identified with the Return event. The Call and Return have the same Correlation i.d., and the Enter and Leave have their own Correlation i.d. Each Correlation pair matches up exactly one pair of Enter/Leave and Call/Return to enable the VSA to understand how to match up the pairs.

Each event source has its own notion that correlates a CALL with a RETURN. For example, COM is able to generate a GUID based on the current execution context and processor. In an alternative embodiment, a Correlation i.d. could be generated using the time the CALL was made. Generation of a Correlation i.d. is typically simple but cannot really be generalized. Each IEC caller must pick its own scheme. Even within a currently implemented embodiment, several schemes for generating Correlation i.d.'s coexist.

Another key piece of information is the Causality i.d. This is normally provided by COM, but any entity can provide its own value if desired. Whenever a COM RPC is created, a GUID is created for that RPC. That information is tracked around the network, e.g. for purposes of identifying when a circular reference has been created. For the purposes of the present invention, it is used to match things up. It's basically a unique i.d. to identify a particular stream of calls and to sort them out. It says that this Call goes with this Return, and that this Enter goes with this Leave. The VSA knows from the Causality i.d. that these are all somehow interrelated.

In general, the Correlation i.d. operates on the events that are known to one machine, and the Causality i.d. operates on events that occur across machines.

A Handle is a way of referencing an individual instance of an entity. Handles are used by a calling entity to call (reference) a particular instance of an entity. Thus, the calling entity knows what Handle it is calling, and the entity being called (the target) knows its own Handle. When this process is applied for both the source and the target (each of which will have its own Handle), it is possible to collect together four events into the standard group of CALL/ENTER/LEAVE/RETURN. It is important to realize that any entity instance can have many different Handles that refer to it. For example, when A and C are both talking to B, A might use the Handle "BAT" to refer to B, where C might use the Handle "BALL" to refer to B.

From the information contained in the table shown in FIG. 6, the VSA deduces that Call 170 goes with Return 176, and that Enter 172 goes with Leave 174. The VSA knows they're related. By knowing that the Source Handle 180 for Call 170 corresponds to Source Handle 186 for Enter 172, and that Target Handle 182 for Call 170 corresponds to Target Handle 184 for Enter 172, it knows that Call 170 is linked with Enter 172. In similar fashion, the VSA determines that Enter 172 is linked with Leave 174, and that Leave 174 is linked with Return 176.

The table shown in FIG. 6 will now be described in detail to illustrate how a relationship can be deduced between a source entity and a target entity. The table of FIG. 6 shows a standard four-event transition sequence. This sequence is not the only possible one but is merely one example.

In this example, the CALL event fires, and the system is given full information about the source but only knows the target Handle is H1. When the target fires the ENTER event, two deductions can be made: (1) the CALL event can now be filled in, and (2) Handle H1 (the target) has now been defined to be M1, P1, E1, I1. So the CALL event is now completely specified. Additionally, the ENTER event uses Handle H0 which was previously defined to be M0, P0, E0, I0, and so the ENTER event can be completely filled in too.

When the LEAVE event arrives again from the target, two more deductions can be made: (1) the source information for the LEAVE event can be filled in by noticing that Handle H0 has previously been defined to mean M0, P0, E0, I0, and (2) we can now deduce that this LEAVE event and the previous ENTER event are a pair, because they have the same Correlation i.d. (i.e. "CB").

When the final RETURN event arrives, three deductions can be made: (1) we can fill in the target information for the RETURN event, because we know that H1 means M1, P1, E1, I1, (2) we can pair this RETURN up with the previous CALL by noticing that the Correlation i.d. ("CA") matches that of the CALL event, and (3) all four events are a set because their Causality i.d. is the same, and they have two pairs of matching Correlation i.d.'s.

The proper choice of a Handle depends in part on the entity causing the event. As in the case of a Correlation i.d., the generation of a Handle is typically simple but cannot really be generalized. Several routine schemes for generating Handles exist within a currently implemented embodiment of the invention.

It generally takes all three pieces of information together in context to create a functional diagram of how all of the pieces communicate. No single piece of information is vital to successful analysis. Dropping one or more fields still allows an implemented embodiment of the invention to generate useful analysis data. However, the removal of all source information makes it impossible to recognize a transition, for example, and thus impossible to diagram transitions in the system. Similarly, the loss of critical data such as the Correlation i.d. makes it impossible to draw a tree of events.

It will be understood by one of ordinary skill that other options for ensuring that a source and a target can appropriately identify themselves are possible.

Triggers

FIG. 7 illustrates in schematic fashion how events selected by a user are monitored. Triggers enable the VSA user to watch for a selected condition or error to occur. In many cases, a developer knows that an error will occur, but he or she doesn't know exactly when it will occur. The present invention allows the developer to set a trigger for collecting data in these situations.

Triggers can be set either for conditions for which an IEC creates an event, such as "a COM event in Machine A", or for conditions for which a DEC creates an event, such as PerfMon data reflecting CPU utilization.

The user can use Boolean operators, for example "OR" and "AND", to specify a set of two or more trigger conditions to watch. For example, a client can request to be alerted when a first designated CPU utilization OR a second designated CPU utilization exceeds 75%. Alternatively, an alert could happen when CPU utilization exceeded 75% AND disk utilization was less than 10%, potentially highlighting the need to obtain additional processing power.

A developer can also specify a first filter for "normal" event-monitoring, and a second filter (which can be more detailed or comprehensive than the first filter) to apply when the trigger condition occurs. A "filter" is a way in which the system user can specify what is to be monitored in the system under examination. Filters will be discussed in greater detail below in the sub-sections entitled "Filter Reduction", "Filter Combination", and "Filter Specification".

In FIG. 7 an LEC 192 is depicted monitoring an application 190. Events created by IECs and DECs (not illustrated in FIG. 7) are collected by LEC 192. Upon the occurrence of a trigger condition, LEC 192 dumps the events to the VSA 100 or else signals an alert to the VSA 100.

While watching for one or more trigger condition(s), event monitoring continues as usual, but data only requested by the trigger filter is not logged, while data requested by the monitoring filter continues to be logged as normal.

While waiting for a trigger condition to occur, events are retained transiently by the LEC 192 in a circular buffer whose size can be specified by VSA 100. For example, VSA 100 can specify that the buffer store 500 events, so when the $501^{st}$ event comes in, the first event is written over.

When the user's specified trigger condition is detected, the LEC 192 can immediately transmit all of the buffered events to the VSA 100 for logging. These provide data about the application prior to the failure or other condition. In addition, the LEC 192 can start collecting more events at a higher rate (in accordance with the second filter, for example) which events provide additional detailed information.

VSA 100 can also specify a reset condition, either as part of the second filter or as a separate filter. When the reset condition is met, the LEC 192 returns to the low-impact minimal collection condition specified by the first filter and once again monitors for a trigger condition.

It will be apparent to one of ordinary skill in the art that suitable data compression techniques can be applied to increase the efficiency of the event buffering and data transmission aspects of the invention. Data compression can be used both for storing events and for sending large quantities of events or event-related data through the data processing system.

Data Security

Information that is processed by a system performance analysis tool is likely to be confidential. Like any debugging tool, the VSA should ensure that the debuggability of the system cannot become a security hole. Additionally, VSA debugging is a shared resource in a distributed environment. As such, it is important that proper security precautions be taken to prevent malicious users from obtaining this data.

The invention provides a secure environment for data collection through the use of discretionary access controls. These access controls can be applied, at the discretion of the user, to the collection of data from a specific machine, to the monitoring of specific entities, and to the collection of specific events.

In one aspect of the invention VSA 100 is implemented as a DCOM server which can be configured to run as any identity, so it can control the resources and information it has access to. In addition, the server can run in a Windows NT authenticated domain, so that access to the server can be controlled by discretionary access controls based on authentication identities.

It will be apparent to one of ordinary skill in the art that discretionary access enforcement can be based on the processes desired to be monitored effectively. It will also be apparent to one of ordinary skill in the art that suitable encryption techniques can be employed to enhance security within the VSA. Since DCOM is used to communicate with the server, standard RPC encryption can be used. In addition, the use of COM's custom marshalling allows for any virtually any type of encryption technology to be used.

Filter Reduction

Figure 8:
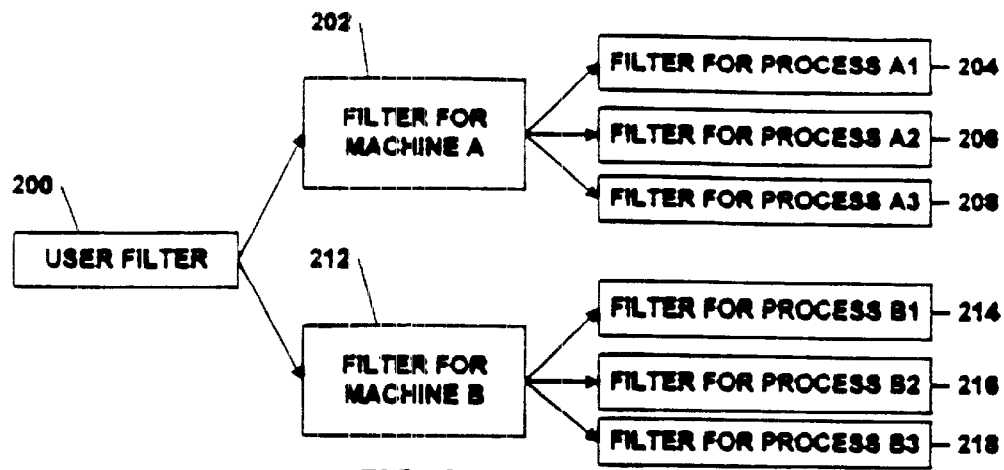
FIG. 8 illustrates a process of filter reduction as used within an exemplary embodiment of the invention.

FIG. 8 illustrates a process of filter reduction as used within an exemplary embodiment of the invention. First, the use of filters within the context of the invention will be discussed. VSA users specify the desired information to monitor via a User Filter 200. That is, a filter defines what information the VSA will collect and analyze. Users can specify this information in a "system" scope, for example, "All COM and ADO events from Machines A and B". In addition to directing a filter to a machine, a filter can be directed to a process, component (e.g. ADO), IEC, DEC, event, thread, or to multiples or combinations of the foregoing.

The user filter 200 can comprise a filter 202 for Machine A, which in turn can comprise filters 204, 206, 208 for Processes A1, A2, A3, respectively. Likewise user filter 200 can comprise a filter 212 for Machine B that in turn comprises filter 214, 216, 218 for Processes B1, B2, B3, respectively.

A filter can generally be expressed as a single Boolean expression in a set of unbound variables. These variables communicate to the data provider with events, and to the event sources and their categories. Using the example above, the filter would be (Machine=A OR Machine=B) AND (EventSource=COM OR EventSource=ADO).

Filter reduction is a process employed by the VSA to extract portions of a filter relevant to specify a specific portion of the monitoring infrastructure. Using the previous example, the filter would be reduced by "Machine A" and then "Machine B" to determine the filter fragments that are specific to each machine. These fragments are transmitted to the LECs. The LECs, in turn, reduce the filter by the registered entities/processes on the system. The result is a filter fragment that can be used to determine if a specific data source is enabled or disabled. This information is communicated to the IECs to provide the efficient IsActive function.

Filter reduction is the process of modifying or creating a new version of a Boolean expression by binding a subset of the variables within the expression. For example, if the example filter above is sent to machine C, the Machine=A clause can be reduced to FALSE, and the Machine=B clause can be reduced to FALSE. Since the expression "FALSE AND anything" is FALSE, the whole expression evaluates to FALSE for machine C, meaning that all collection infrastructure on machine C can be deactivated.

Another example of filter reduction would be to reduce the example filter ("All COM and ADO events from Machines A and B") by "Machine =A". This results in the filter "EventSource=COM OR EventSource=ADO". Thus the result of this filter reduction is a Boolean expression, not just a TRUE or FALSE expression.

The LECs also make use of a specialized form of filter reduction to determine which dynamic data is desired. Collection and transmission of dynamic data is expensive, and a filter is scanned for clauses that specifically refer to the dynamic information that is required.

The VSA is communicating with multiple LECs, and to operate efficiently it reduces the filter from a global scale down to a filter for a particular machine. What goes into an LEC is that portion of the filter that pertains to a particular machine.

At the next level the LEC breaks the information into pieces which are germane to each IEC to identify whether or not that IEC should be turned on or off. So filter reduction occurs on at least two levels. The first level of filter reduction occurs at the VSA itself. The second level occurs at the LEC, which decides which IEC to turn on or off. It will be apparent to one of ordinary skill in the art that a third level could be at the IEC level.

If at any point in the reduction the VSA determines that the filter is guaranteed to be False for a given machine, the collection mechanism is turned off on that machine. If a filter specifying "Machine=A and Process=7" is sent to Machine B, it's just False. Data collection for Machine B is left off and not turned on, which lets Machine B operate more efficiently. On Machine A the collection mechanism is left off for everything except Process 7. This is similar to binding variables in a Boolean expression. If it's either True or False, you know what to do. But if it's undefined, you have to send the expression further down the chain. This feature applies to processes and components as well. It will be apparent to one of ordinary skill in the art that it could be applied to any level, from the machine level down to the thread level.

A machine-specific filter can be broadcast to a given machine. Generally, the reduction is performed at the client machine, and then the reduced filter is broadcast to specific machines. Again, it will be apparent to one of ordinary skill in the art that specific filters can be applied to any level.

A third level of filter reduction can occur in the DEC. The DEC can specify exactly what pieces of information are being looked for. For example, an event monitoring application such as PerfMon can collect about 7000 pieces of information, and it's very expensive to collect each one. So the filter needs to be reduced further by identifying exactly which pieces of information to collect. In the VSA user interface, the user can, if desired, be constrained to select PerfMon events a certain way, so they can't select them in complex Boolean expressions. When the filter makes its way through the network to the right creator, those PerfMon expressions are specifically referenced to the filter and collect exactly those expressions.

That combination of constraint in the VSA user interface and appropriate analysis of the results means that the VSA collects only those things specifically asked for in the dynamic case. This is important because every time a dynamic event is timed, one event can be fired every half second or every second, meaning a lot of events are fired. This can overwhelm the system infrastructure. So a filter reduction system is applied to the events that are initiated by the application. And extra reduction can be applied to events which are initiated by PerfMon. This could also be done for events at the IEC if desired.

Filter Combination

Figure 9:
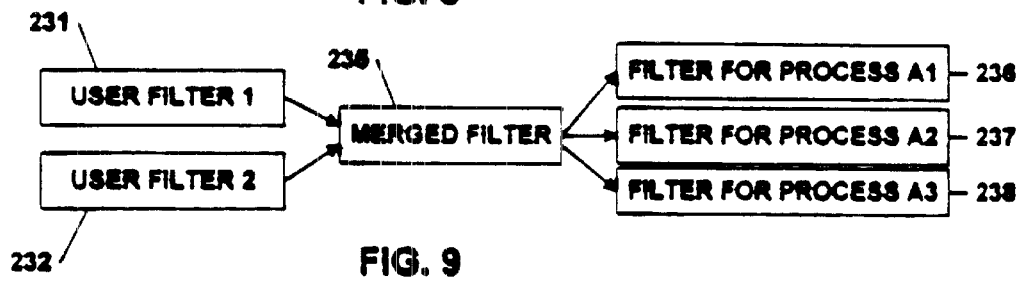
FIG. 9 illustrates a process of filter combination as used within an exemplary embodiment of the invention.

FIG. 9 illustrates a process of filter combination as used within an exemplary embodiment of the invention. It is possible, and likely, that multiple users will be monitoring applications running on shared servers. When this occurs, multiple filters can be issued to the same LEC. To ensure the most efficient collection, the LEC can combine all of the filters prior to performing the entity/process reduction.

With reference to FIG. 9, a first user generates user filter 1 in box 231, while a second user generates user filter 2 in box 232. These filters are combined by the LEC into a merged or combined filter 235, which in turn applies a filter for process A1 in box 236, a filter for process A2 in box 237, and a filter for process A3 in box 238. The filters are reduced after they have been combined.

Appropriate IECs and DECs then monitor and collect events in accordance with the combined filter. One or more LECs, depending upon whether the items being monitored are on one or multiple machines, collect events from the IECs and DECs, in accordance with the combined filter, and send them to their respective requesting users, who may be on a single control station or at multiple control stations.

Figure 10:
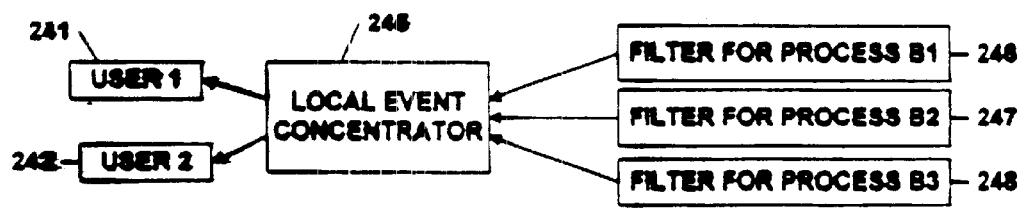
FIG. 10 illustrates another process of filter combination as used within an exemplary embodiment of the invention.

FIG. 10 illustrates another process of filter combination as used within an exemplary embodiment of the invention. With reference to FIG. 10, filters for processes B1–B3 in boxes 246–248, respectively, are combined in LEC 245 and passed on to users 1 and 2 in boxes 241 and 242, respectively.

When events are collected by the LEC 245 from different sources within the data processing system under examination, it determines which clients are interested and routes the events to the respective clients who specified that the events be monitored. Because of the efficient and flexible nature of the filters, and the general-case nature of the reduction process described above, monitoring and collection from multiple machines imposes no extra performance overhead. Performance is simply as if all the monitoring were happening from a single machine.

Filter Specification

Figure 11:
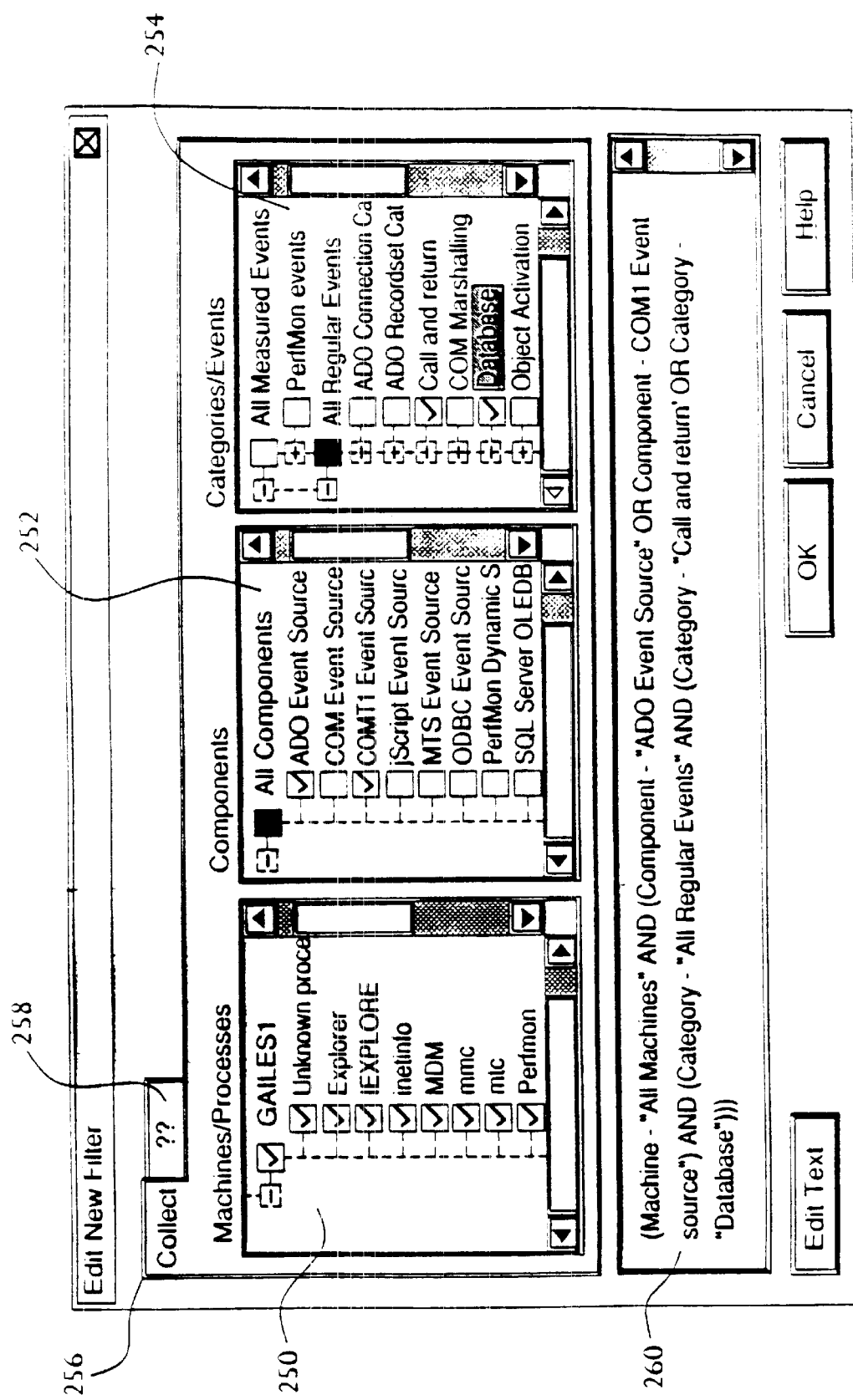
FIG. 11 illustrates a screen print of an exemplary user interface for specifying a filter.

FIG. 11 illustrates a screen print of an exemplary user interface for specifying a filter. The VSA provides a large number of events that can be monitored. Consequently, an efficient mechanism is provided for the user to specify desired event data. The user interface (UI) of the invention provides a quick, easy graphical way for the user to specify the desired queries.

In the graphical UI, users are presented with three trees, each appearing in a separate window 250, 252, 254, that represents the key information: a Machines/Processes window 250, a Components window 252, and a Categories/Events window 254. The Machines/Processes window 250 presents all of the machines being monitored and the processes on the machines. The Components window 252 presents the registered VSA data sources on the machines being monitored. The Categories/Events window 254 identifies all of the registered VSA events that can be monitored. These can be organized hierarchically in a pre-defined structure, but the user can tailor it to his or her own structure and define his or her own events to be monitored.

It will be apparent to one of ordinary skill in the art that process threads could constitute another level of filter specification.

Event sources are required to pre-register which events they can emit when they are installed, and this information is transmitted at startup from the LEC to the central machine. By selecting the "Collect" tab 256, the user can quickly select the desired information to analyze. More complex queries can be generated by creating groups of selections using the "OR" tab 258. As the user makes selections, a textual representation of the query, appearing in text window 260, is dynamically generated in synchronism with the graphical depiction in windows 250, 252, and 254, so the user can verify his or her selection, and understand its behavior. Finally, the user can specify very sophisticated filter queries by entering the filter directly as text in text window 260.

The tree-oriented part of the user interface allows highly complex filters to be created without a user having to understand the specific syntax or functionality. The system takes advantage of the fact that users have built-in understanding about the "rational" Boolean operators that are used to combine clauses ("OR" for bindings of the same variable, "AND" for bindings of independent variables). The same filter mechanism and user interface are used to both specify what to analyze and to refine the data which has been collected and which is presented to the user. VSA 100 analyzes data both as events are collected as well as after they have been collected. That is, users can filter already collected data, in a "post mortem" fashion, to create analysis reports of specific elements of the data without having to recollect the data.

The user can additionally specify debug and/or trace switches. These are run-time switches. They have a filter to determine the appropriate targets. Components, for example, can access the name/value pairs using the same interface as the IsActive and FireEvent status conditions.

Thus a user can chose which events to monitor. Boolean operators can be applied both within the windows and between the windows. Generally OR's are used within the windows, while AND's are used between the windows. In addition, the UI can enable the user to chose from a pre-defined list of the "top N" filters or queries, so that the user can quickly select from the top N.

Location of APIs

Figure 12:
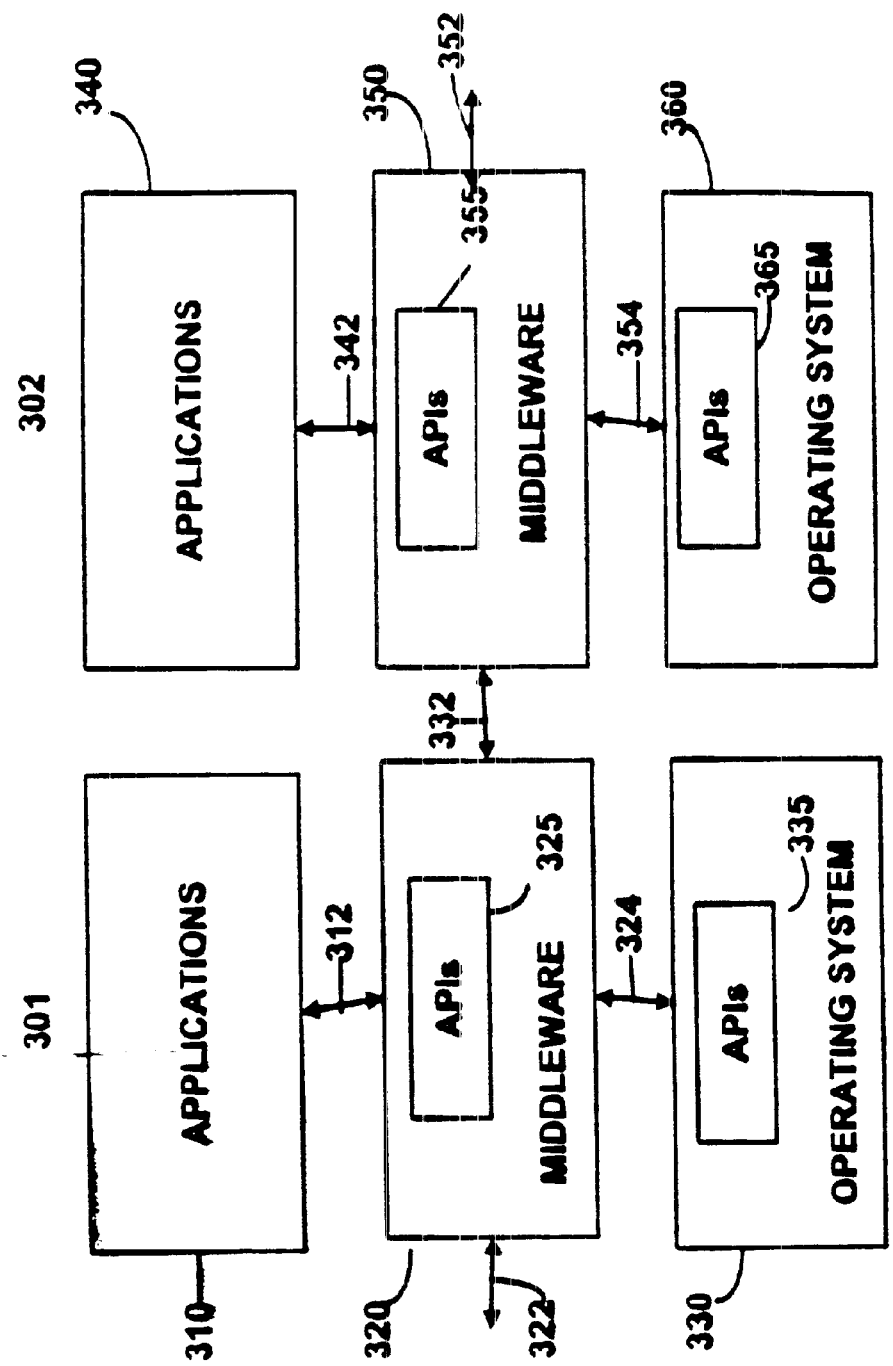
FIG. 12 illustrates a system level overview of an exemplary embodiment showing where APIs of the present invention can appear within the software architecture of a distributed computing system.

FIG. 12 illustrates a system level overview of an exemplary embodiment showing where APIs of the present invention can appear within the software architecture of a distributed computing system.

In a generalized and slightly over-simplified manner, the software architectures for two separate data processing system 301 and 302 are illustrated. Systems 301 and 302 each comprise a plurality of applications, represented by 310 and 340, respectively. Systems 301 and 302 additionally each comprise software referred to as "middleware" identified by reference numbers 320 and 350, respectively, and they each comprise operating system software 330 and 360, respectively. The above-described software executes in the processor(s) of data processing systems 301 and 302, the application programs running under the control of their corresponding operating systems.

It will be understood that applications 310, 340, middleware 320, 350, and the operating system software 330, 360 can be entirely local to the data processing system 301 or 302, or they can be distributed among data processing systems 301, 302, and additional data processing systems (not shown but implied by busses 322 and 342).

Systems 301 and 302 can communicate with each other over bus 332. Systems 301 and 302 can communicate with other systems (not shown) over busses 322 and 352, respectively.

Each system 301 and 302 comprises APIs located in either the middleware or the operating system or in both. In a currently implemented embodiment, APIs are located in both. In order to facilitate utilization of the performance analysis tools of the present invention by software developers, APIs are provided to give a wide variety of functions, in the form of software modules and components, in common to a broad spectrum of applications. Any one application typically uses only a small subset of the available APIs. Providing a wide variety of APIs frees application developers from having to write code that would have to be potentially duplicated in each application.

The APIs of the present invention offer the application developer ready access to the built-in performance analysis functions appearing in the middleware and operating system portions of the software architecture.

In the next section, various APIs are presented which allow applications to interface with various modules and components of the networking and operating system environment in order to implement the performance monitoring and analysis features of the invention.

Exemplary APIs and their Functions

This section presents and describes exemplary APIs relating to the performance monitoring and analysis features of the invention. It will be understood that these APIs are embodied on a computer-readable medium for execution on a computer in conjunction with an operating system or with middleware that interfaces with an application program having one or more event-generating components.

The APIs will first be described in functional terms. One or more applications, e.g. applications identified generally by reference number 310 or 340 in FIG. 12 are assumed to be running under the control of an operating system, e.g. operating system 330 or 360. With respect to any one application program, in particular, the application can have any of a number of event-generating components. The application program utilizes APIs (such as APIs 325 or 355 located in middleware 320 or 350, respectively, or APIs 335 or 365 located within operating systems 330 or 360, respectively) associated with the event-generating component which operate to receive data from the operating system and to send data to the operating system.

This set of APIs includes a first interface that enables the operating system to set or disable a status condition ("IsActive") in the application, and it further includes a second interface that receives a status query from the operating system and that returns the status (True or False) of the status condition to the operating system.

The set of APIs includes an interface that enables the operating system to read any one or more of several fields in the application. These fields include arguments, causality i.d., correlation i.d., dynamic event data, exception, return value, security i.d., source component, source handle, source machine, source process, source process name, source session, source thread, target component, target handle, target machine, target process, target process name, target session, and target thread.

Now from the point of view of an operating system, consider that an operating system can have an event-registering or event-collecting component. The APIs also include an interface that enables the operating system to query whether a status condition ("IsActive") is set or disabled in the application, and they further include an interface that returns data to the operating system only if the status condition is set.

The APIs detailed below are described in terms of the C/C++ programming language. However, the invention is not so limited, and the APIs can be defined and implemented in any programming language, as those of ordinary skill in the art will recognize. Furthermore, the names given to the API functions and parameters are meant to be descriptive of their function. However, other names or identifiers could be associated with the functions and parameters, as will be apparent to those of ordinary skill in the art.

Four sets of APIs are presented: APIs for generating events (C interface), APIs for generating events (automation binding), APIs for registering events and sources (C binding), and APIs for registering events and sources (automation binding).

APIs for generating events used by applications that interface with the performance analysis functions of the present invention are presented below, both for C interface and for automation binding.

APIs for Generating Events (C Interface):

```
HRESULT BeginSession(
    [in] REFGUID guidSourceID,
    [in] LPCOLESTR strSessionName
);
HRESULT EndSession(
);
HRESULT IsActive(
);
typedef [v1_enum] enum VSAParameterType {
    cVSAParameterKeyMask= 0x80000000,
    cVSAParameterKeyString=0x80000000,
    cVSAParameterValueMask=0x0007ffff,
    cVSAParameterValueTypeMask=0x00070000,
    cVSAParameterValueUnicodeString=0x00000,
    cVSAParameterValueANSIString=0xx0000,
    cVSAParameterValueGUID=0x20000,
    cVSAParameterValueDWORD=0x30000,
    cVSAParameterValueBYTEArray=0x40000,
    cVSAParameterValueLengthMask=0xffff,
} VSAParameterFlags;
typedef [v1_enum] enum VSAStandardParameter {
    cVSAStandardParameterDefaultFirst=0,
    cVSAStandardParameterSourceMachine=0,
    cVSAStandardParameterSourceProcess=1,
    cVSAStandardParameterSourceThread=2,
    cVSAStandardParameterSourceComponent=3,
    cVSAStandardParameterSourceSession=4,
    cVSAStandardParameterTargetMachine=5,
    cVSAStandardParameterTargetProcess=6,
    cVSAStandardParameterTargetThread=7,
    cVSAStandardParameterTargetComponent=8,
    cVSAStandardParameterTargetSession=9,
    cVSAStandardParameterSecurityIdentity=10,
    cVSAStandardParameterCausalityID=11,
    cVSAStandardParameterSourceProcessName=12,
    cVSAStandardParameterTargetProcessName=13,
    cVSAStandardParameterDefaultLast=13,
    cVSAStandardParameterNoDefault=0x4000,
    cVSAStandardParameterSourceHandle=0x4000,
    cVSAStandardParameterTargetHandle=0x4001,
    cVSAStandardParameterArguments=0x4002,
    cVSAStandardParameterReturnValue=0x4003,
    cVSAStandardParameterException=0x4004,
    cVSAStandardParameterCorrelationID=0x4005,
    cVSAStandardParameterDynamicEventData=0x4006,
    cVSAStandardParameterNoDefaultLast=0x4006
} VSAStandardParameters;
typedef [v1_enum] enum eVSAEventFlags {
    cVSAEventStandard=0,
    cVSAEventDefaultSource=1,
    cVSAEventDefaultTarget=2,
    cVSAEventForceSend=8
} VSAEventFlags;
HRESULT FireEvent(
    [in] REFGUID guidEvent,
    [in] int nEntries,
    [in, size_is(nEntries)] LPDWORD rgKeys,
    [in, size_is(nEntries)] LPDWORD rgValues,
    [in, size_is(nEntries)] LPDWORD rgTypes,
    [in] DWORD dwTimeLow,
    [in] LONG dwTimeHigh,
    [in] VSAEventFlags dwFlags
);
}
```

"BeginSession" is called by an entity before it fires events to register its entity and instance names (source and session).

"EndSession" is called by an entity after it completes firing events.

"IsActive" is called by an entity which is considering firing events and wishes to know if anyone is listening.

"FireEvent" fires an actual event from an entity.

| APIs for Generating Events (Automation Binding): |
| --- |
| HRESULT BeginSession(<br>    [in] BSTR guidSourceID,<br>    [in] BSTR strSessionName<br>);<br>HRESULT EndSession(<br>);<br>HRESULT IsActive(<br>    [out] VARIANT_BOOL *pbIsActive<br>);<br>HRESULT FireEvent(<br>    [in] BSTR guidEvent,<br>    [in] VARIANT rgKeys,<br>    [in] VARIANT rgValues,<br>    [in] long rgCount,<br>    [in] VSAEventFlags dwFlags<br>);<br>} |

The comments for the above set of "APIs For Generating Events" are the same as for the C Interface APIs preceding them.

APIs for registering events and sources used by applications that interface with the performance analysis functions of the present invention are presented below, both for C interface and for automation binding.

| APIs for Registering Events and Sources (C Interface): |
| --- |
| HRESULT RegisterSource(<br>    [in] LPCOLESTR strVisibleName,<br>    [in] REFGUID guidSourceID<br>);<br>HRESULT IsSourceRegistered(<br>    [in] REFGUID guidSourceID<br>);<br>HRESULT RegisterStockEvent(<br>    [in] REFGUID guidSourceID,<br>    [in] REFGUID guidEventID<br>);<br>HRESULT RegisterCustomEvent(<br>    [in] REFGUID guidSourceID,<br>    [in] REFGUID guidEventID,<br>    [in] LPCOLESTR strVisibleName,<br>    [in] LPCOLESTR strDescription,<br>    [in] long nEventType,<br>    [in] REFGUID guidCategory,<br>    [in] LPCOLESTR strIconFile,<br>        [in] long nIcon<br>);<br>HRESULT RegisterEventCategory(<br>    [in] REFGUID guidSourceID,<br>    [in] REFGUID guidCategoryID,<br>    [in] REFGUID guidParentID,<br>    [in] LPCOLESTR strVisibleName,<br>    [in] LPCOLESTR strDescription,<br>    [in] LPCOLESTR strIconFile,<br>    [in] long nIcon<br>);<br>HRESULT UnRegisterSource(<br>    [in] REFGUID guidSourceID<br>);<br>HRESULT RegisterDynamicSource( |

| APIs for Registering Events and Sources (C Interface): |
| --- |
|     [in] LPCOLESTR strVisibleName,<br>    [in] REFGUID guidSourceID,<br>    [in] LPCOLESTR strDescription,<br>    [in] REFGUID guidClsid,<br>    [in] long inproc);<br>HRESULT UnRegisterDynamicSource(<br>    [in] REFGUID guidSourceID);<br>HRESULT IsDynamicSourceRegistered(<br>    [in] REFGUID guidSourceID);<br>}; |

"RegisterSource" is called by code that is installing a new event-generating entity on a machine.

"IsSourceRegistered" detects if an event-generating entity is present.

"RegisterStockEvent" is called by an event-generating entity to note its use of a system event.

"RegisterCustomEvent" is called by an event-generating entity to note its definition of a custom event.

"RegisterEventCategory" is called by an event-generating entity to note its definition of a custom event category.

"UnRegisterSource" is called by code that is uninstalling an event-generating entity.

"RegisterDynamicSource" is called by code that is installing a DEC (dynamic event-generating entity).

"UnRegisterDynamicSource" is called by code that is uninstalling a DEC (dynamic event-generating entity).

"IsDynamicSourceRegistered" detects if an event-generating entity is present.

| APIs for Registering Events and Sources (Automation Binding): |
| --- |
| HRESULT RegisterSource(<br>    [in] BSTR strVisibleName,<br>    [in] BSTR guidSourceID<br>);<br>HRESULT IsSourceRegistered(<br>    [in] BSTR guidSourceID,<br>    [out] VARIANT_BOOL *pbIsRegistered<br>);<br>HRESULT RegisterStockEvent(<br>    [in] BSTR guidSourceID,<br>    [in] BSTR guidEventID<br>);<br>HRESULT RegisterCustomEvent(<br>    [in] BSTR guidSourceID,<br>    [in] BSTR guidEventID,<br>    [in] BSTR strVisibleName,<br>    [in] BSTR strDescription,<br>    [in] long nEventType,<br>    [in] BSTR guidCategory,<br>    [in] BSTR strIconFile,<br>    [in] long nIcon<br>);<br>HRESULT RegisterEventCategory(<br>    [in] BSTR guidSourceID,<br>    [in] BSTR guidCategoryID,<br>    [in] BSTR guidParentID,<br>    [in] BSTR strVisibleName,<br>    [in] BSTR strDescription,<br>    [in] BSTR strIconFile,<br>    [in] long nIcon<br>);<br>HRESULT UnRegisterSource(<br>    [in] BSTR guidSourceID<br>);<br>HRESULT RegisterDynamicSource( |

-continued

| APIs for Registering Events and Sources (Automation Binding): |
| --- |
|     [in] BSTR strVisibleName,<br>    [in] BSTR guidSourceID,<br>    [in] BSTR strDescription,<br>    [in] BSTR guidClsid,<br>    [in] long inproc);<br>HRESULT UnRegisterDynamicSource(<br>    [in] BSTR guidSourceID);<br>HRESULT IsDynamicSourceRegistered(<br>    [in] BSTR guidSourceID,<br>    [out] VARIANT_BOOL *boolRegistered);<br>}; |

The comments for the above set of "APIs For Registering Events and Sources" are the same as for the C Interface APIs preceding them.

The APIs for registering events and sources (C interface/automation binding) can be used by an application to register which events can be generated by a data source. These APIs turn on and off such registration. They also specify whether the registration is a pre-defined, standard event or a custom event. They can also specify the event category, and they can determine whether a source is registered or not.

Automatic Generation of Animated Application Model

Figure 13:
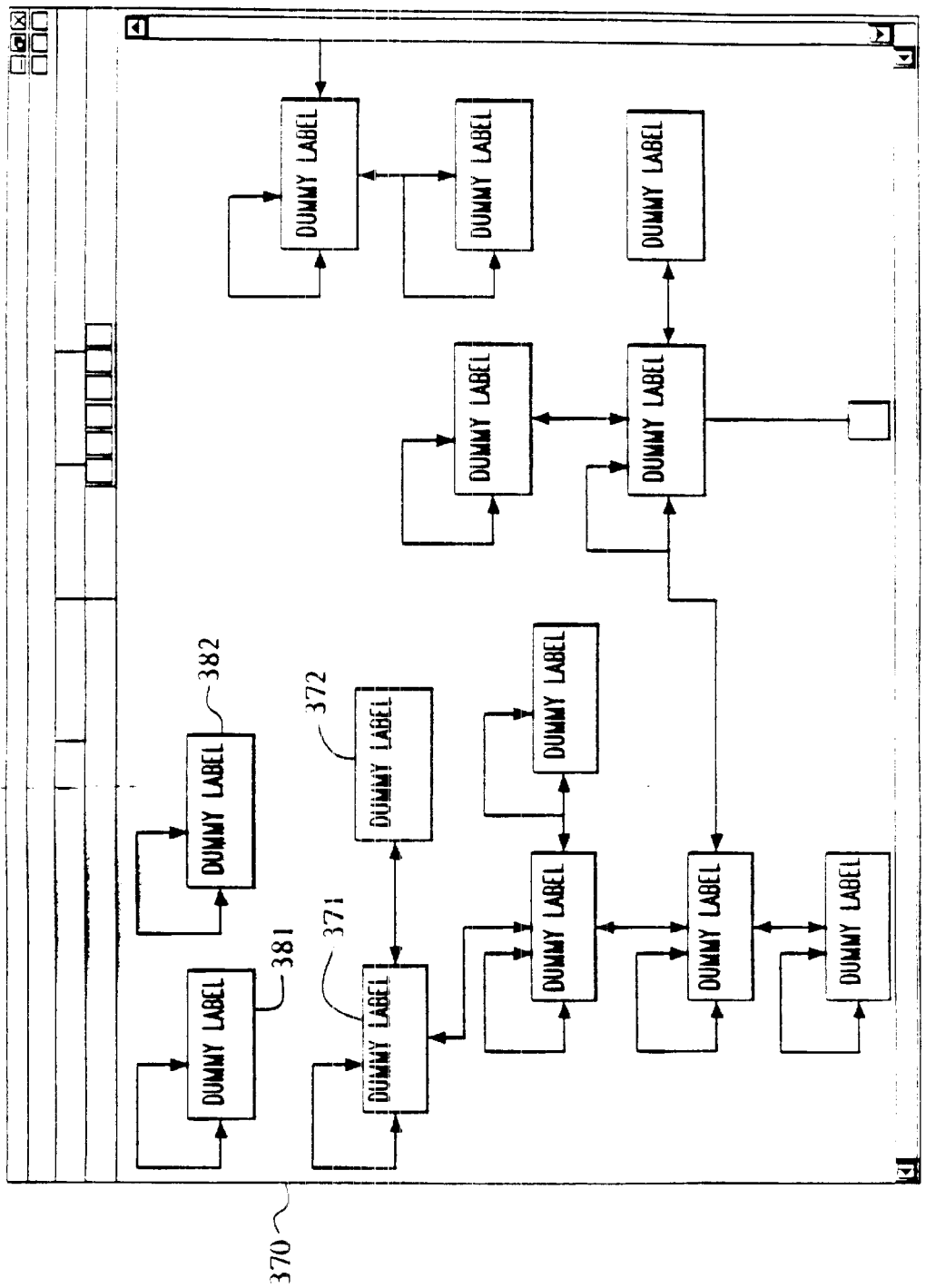
FIG. 13 illustrates a screen print of an animated application model which the present invention generates to show the structure and activity of an application whose performance is being studied.

FIG. 13 illustrates a screen print of an animated application model which the present invention generates to show the structure and activity of an application whose performance is being studied. An important innovation in the VSA's analysis function is its ability to dynamically generate diagrams of the functionally active structure of the application.

The VSA creates the application diagrams by closely examining the event data that is received. As explained above, events are correlated by the VSA to understand the flow of control. The data design described above makes it possible to understand which events need to be correlated and how they should be grouped and connected.

Correlation makes use of the source and target information specified in the event data. When insufficient information is present, additional heuristics can be used to extrapolate the event flow. This includes time-ordering, COM causality information, and event handles.

With reference to the screen print 370 of FIG. 13, the functional interrelationship among blocks such as blocks 371 and 372 is visually depicted. (It will be understood by one of ordinary skill in the art that, while all blocks in FIG. 13 are depicted with dummy labels, in practice each block will bear an appropriate label in accordance with that block's function or place within the performance model.) It will also be understood by one of ordinary skill that many other forms of visual portrayal of the application performance model can be used.

As new diagram elements are identified, they are added to the user's screen 370. Frequently sufficient information is not available to immediately connect them to other entities on the diagram. This is the case with blocks 381 and 382 in FIG. 13. As data becomes available, the entities are connected.

This application model diagram is highly interactive. Selections made in other VSA windows can result in selections in the diagram. Incoming events are directly animated into the diagram. Diagram blocks can be expanded or collapsed to show more or less detail.

To support this interactive behavior, the diagram data structures use a network of linked mapping tree data structures to efficiently understand the impact of new data, and to determine the blocks required to be added or removed when more data arrives.

Incomplete information is stored specially, and when other incomplete data arrives, there is an attempt to pair up the incomplete data using pre-defined heuristics and the data design described above.

Because the internal storage of the diagram only stores blocks and their connections, it is very space efficient. In normal scenarios storage space does not grow very fast proportionate to the number of events that have been viewed.

Figure 14:
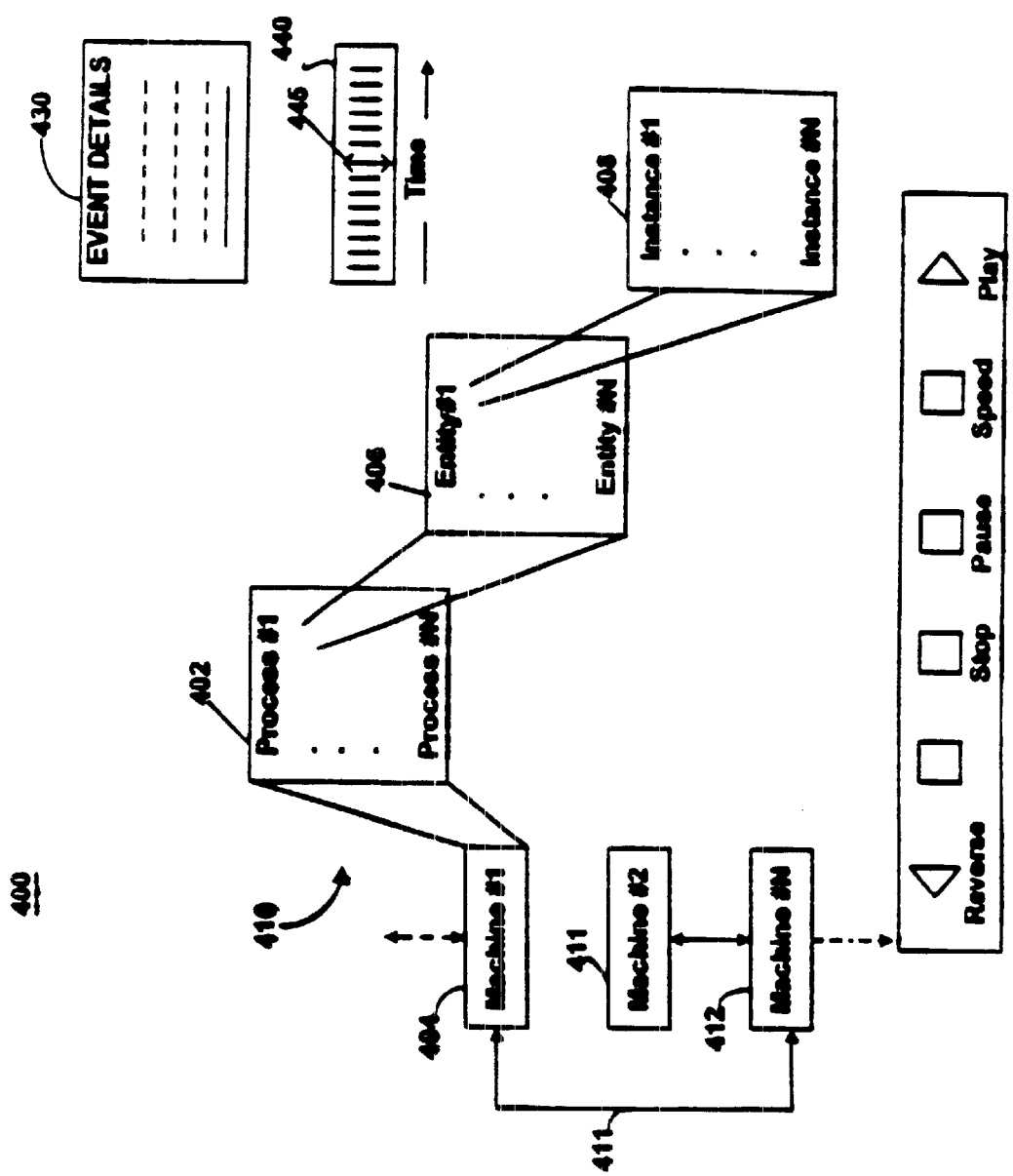
FIG. 14 illustrates various user interface features of an animated application model in an exemplary embodiment of the invention.

FIG. 14 illustrates various user interface features of an animated application model in an exemplary embodiment of the invention. The user interface features are shown generally by reference number 400. In the UI depicted in FIG. 14, diagrams are portrayed of the different blocks representing varying levels of detail of a hierarchical model of the application.

As shown in FIG. 14, four different types of diagrams are available representing varying levels of detail: machines, processes, data sources, entities, and instances. Users can expand and collapse items on these diagrams to create the exact level of detail required. As well, the recorded event data can be depicted adjacent to the animated application model or overlaid upon it. In addition, using VCR-like commands, described below with reference to FIG. 14, users can play and replay the application execution, stop, pause, reverse, speed up, slow down, and so forth.

Merely by way of illustration, an animated application model, shown generally by reference number 410, includes a machine 404, which is shown coupled functionally to a machine 412, which in turn is coupled to a machine 411. Each machine 404, 411, 412 can, in turn, be coupled to other items (not shown).

A visual depiction of a first machine 404 can be "exploded" into its constituent processes, depicted by box 402. The user can further "drill" into a process, such as Process #1, to explode its constituent entities, depicted by box 406. Further, the user can drill into an entity, such as Entity #1, for example, to explode a view, depicted by box 408, showing the various Instances #1 through #N which are included in Entity #1.

The drill-in shown in FIG. 14 can be mixed in the same user screen. That is, a drill-in for machine 411 could show only its constituent processes, and a drill-in for machine 412 could show only its constituent processes plus the entities for one of the processes. So any individual box can be drilled down or up independently. In addition, the user can perform zooming, printing, and any other known screen operations.

The graphical UI includes a display and a user interface selection device, such as a keyboard or mouse. A model of the functionally active structure of the data processing system is displayed. Using the user interface selection device, a selection signal is generated with respect to a portion of the animated model, along with the user's expansion or contraction command. The VSA performs an expansion or contraction function on the selected portion in response to the selection signal and to the expansion or contraction command, and the selected portion is either exploded or contracted per the expansion or contraction command.

Behind this visual depiction of the application model, the VSA maintains a log of all of the events that have been collected.

The VSA utilizes a graphical UI paradigm in the form of a video cassette recorder (VCR) having, for example, Reverse, Stop, Pause, Speed, and Play commands. Other appropriate commands can be provided as indicated by an unlabeled button on the control panel. Using the VCR paradigm to control the depiction of the application performance, the VSA can run through each of the events and correspondingly animate the application model shown in FIG. 13 or FIG. 14. For example, if the current event is between Machine #1 and Machine #N, then a connection segment 411 is highlighted. Using the VCR commands, the user can change the speed, pause the display, and go backward and forward.

While the user is doing this, a separate, adjacent window 430 shows the event details. So while the event is occurring, and the application model diagram of FIG. 14 is being animated, the user can also view other pertinent performance details in window 430.

Also shown in FIG. 14 is an adjacent time line window 440 having equally spaced vertical lines throughout the time duration of an event. A special marker 445 moves from left to right through the vertical lines to show the progress of an event, either as the event occurs, or as the event is being played back by the user.

All of the windows are time-synchronized to one another.

Performance Analysis

Figure 15:
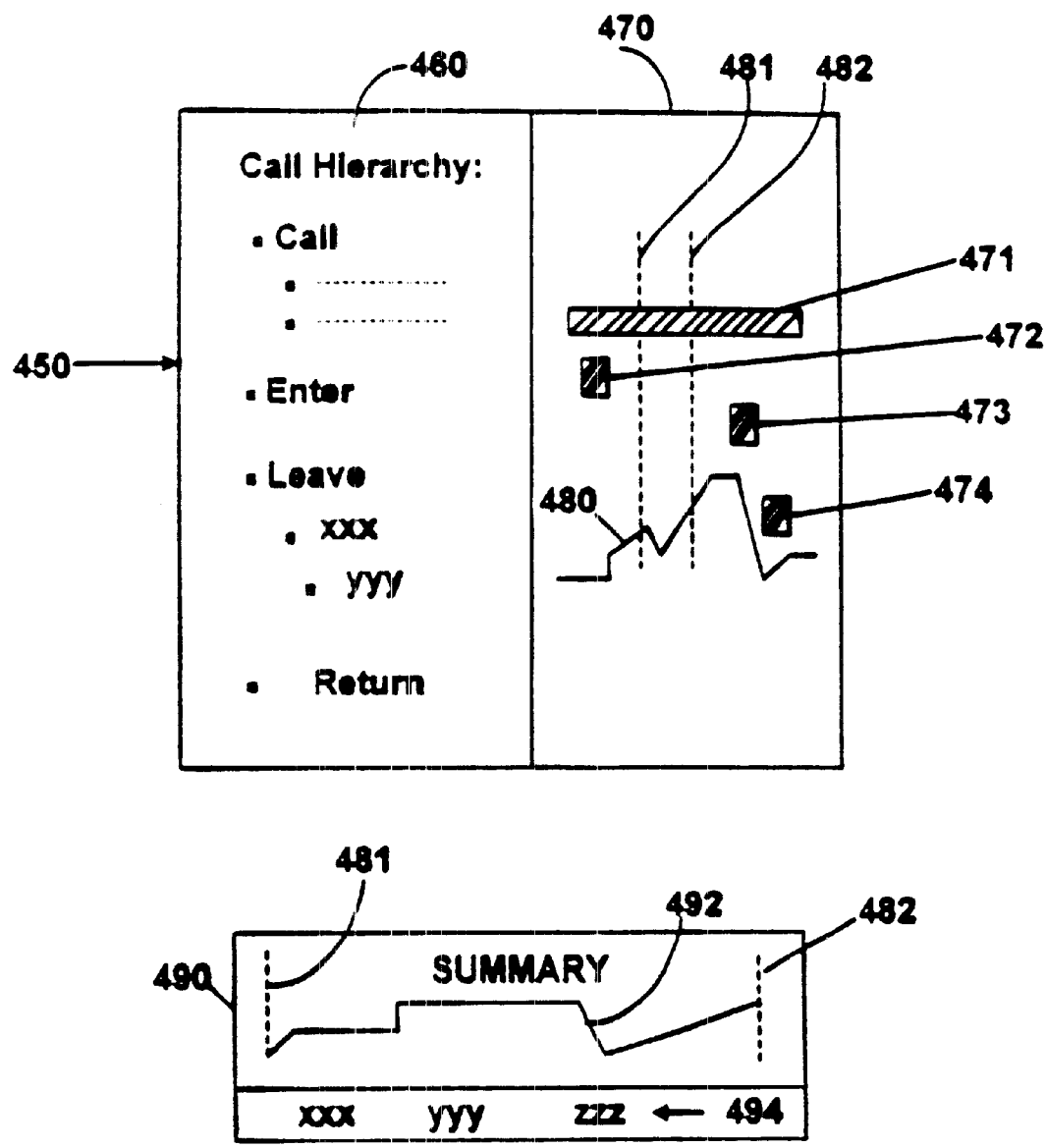
FIG. 15 illustrates a representative display of performance data in an exemplary embodiment of the invention.

FIG. 15 illustrates a representative display of performance data in an exemplary embodiment of the invention.

The VSA provides another important component for automatic analysis of collected data, the performance analysis component. The performance analysis component analyzes the collected data and creates a call tree by pairing events (e.g. Call and Return) and ordering them using temporal ordering and heuristics. The result is a presentation of the call tree in a Gantt style view with any Perfmon (or other dynamic) data displayed adjacent to or overlaying the displayed call tree. With this view, the VSA provides a mechanism to simultaneously view application and environmental performance information and quickly drill into the details (by expanding to another level in the call tree). When the VSA is used to track and graph load information, the VSA provides an innovative way for the user to view how applications perform, behave, and degrade under different load and stress scenarios.

Like the animated application model, the call tree is generated by the application of suitable pre-determined heuristics, since the user does not have any a priori knowledge of the call relationships of more than two objects. Temporal and contextual information, for example, are used to deduce a call tree without full information. It will be apparent to one of ordinary skill that other kinds of information can also be used to deduce a call tree.

With reference to FIG. 15, an upper window 450 includes a process summary portion 460 and a performance summary portion 470. The process summary portion 460 comprises a Call Hierarchy including Call, Enter, Leave, and Return events. Each of these events can contain sublevels, as shown for the Call event. It will be understood that the sublevels can be further subdivided to whatever degree is required, as shown for the Leave event. The user can expand or collapse the levels of detail for each of the events, as desired.

Each of the Call, Enter, Leave, and Return events can have a corresponding Gantt type of representation, as illustrated in performance summary portion 470, showing the duration of the event. For example, Gantt segment 471 represents the duration of the Call event. The duration of the Enter, Leave, and Return events are shown by Gantt segments 472, 473, and 474, respectively.

Performance summary portion 470 thus provides a GANTT-style presentation of the call tree, i.e. who calls whom. The GANTT bars 471–474 show when it started and how long the Call lasted. This information comes from the IEC.

Beneath the call tree performance summary, a graph 480 can be depicted to show, for example, the CPU utilization during the Call operation such as an RPC. Graph 480, which may be positioned adjacent to or overlaying the Gantt segments 471–474, could also illustrate any one or more other desired aspects of the system performance besides the CPU utilization. The Gantt chart can be based upon the application events. The graph can be selected from the time base.

Also shown in FIG. 15 is a summary window 490 which provides a distillation of what is shown in the performance windows 410 and 430 of FIG. 14 and in the upper window 450 of FIG. 15. For example, if the time slice between dashed lines 481 and 482 is selected for scrutiny, a summary performance graph 492 is generated for the selected time segment. Summary window 490 also contains a textual description of the application's performance during the specified time segment.

Thus the user can view a tightly synchronized, easily comprehensible graphical and textual analysis and representation of the application performance, in the form of the animated block diagram 410, the Event Detail window 430, and the Time Line window 440 of FIG. 14, as well as the process summary portion 460 and the performance summary portion 470 of FIG. 15. The summary window 490 ties everything together. Again, everything is time-synchronized.

In addition, all of the above windows can be operated to display the application performance in real time as well as "post mortem". This applies as well to the animated application models, as shown in the screen print of FIG. 13 and in window 410 of FIG. 14, so that in real time as an application is being analyzed, one block will appear, then another, and then the interconnection between the two blocks. Blocks are dynamically added, removed, and moved, and the interconnections between them are dynamically changed to reflect changing conditions in the execution of the application. The diagram is kept up to date with what is really happening.

Figure 16:
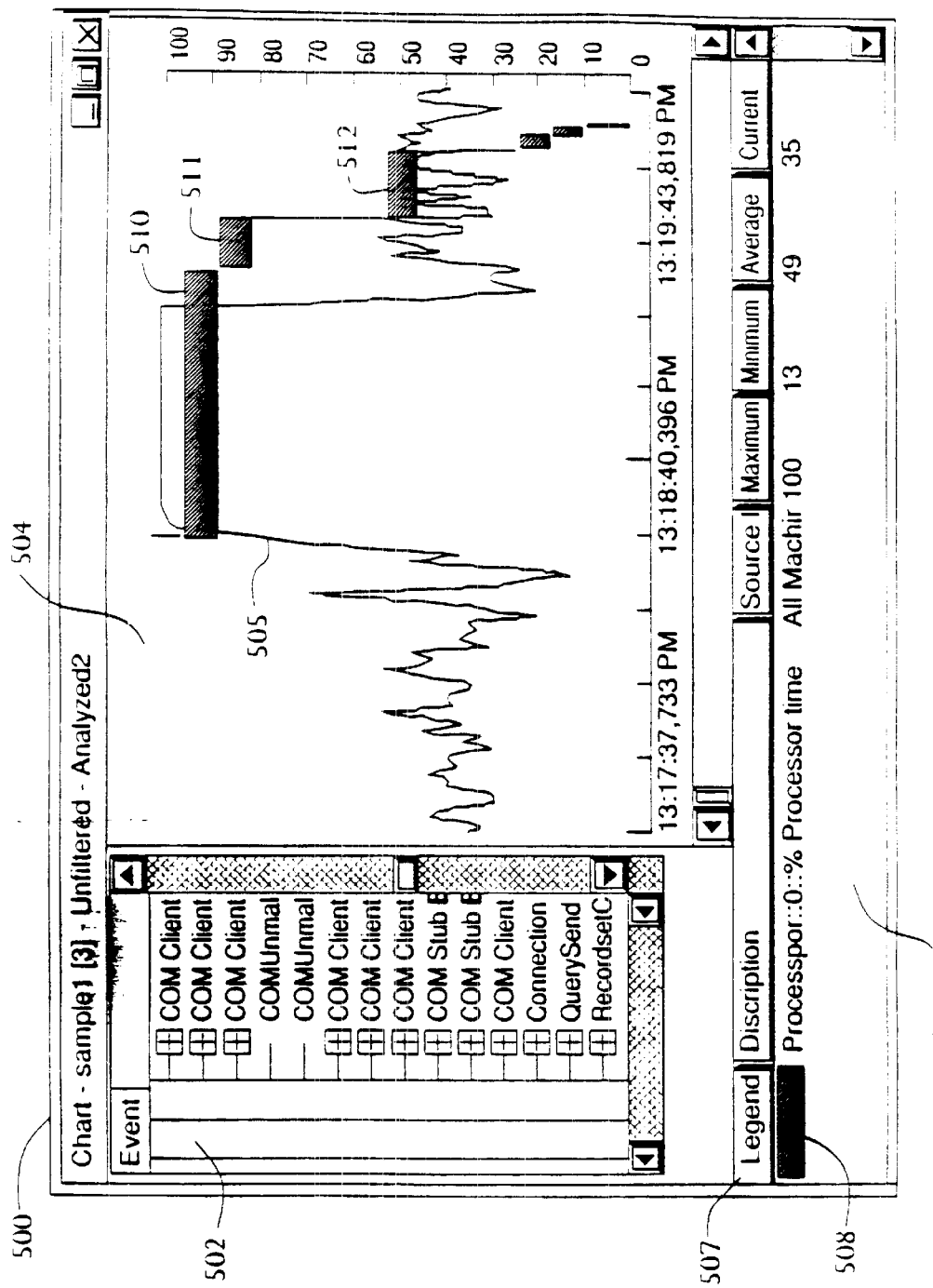
FIG. 16 illustrates a screen print of an exemplary display of performance data.

FIG. 16 illustrates a screen print 500 of an exemplary display of performance data. Screen print 500 depicts the percentage of CPU utilization for a selected group of processors. Window 504 shows a graph line 505 which, for example, depicts the percentage of CPU utilization (right-hand side) versus time (bottom side). In general, graph lines represent overlaid DEC data.

Window 502 depicts a list of events relating to the operation of the processors under scrutiny.

Window 506 depicts a legend or key to the information shown in window 504. Window 506 indicates the source machines (all) as well as summary performance information (a minimum of 13 processors, a maximum of 100 processors, and an average of 49 processors executing simultaneously; currently 35 processors concurrently executing). Window 506 also comprises a "legend" 507 which provides a color key 508 to assist the user in identifying graph lines in window 504, such as Gantt bars 510, 511, and 512, or graph line 505. While window 504 only shows one graph line 505, more can be shown. Window 506 provides an indication of the source machines, maximum, minimum, average, and current value for each graph line shown in window 504.

Additional Tools

The VSA provides a few other tools which, when used in conjunction with the features described above, provide additional insight into application performance.

Figure 17:
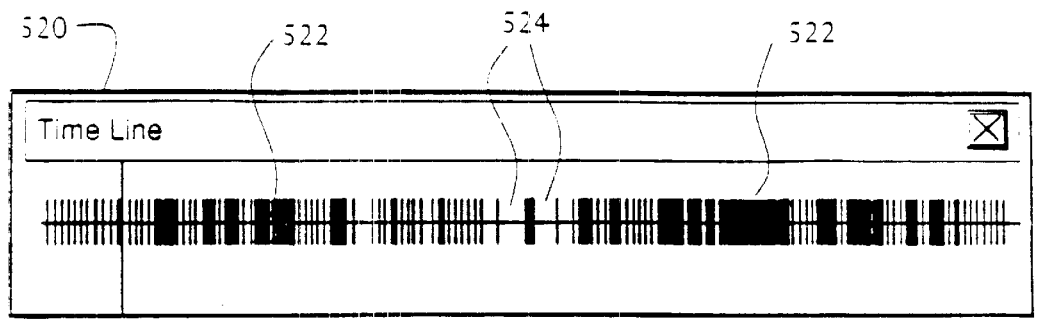
FIG. 17 illustrates screen print of a timeline display of performance data.

FIG. 17 illustrates a screen print 520 of a timeline display of performance data. The timeline window presents a visual representation of the timing of all related events. Dark clumps 522 represent tight groupings of events, while spaces 524 represent possible under utilization of resources. Timeline 520 can be annotated to present event activity per machine or per process (or other system resource) using different colors. This allows users to visually identify both potential system-wide and per-machine bottlenecks. As playback or monitoring continues, the timeline 520 acts as a real-time indicator of the current system context.

Figure 18:
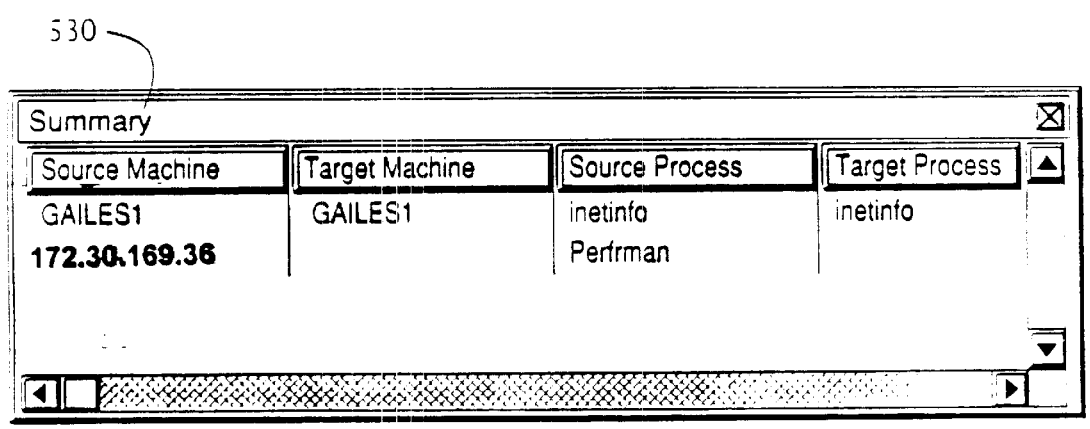
FIG. 18 illustrates a screen print of summary display of performance data.

FIG. 18 illustrates a screen print 530 of summary display of performance data. Similar to previously described summary window 490 in FIG. 15, but depicting different information, the summary information in screen print 530 presents a distillation of all events selected by the VSA user. That is, if multiple events are selected, the unique elements (e.g. source and target machines, processes, entities, etc.) are displayed. This is very useful when a time range is selected either in the timeline or performance viewer. The summary window allows the user to see a quick tally of what is going on in the application. This is a particularly important view because of the large volumes of data generated while monitoring a system.

Synchronization

Figure 19:
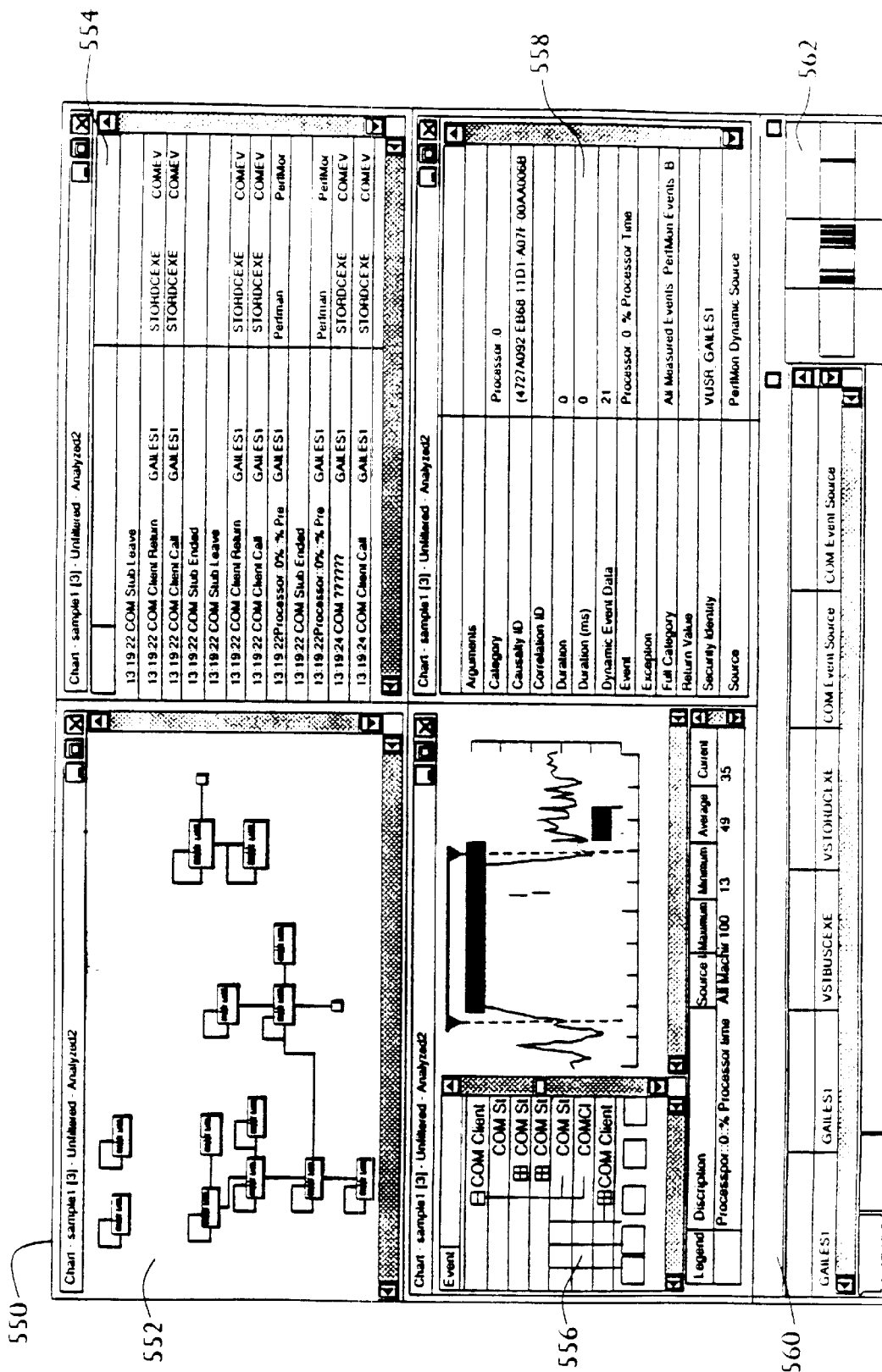
FIG. 19 illustrates a screen print of several synchronized sets of performance data.

FIG. 19 illustrates a screen print 550 of several synchronized sets of performance data. Screen 550 comprises several windows, including an animated application model or process diagram 552, an event log window 554, CPU performance view window 556, event viewing window 558, a summary window 560, and a time line window 562.

The VSA ensures that all information presented to the user is cross-correlated. This provides instant synchronization. When the user selects an item (or set of items) in one window, all other windows can (based on user preference) automatically highlight the selection. This includes the selection of specific events, selection of all events in a specified time range, or selection of all events associated with a specified entity. However, if the user desires, auto-synchronization can be turned off for any one or more windows.

FIG. 19 illustrates this concept. Here, for example, the user made a time selection in the performance view window 556 (representing PerfMon data) over a period of time where CPU behavior was in question. The animated application model or process diagram 552 highlights the entities/ processes involved in the selection. The event log window 554 highlights all events in the specified time range, part of which represent a call tree. The event viewing window 558 presents data on a single event (for multi-event selections it highlights the first event). The timeline window 562 highlights the specified time range as well as shows performance peaks, and the summary window 560 tallies the events in the time range and presents a summary.

Thus, while displaying the animated functional model 552, the control station can also simultaneously display items such as summary data 560, time data 562, event details 558, and/or an event log or call tree 554.

Window synchronization avoids a common problem with systems based on multiple windows. In a typical multi-window system, the user wants to have one or two windows fully visible, while others are invisible. Typically no context flows to or from invisible elements, despite the fact that the user may want this to happen. The VSA avoids this problem by creating a user notion of a shared selection (the 'AutoSelection'), and allows the user to subscribe windows to that selection. As a result, the user is not confused by the flow of context, and instead they find it predictable and natural.

The system level overview of the operation of an exemplary embodiment of the invention has been described in the Detailed Description. As described, the method and apparatus for analyzing the performance of a data processing system and, in particular, to an application running on a distributed data processing system, enable users to quickly and easily observe the operational performance of such a system without significantly impacting such performance.

Methods of Exemplary Embodiments of the Invention

The previous sections have described the structure and operation of various exemplary embodiments of the invention. In this section, the particular methods performed by such exemplary embodiments are described by reference to a series of flowcharts. These methods constitute computer programs made up of computer-executable instructions. Describing the methods by reference to flowcharts enables one skilled in the art to develop such programs including such instructions to carry out the methods on suitable computing systems (the processor of the computing systems executing the instructions from computer-readable media).

FIGS. 19–27 are flowcharts of methods to be performed according to exemplary embodiments of the invention. It will be understood by one of ordinary skill that the steps depicted in these flowcharts need not necessarily be performed in the order shown. It will also be understood that while the flowcharts have "Start" and "End" blocks, in general the processes they depict are continuously performed.

Figure 20B:
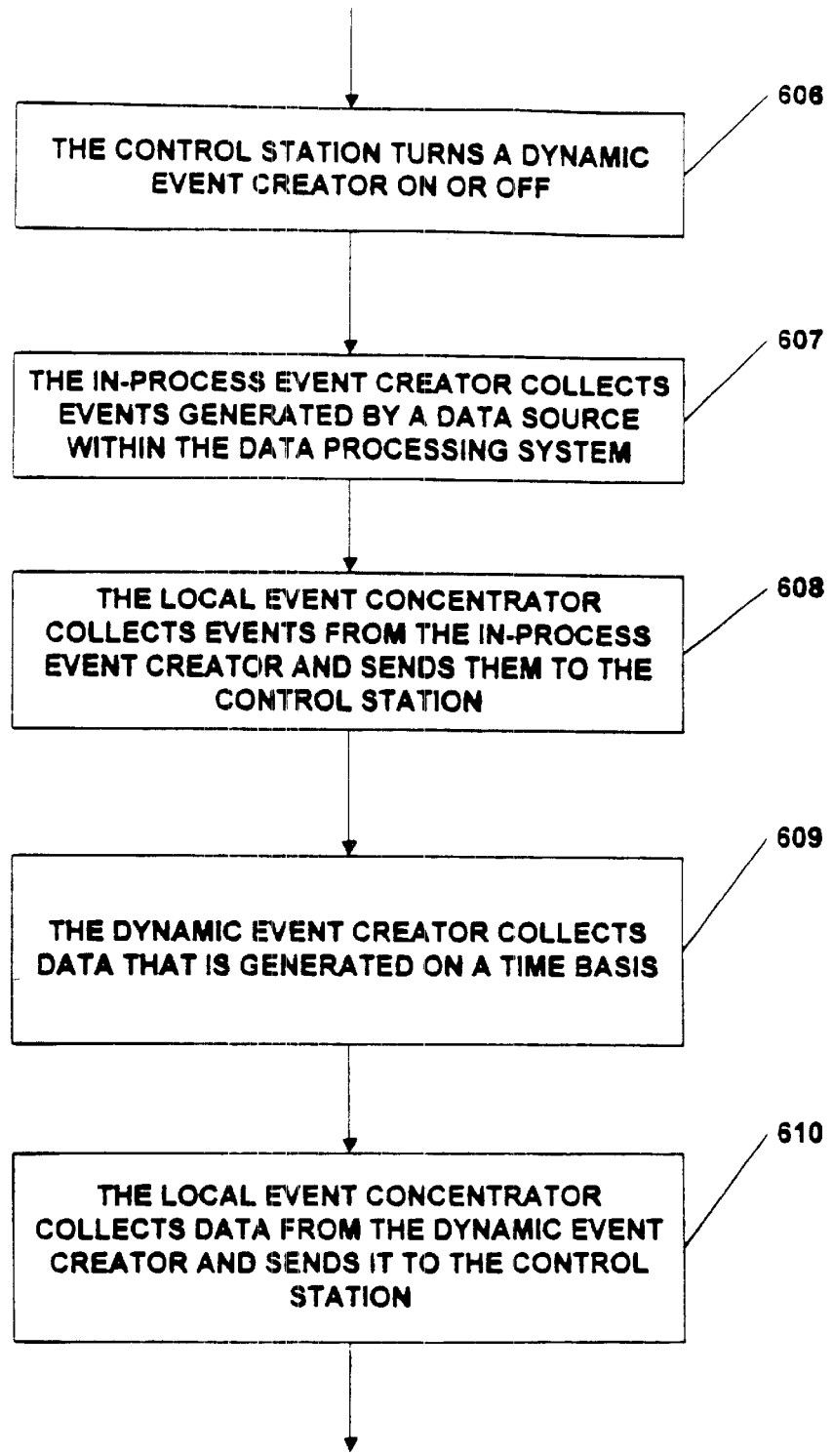
Figure 20C:
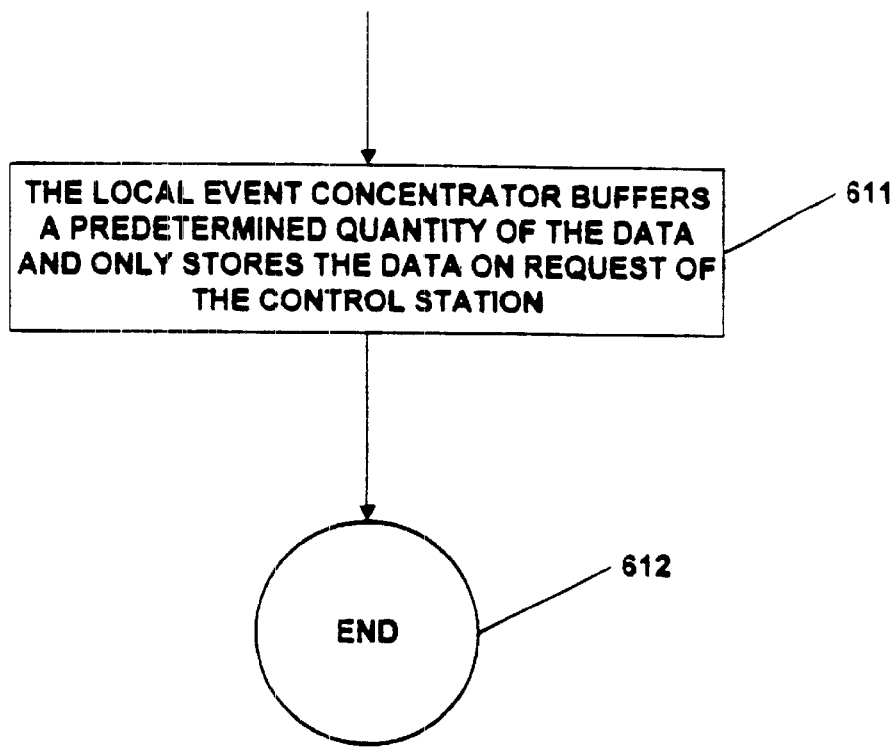

FIGS. 20A–C is a flowchart illustrating, in steps 601 through 612, overall data collection architecture and how data is collected via the IECs, DECs, and LECs. The process begins with block 601. In block 602 the operating system or middleware creates an IEC reference. In the next block 603, the control station 100 creates an LEC.

Block 604 depicts that the LEC converts the IEC reference to an IEC. In block 605 the LEC is indicated as being capable, for example, of turning the IEC on or off by enabling or disabling its IsActive status condition.

In block 606 the control station 100 can turn a DEC on or off.

In block 607 an IEC collects events generated by a data source within the data processing system under scrutiny. The term "collect" herein broadly includes the IEC's function of creating events in response to certain conditions occurring within the process space it is monitoring.

In block 608 the LEC collects events from the IEC and sends them to the control station 100.

In block 609 the DEC collects events that are generated on a time basis. The term "collect" herein broadly includes the DEC's function of creating events in response to monitoring certain time-valued system functions.

In block 610 the LEC collects data from the DEC and sends it to the control station 100. Block 611 indicates that the LEC buffers a predetermined quantity of data and only stores the data on request of the control station 100. The process ends in block 612.

Figure 21A:
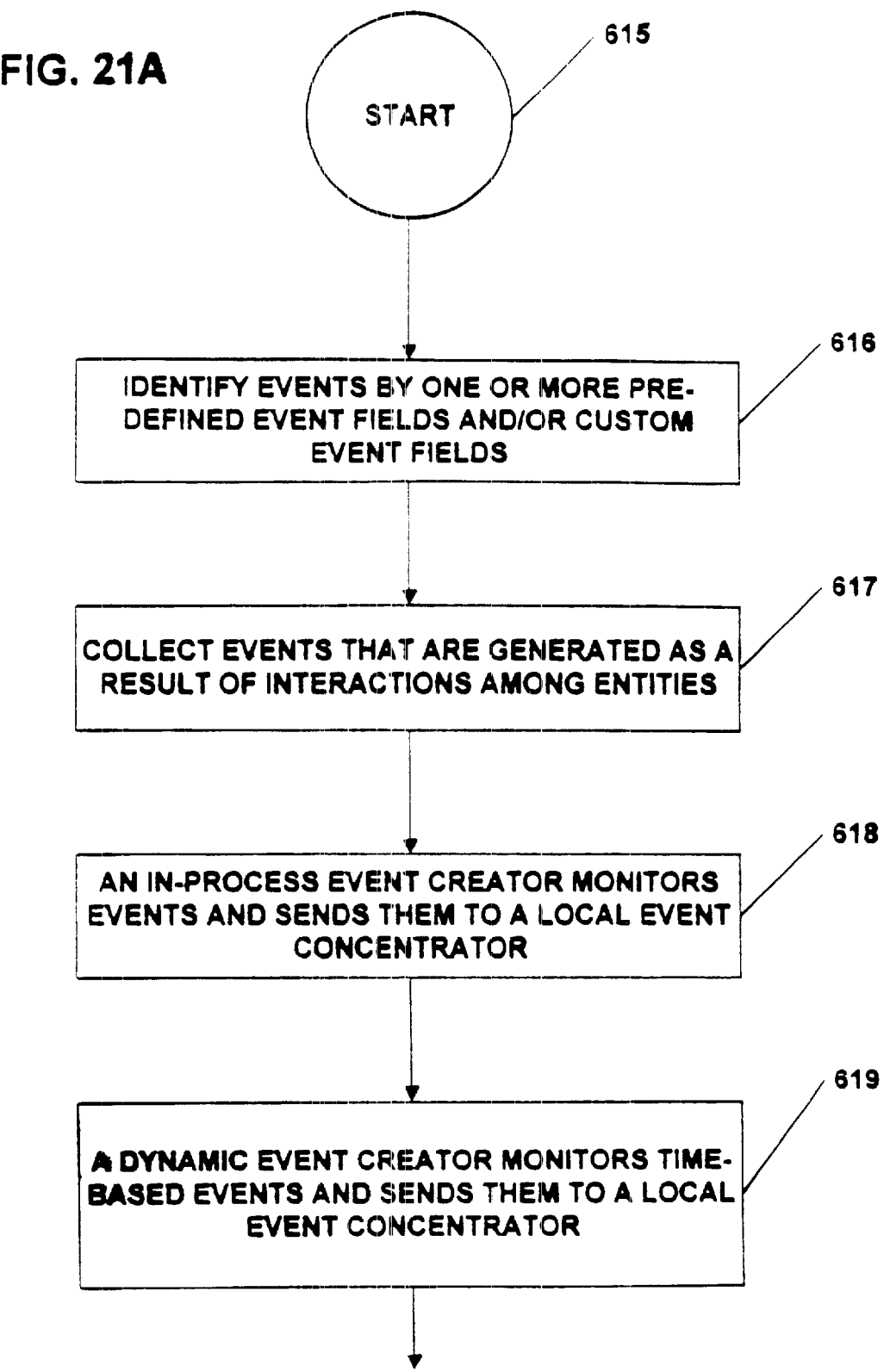
FIGS. 21A–B is a flowchart of a method illustrating an exemplary embodiment of overall data design and how the VSA determines and maps relationships between entities.
Figure 21B:
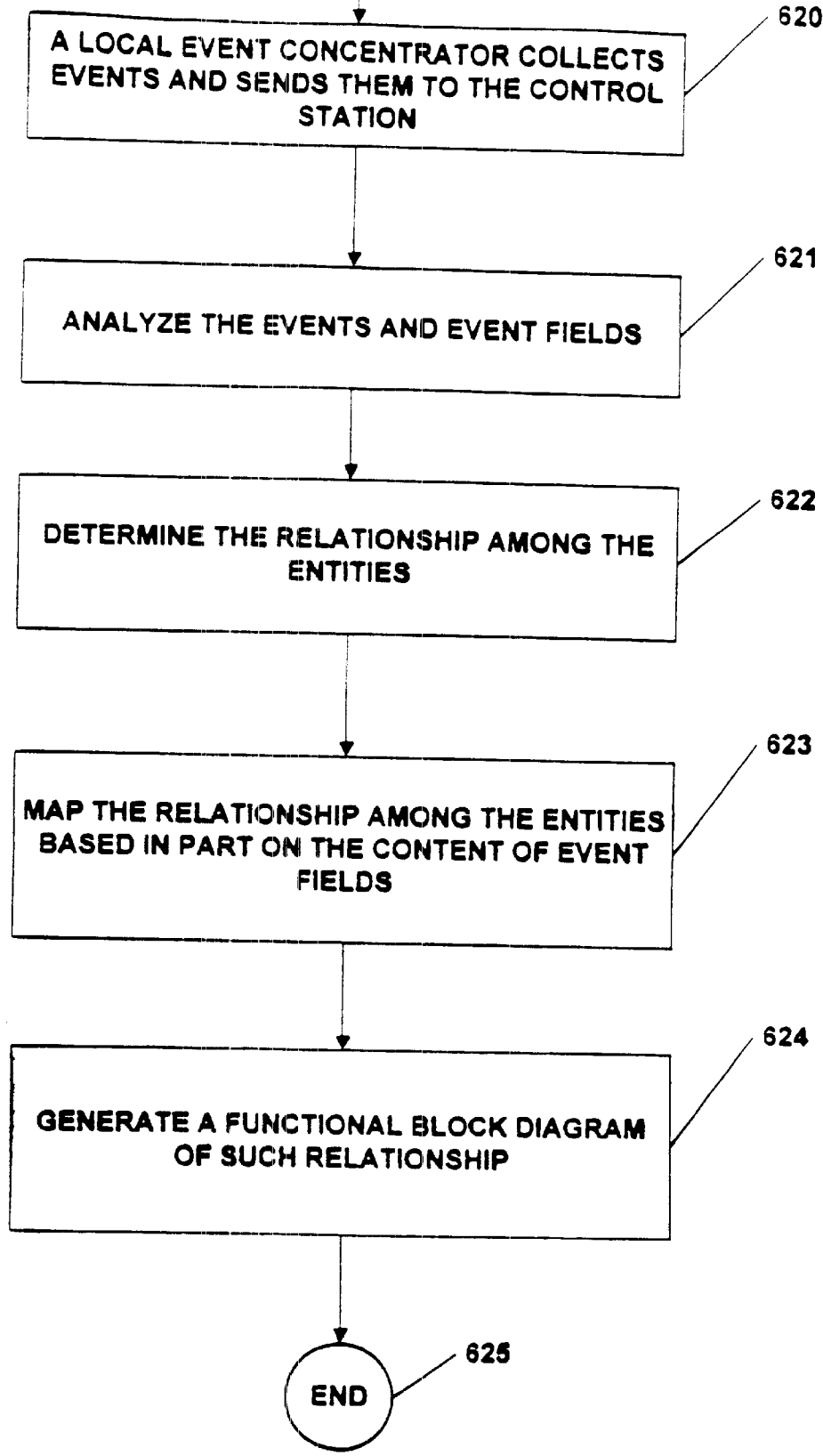

FIGS. 21A–B is a flowchart illustrating, in steps 615 through 625, an exemplary embodiment of overall data design and how the VSA determines and maps relationships between entities. The process starts with block 615. Next in block 616 events are identified by one or more pre-defined event fields and/or custom event fields. In block 617 events that are generated as a result of interactions among entities in the data processing system under scrutiny are collected. In block 618 an IEC monitors events and sends them to an LEC. In block 619 a DEC monitors time-based events and sends them to an LEC. In block 620 an LEC collects events and sends them to the control station. Next in block 621 the VSA analyzes the events and their event fields, and in block 622 the VSA determines the relationships among the entities, as described earlier. In block 623 the VSA maps the relationship among the entities, based in part on the content of the event fields. In block 624 the VSA generates a functional block diagram of the relationship among entities, and the process ends in block 625.

Figure 22A:
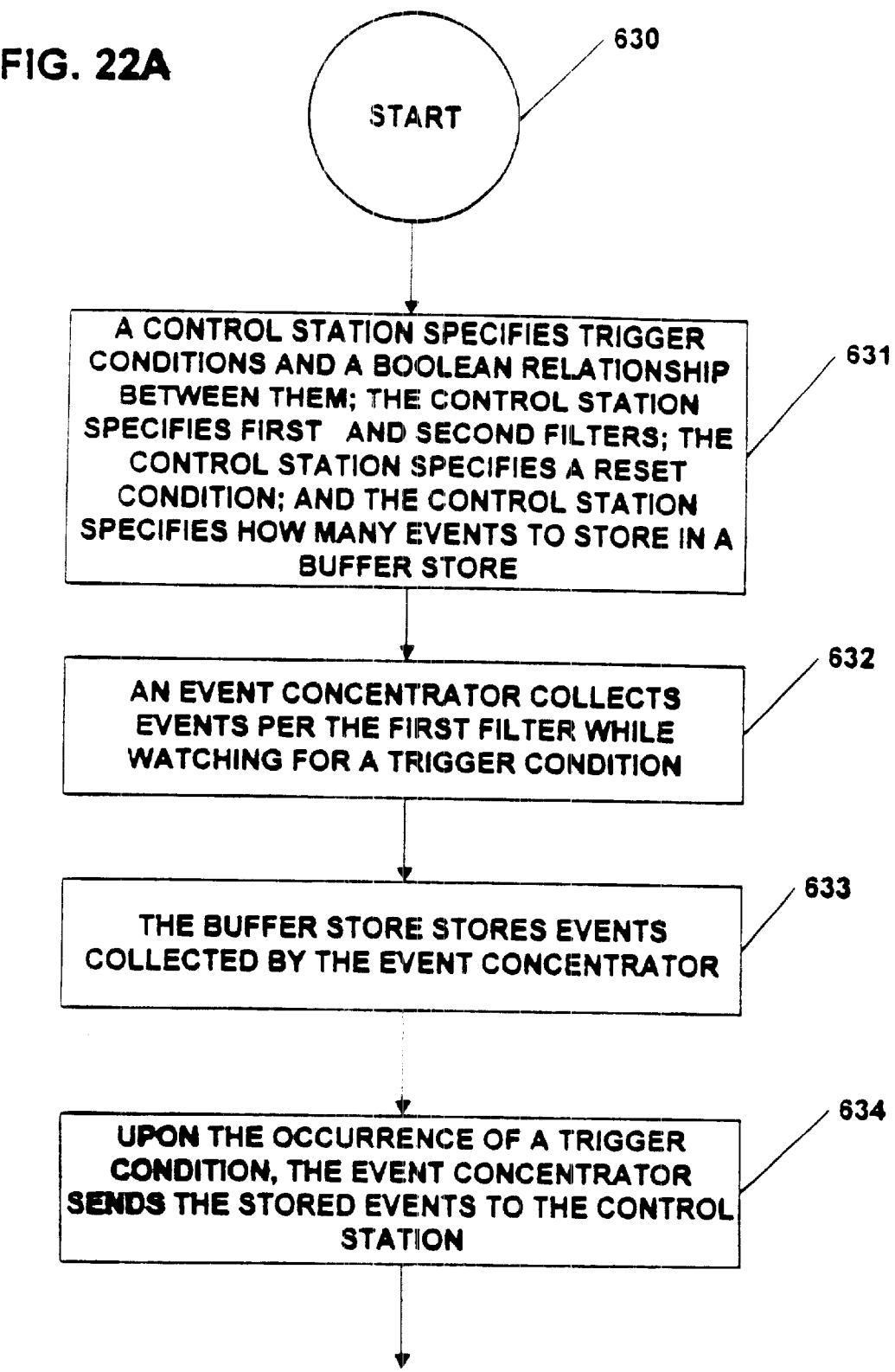
FIGS. 22A–B is a flowchart of a method illustrating an exemplary embodiment of triggers.
Figure 22B:
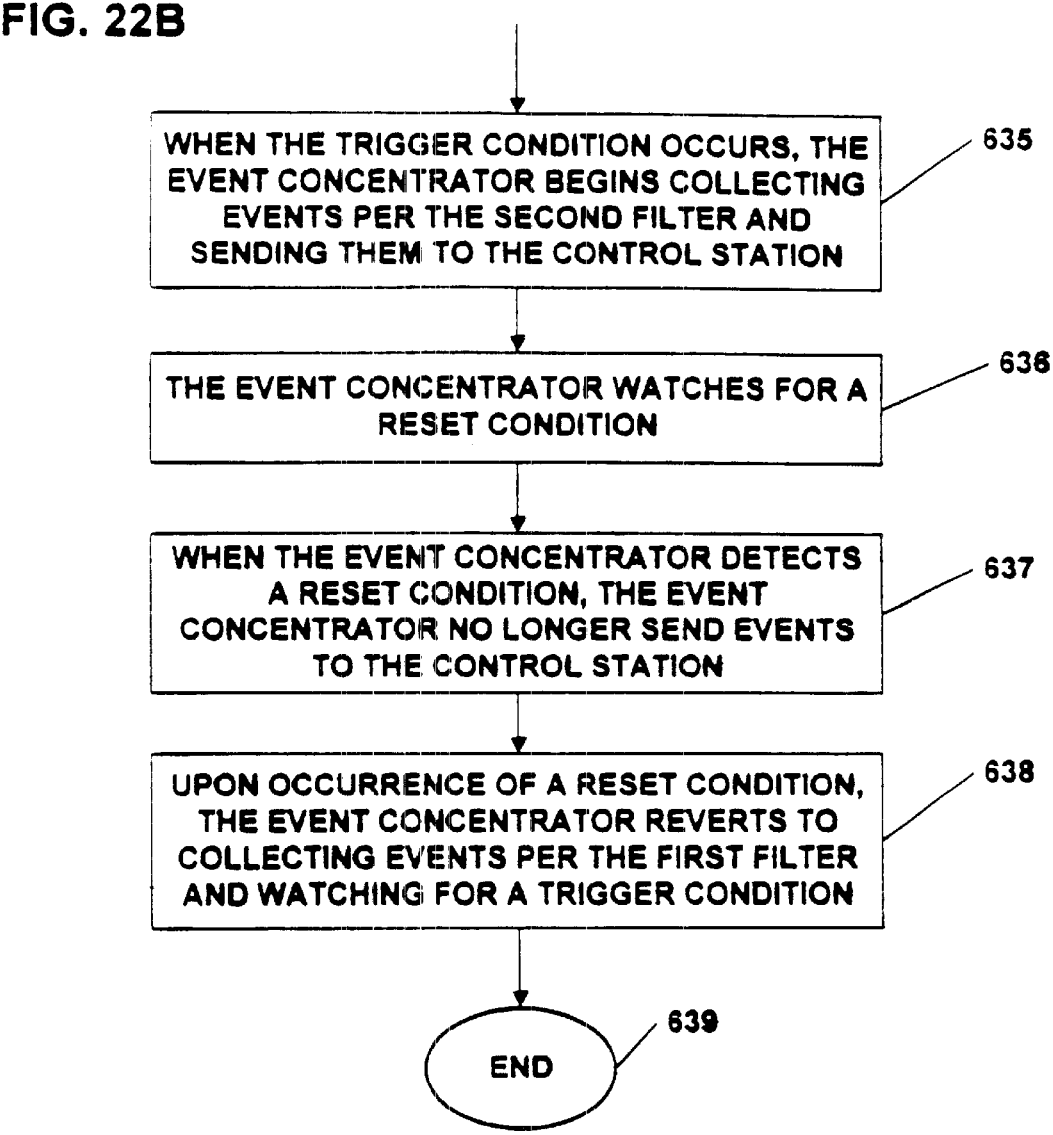

FIGS. 22A–B is a flowchart illustrating, in steps 630 through 639, an exemplary embodiment of triggers. The method starts in block 630. In block 631 a control station specifies one or more trigger conditions, and it can specify, if desired, a Boolean relationship between two or more trigger conditions. The control station can also specify filters, for example a first filter and a second filter. The second filter can be more detailed and comprehensive than the first filter. The control station can also specify a reset condition. It can also specify how many events the LEC should store in its circular buffer store.

In block 632 an LEC collects events in accordance with the first filter while watching for a trigger condition, and in block 633 the LEC's buffer store stores events collected by the LEC. In block 634, when the LEC detects a trigger condition, it sends the stored events to the control station, and in block 635 the LEC begins collecting events in accordance with the second filter and sending them to the control station. In block 636 the LEC watches for a reset condition. In block 637, if the LEC detects a reset condition, it stops sending events to the control station, and in block 638 the LEC reverts to collecting events in accordance with the first filter and watching for another trigger condition. The process ends in block 639.

Figure 23A:
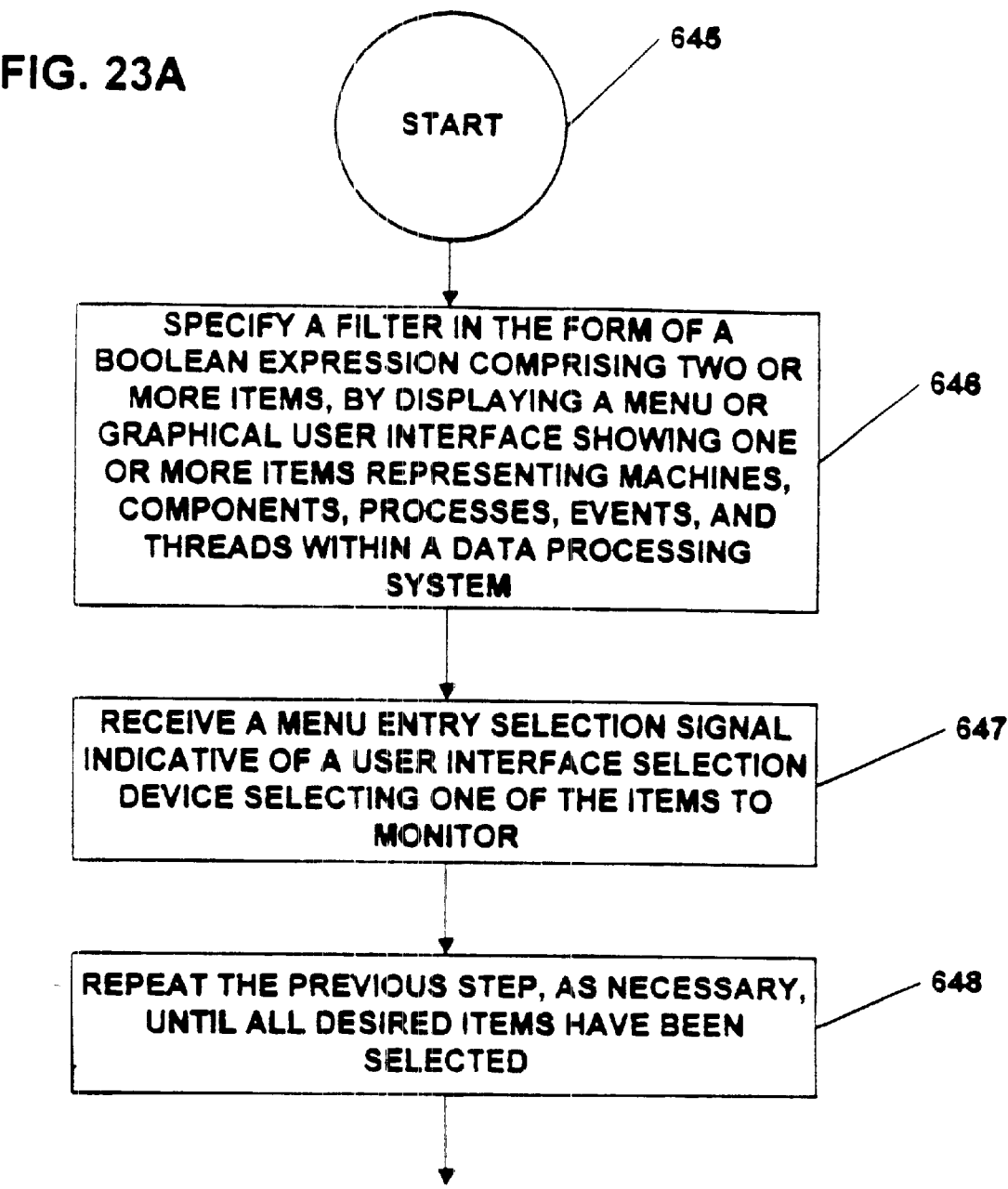
FIGS. 23A–B is a flowchart of a method illustrating an exemplary embodiment of filter reduction.
Figure 23B:
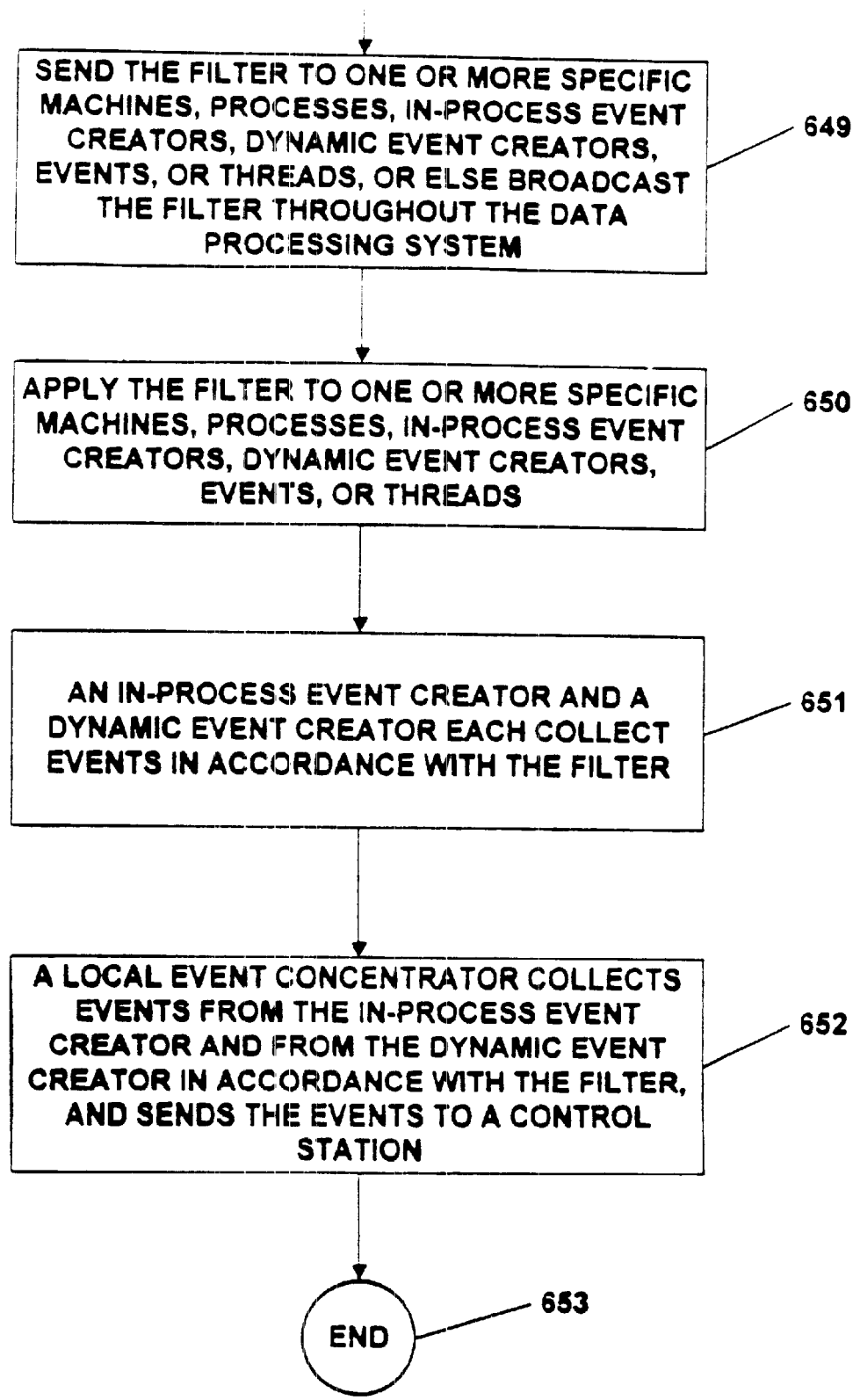

FIGS. 23A–B is a flowchart illustrating, in steps 645 through 653, an exemplary embodiment of filter reduction. The process begins in block 645. In blocks 646–648, a user specifies a filter, which process can take the form of a series of iterations of blocks 646–648. In block 646 a menu or graphical user interface is displayed which lists one or more items representing machines, components, IECs, DECs, processes, events, and threads within the data processing system under examination. The user can chose a filter in the form of a Boolean expression comprising two or more items. In block 647, the user selects his or her choice by generating a suitable menu entry selection signal using, for example, a mouse or keyboard. Block 648 indicates that step 647 is repeated, as necessary, until all desired filter items have been selected by the user.

Next in block 649 the filter is either sent to one or more specific machines, processes, IECs, DECs, events, or threads, or it is broadcast generally throughout the data processing system. In block 650 the filter is applied to one or more specific machines, processes, IEC, DECs, events, and/or threads, in accordance with its user-selected variables. In block 651 an IEC and a DEC collect events in accordance with the filter. In block 652 the LEC collects events from the IEC and the DEC in accordance with the filter, and the LEC sends the collected events to a control station. The process ends in block 653.

Figure 24A:
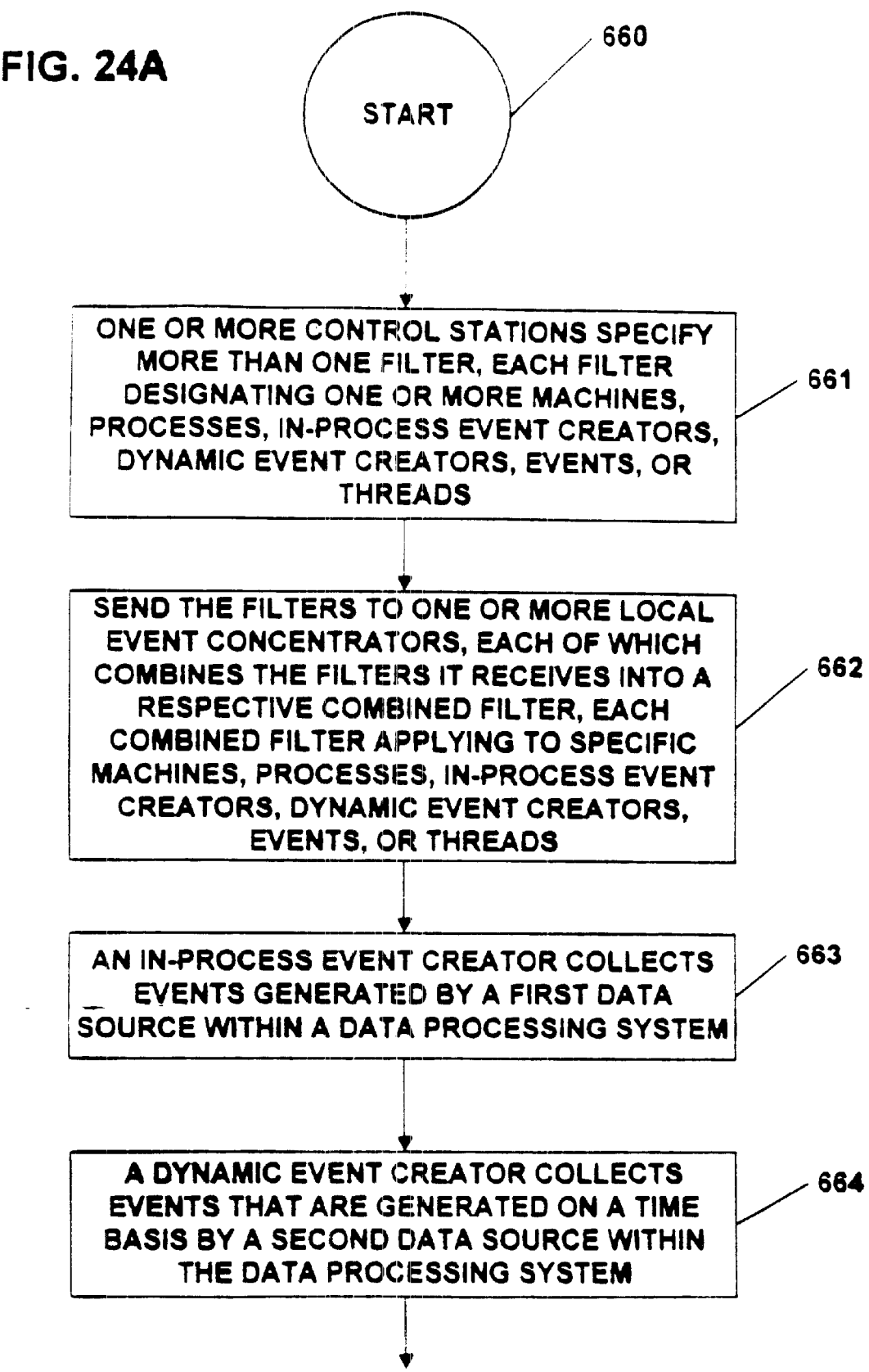
FIGS. 24A–B is a flowchart of a method illustrating an exemplary embodiment of filter combination.
Figure 24B:
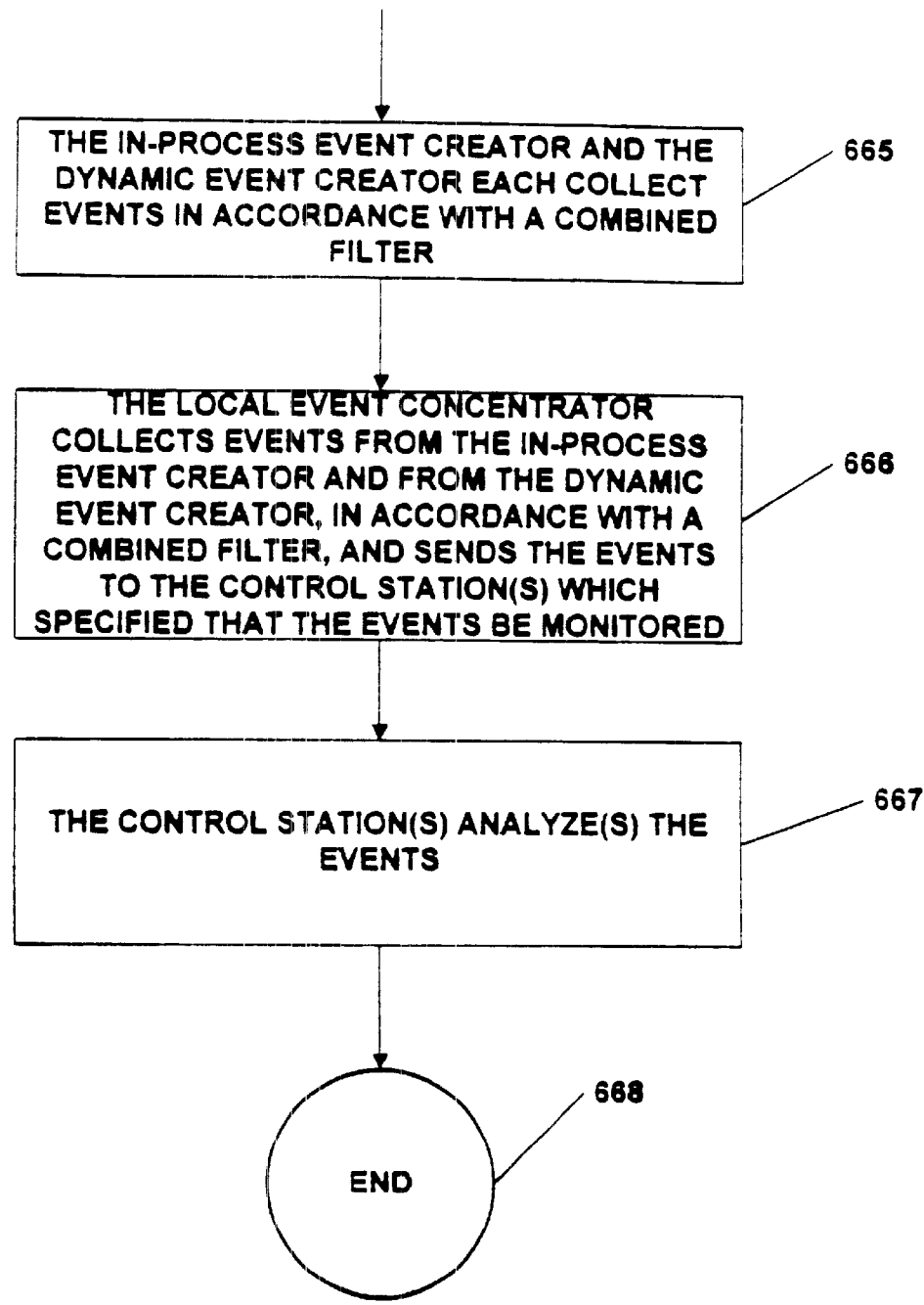

FIGS. 24A–B is a flowchart illustrating, in steps 660 through 668, an exemplary embodiment of filter combination. The process begins in block 660. In block 661, one or more control stations specify more than one filter. Each filter designates one or more machines, processes, IECs, DECs, events, and/or threads. In block 662 the filters are sent to one or more LECs, each of which combines the filters it receives into a respective combined filter. Each combined filter applies to specific machines, processes, IECs, DECs, events, and/or threads. In block 663 an IEC collects events generated by a first data source within the data processing system under examination. In block 664 a DEC collects events that are generated on a time basis by a second data source within the data processing system under examination. In block 665 the IEC and DEC each collect events in accordance with a combined filter.

In block 666 the LEC collects events from the IEC and from the DEC in accordance with a combined filter, and the LEC sends the events to the control station or control stations which specified that the events be monitored. In block 667 the control station analyzes the events. The process ends in block 668.

Figure 25A:
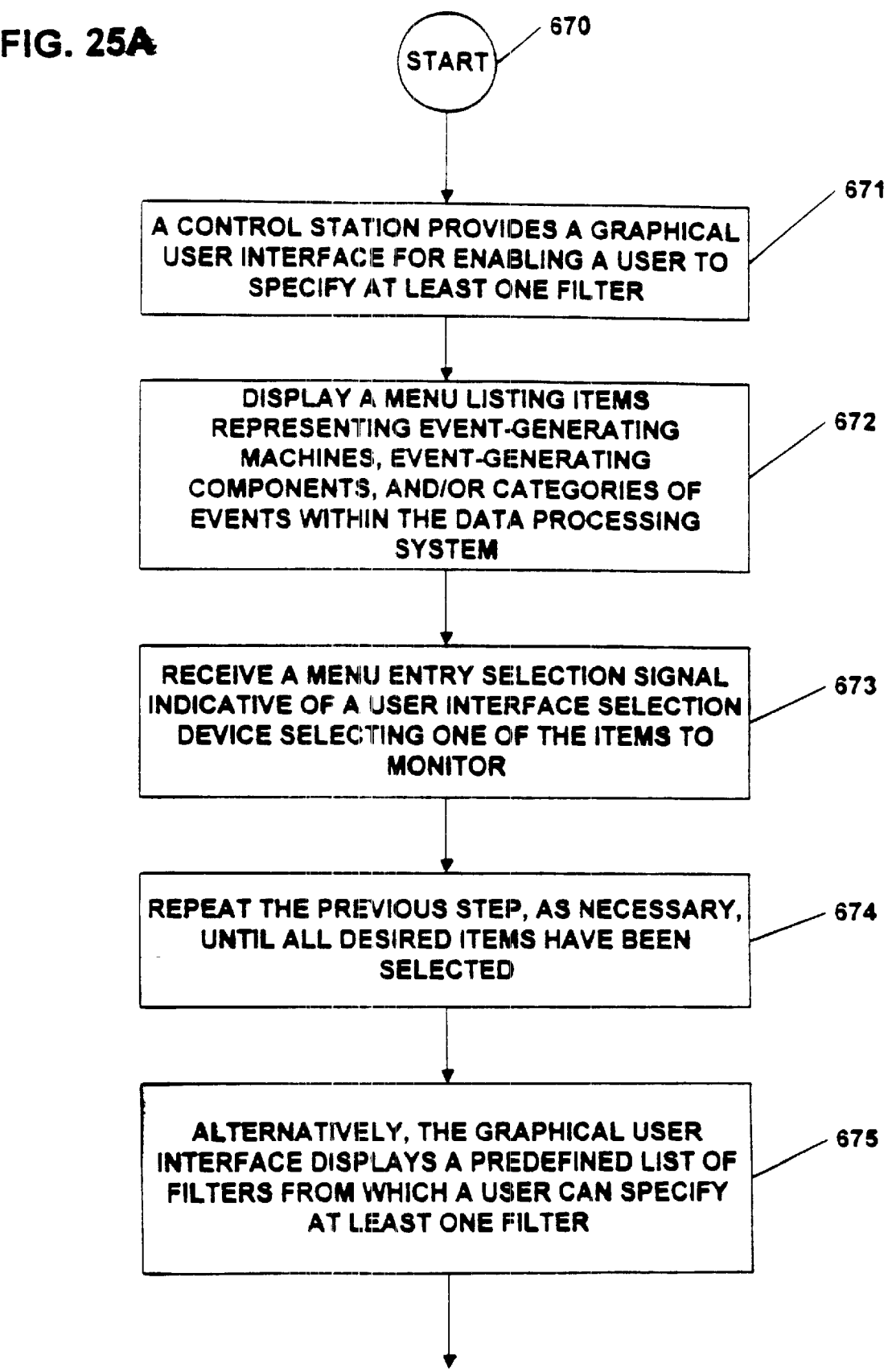
FIGS. 25A–B is a flowchart of a method illustrating an exemplary embodiment of a user interface for specifying one or more filters.
Figure 25B:
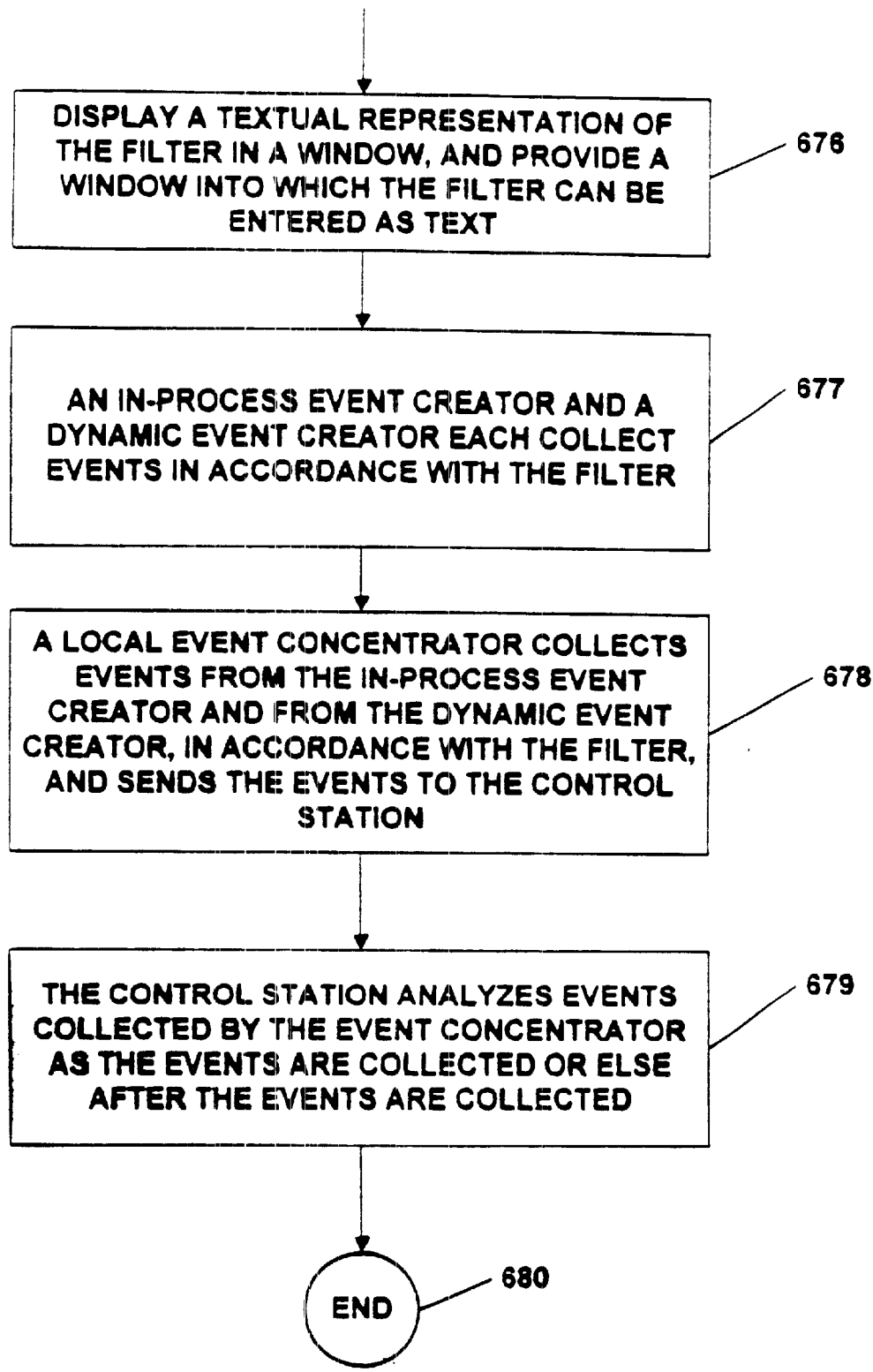

FIGS. 25A–B is a flowchart illustrating, in steps 670 through 680, an exemplary embodiment of a user interface for specifying one or more filters. The process begins in block 670. In block 671 a control station provides a graphical user interface (UI) to a user for enabling the user to specify at least one filter. In block 672 a menu is displayed listing items representing event-generating machines, event-generating components, and/or categories of events with the data processing system under examination.

In block 673 the VSA receives a menu entry selection signal indicative of a user interface selection device selecting one of the items to monitor. Block 674 indicates that step 673 is repeated, as necessary, until all desired items have been selected.

Block 675 indicates an alternate step to step 672, in that the UI displays a pre-defined list of filters from which a user can specify at least one filter. The pre-defined list can be a "top 10" of the most popular filters in use, and it can be updated automatically by the VSA. Here the user has only to click on one filter, and it automatically includes a set of the items displayed in block 672.

In block 676 a textual representation of the user-selected filter is displayed in a window. In addition, a window is provided in which the user can enter the filter directly in text format. In block 677 an IEC and a DEC each collect events in accordance with the user-selected filter. In block 678 an LEC collects events from the IEC and from the DEC, in accordance with the filter, and the LEC sends the events to the control station. In block 679 the control station either analyzes events collected by the LEC as the events are collected, or the LEC analyzes the events after the events have been collected (in post mortem fashion). The process ends in block 680.

Figure 26A:
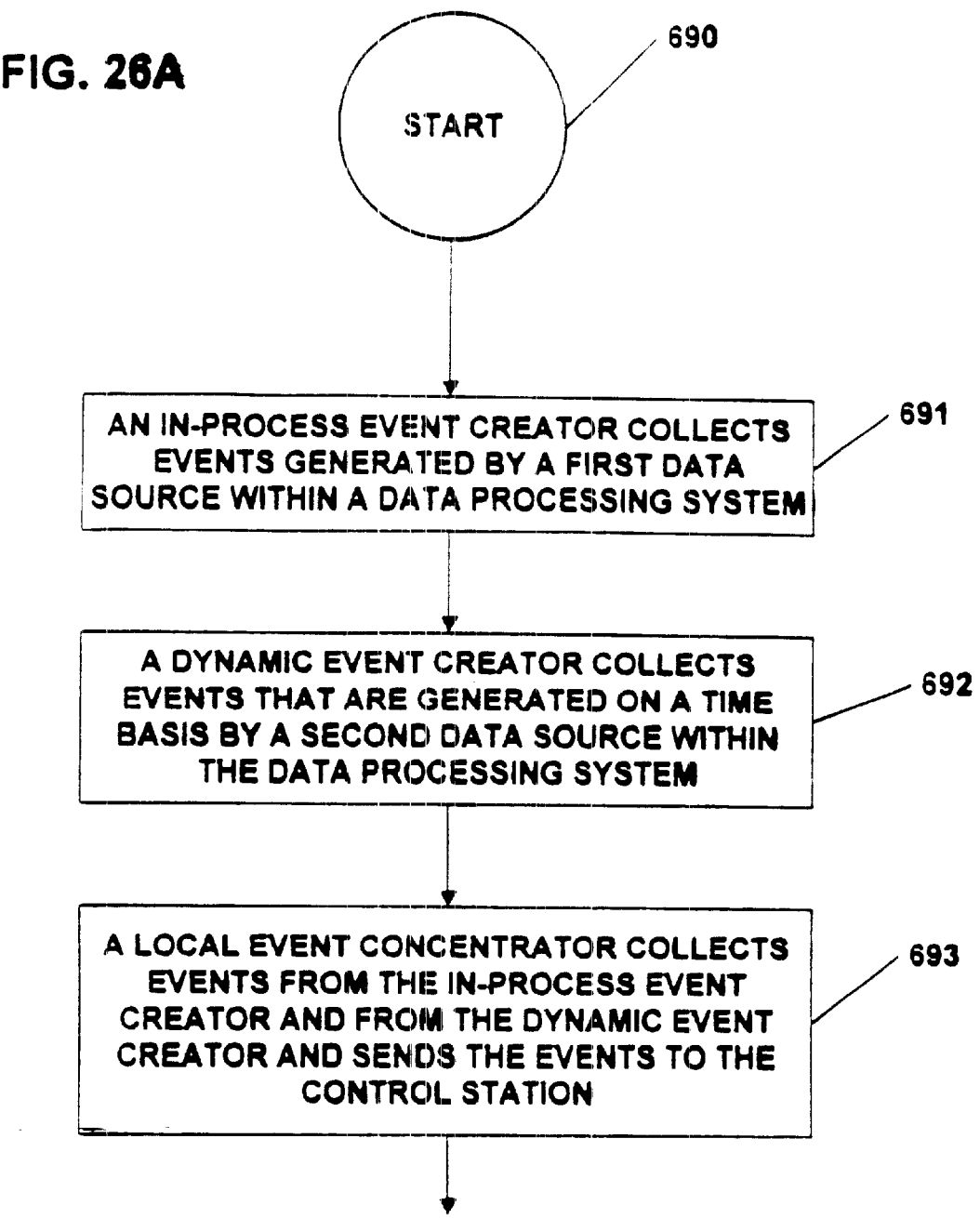
FIGS. 26A–C is a flowchart of a method illustrating an exemplary embodiment of automatic generation of an animated application model.
Figure 26B:
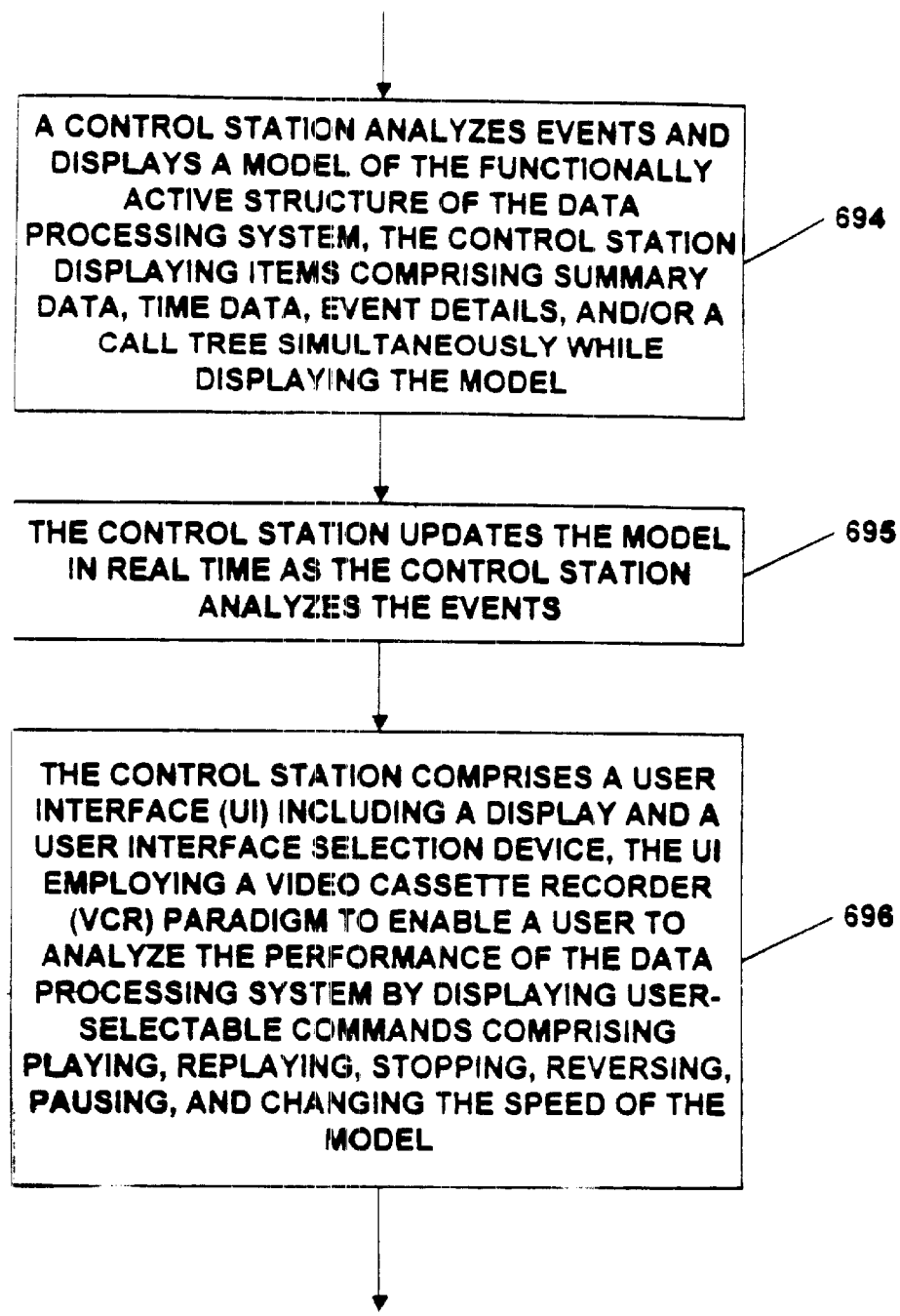
Figure 26C:
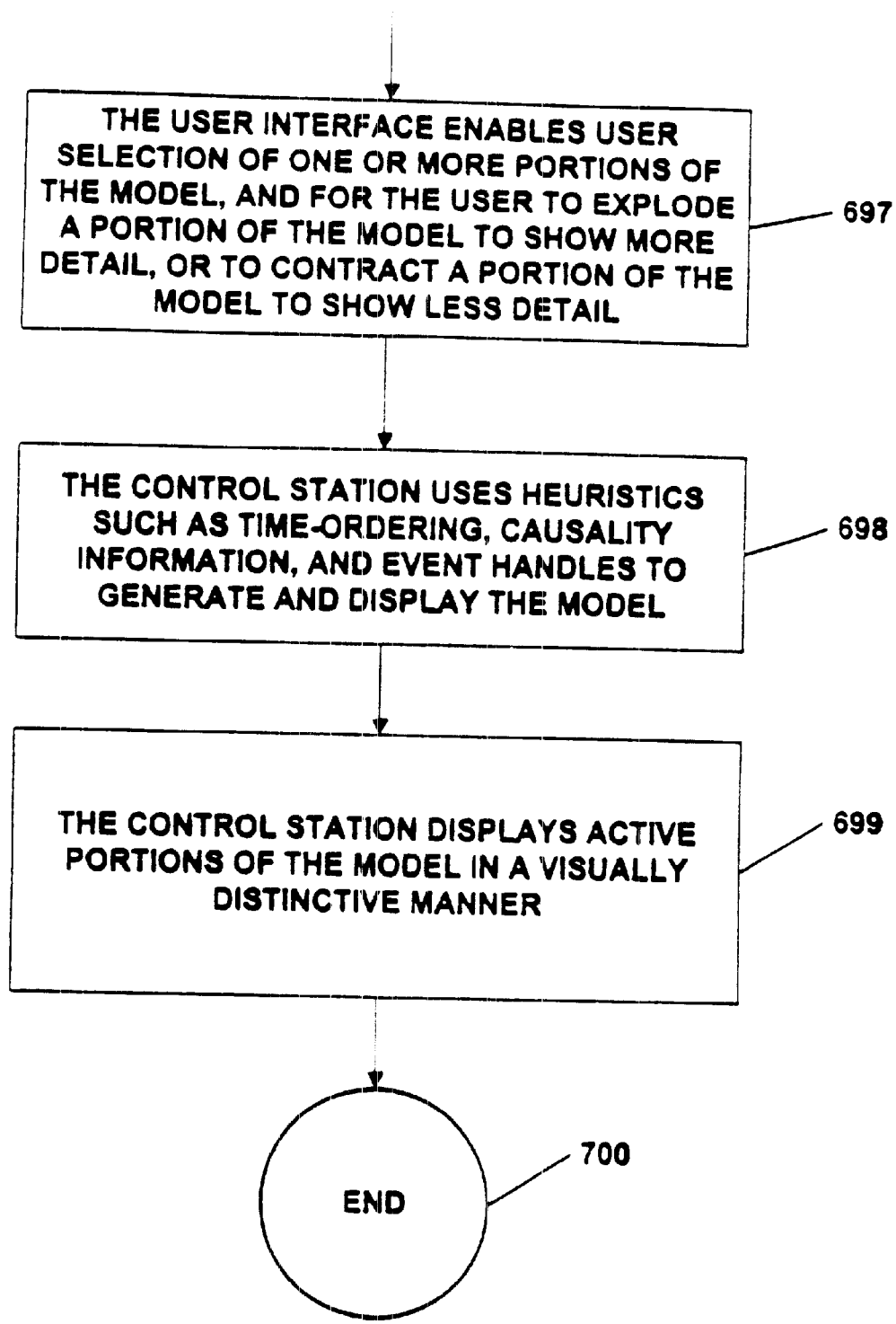

FIGS. 26A–C is a flowchart illustrating, in steps 690 through 700, an exemplary embodiment of automatic generation of an animated application model. The process begins in block 690. In block 691 an IEC collects events generated by a first data source within a data processing system under examination. In block 692 a DEC collects events that are generated on a time basis by a second data source within the data processing system under examination.

In block 693 an LEC collects events from the IEC and from the DEC and sends them to the control station. In block 694 the control station analyzes the events and displays a model of the functionally active structure of the data processing system under examination. While displaying the animated functional model, the control station can also simultaneously display items such as summary data, time data, event details, and/or a call tree. In block 695 the control station keeps updating the animated model in real time as it receives and analyzes events.

In block 696 the control station presents a user interface (UI) to the user in the form of a display, a user interface selection device, and uses a video cassette recorder (VCR) paradigm to enable the user to analyze the performance of the data processing system. The UI displays user-selectable commands, such as Play, Replay, Stop, Reverse, Pause, and Change Speed of the animated model. In block 697 the UI also enables the user to select one or more portions of the model and to either explode or enlarge a selected portion of the model to show more detail, or to contract or shrink a selected portion of the model to show less detail.

In block 699 the control station displays the active portions of the animated model in a visually distinctive manner, for example by highlighting them. The process ends with block 700.

Figure 27A:
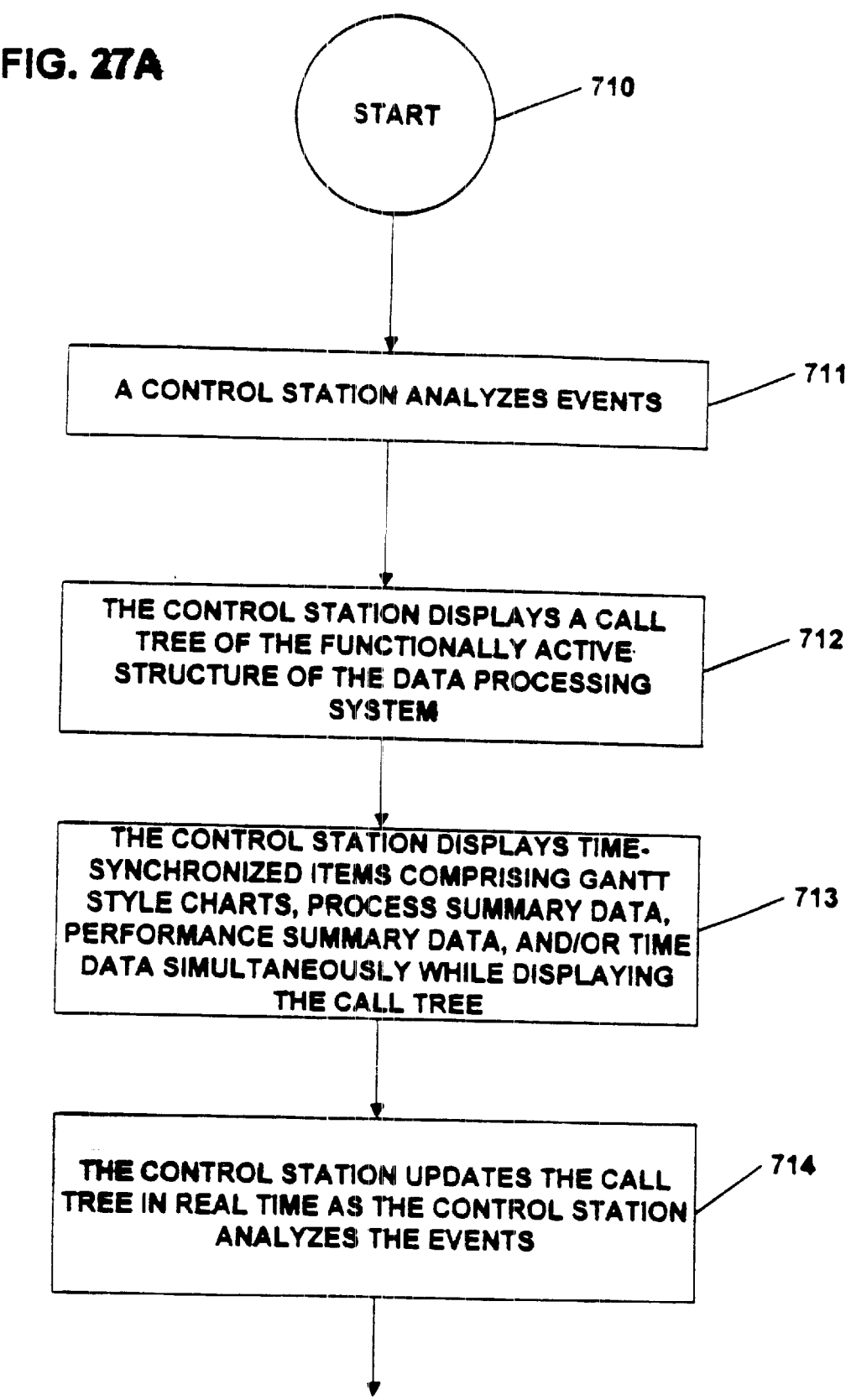
FIGS. 27A–C is a flowchart of a method illustrating an exemplary embodiment of a user interface for displaying the performance analysis of the system under examination.
Figure 27B:
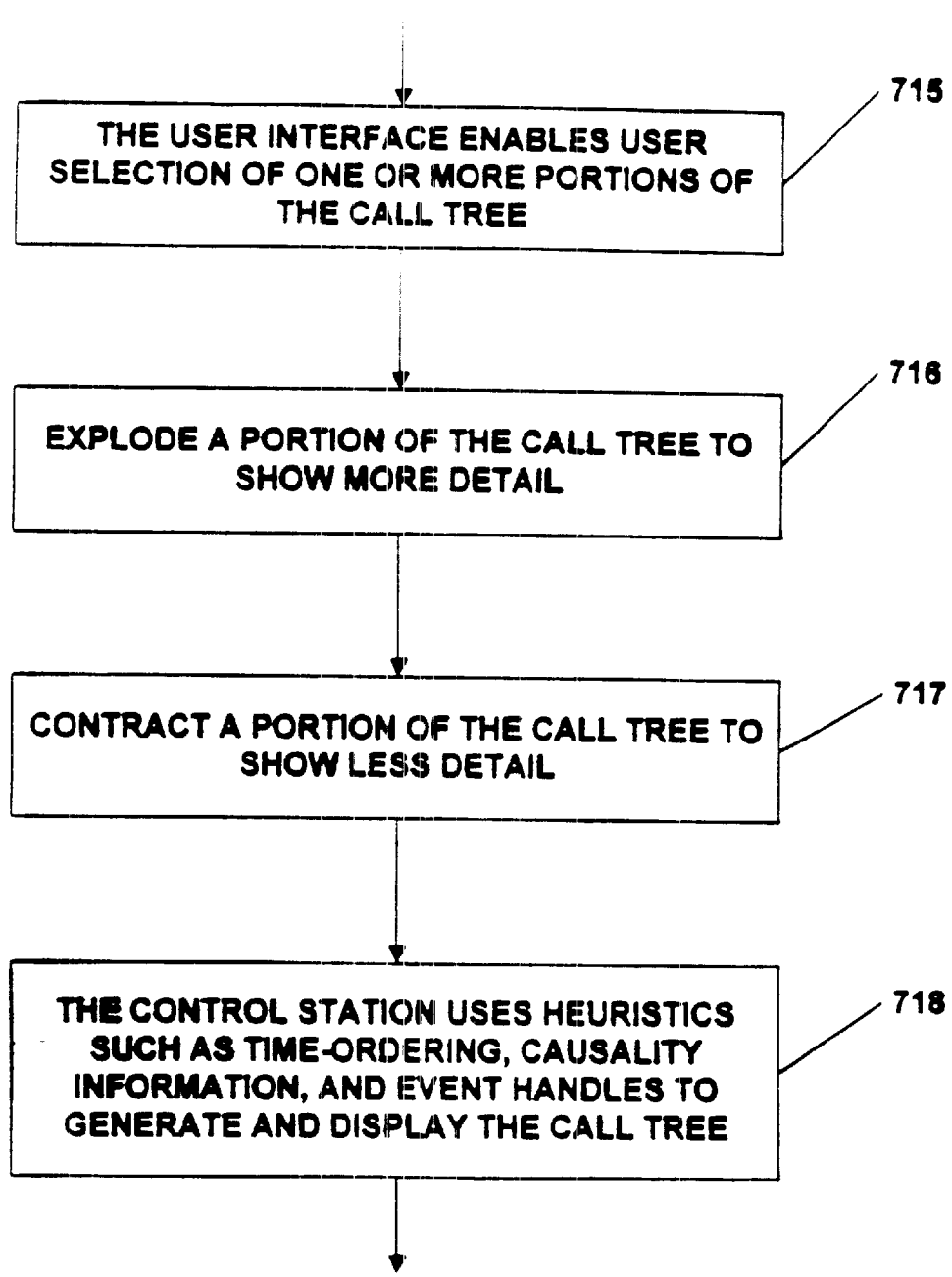
Figure 27C:
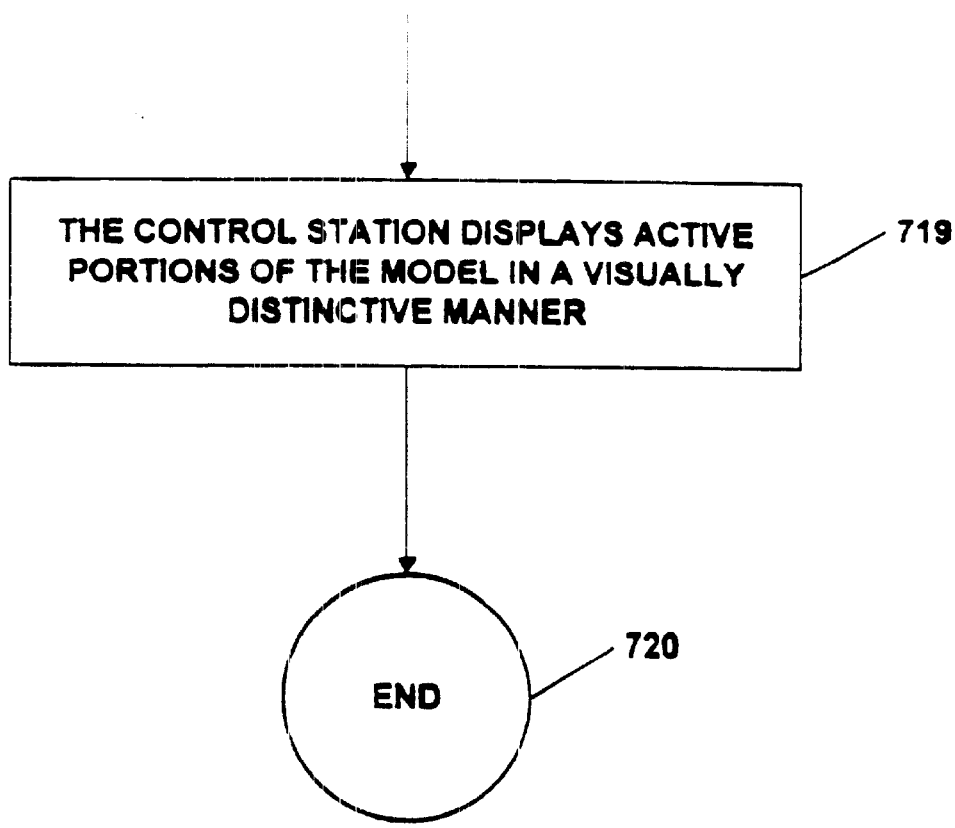

FIGS. 27A–C is a flowchart illustrating, in steps 710 through 720, an exemplary embodiment of a user interface for displaying the performance analysis of the system under examination. The process begins in step 710. In block 711 the control station analyzes events, for example events received from an LEC. In block 712 the control station displays a call tree of the functionally active structure of the data processing system under examination. In block 713 the control station can, while continuing to display the call tree, display time-synchronized items such as Gantt type charts, process summary data, performance summary data, and/or time data. In block 714 the control station updates the call tree in real time while it continues to receive events and analyze them.

In block 715 the user interface enables the user to select one or more portions of the call tree to analyze more closely. In blocks 716 and 717, the UI enables the user to either explode or enlarge a selected portion of the model to show more detail, or to contract or shrink a selected portion of the model to show less detail. In block 718 the control station uses heuristics such as time-ordering, causality information, and event handles to generate and display the call tree. In block 719 the control station displays active portions of the animated model in a visually distinctive manner, for example by highlighting them, displaying them in a different color, or "flashing" them. The process ends in block 720.

The particular methods performed by the significant exemplary embodiments of the invention have now been described with reference to the flowcharts of FIGS. 19–26.

Conclusion

A method and apparatus for analyzing the performance of a data processing system have been described which overcome many of the disadvantages of prior known systems. The VSA collects application performance data by use of instrumentation within the application environment and using an efficient, distributed collection architecture. By instrumenting the core application platform, the VSA can obtain information about the application without having to make changes to it.

The VSA enables the user to view an animated model of the application as it is running, as a set of interconnected black boxes. It does so without re-architecting or recompiling the original code.

The VSA includes an efficient mechanism for collecting and transmitting the data to a central log, and for streaming it to disk. A user interface is provided for detailed and specific selection of what to analyze, and the system is automatically configured to minimize impact based on the selection criteria. This information is distributed across the monitored systems and is used to efficiently collect analysis data.

In addition, the user is provided with automatic analysis tools to filter and view the operation of the application and to locate performance issues. A user display provides overlay and time-synchronized system performance data in any of a wide variety of user-specified formats. The VSA can be used for both live and post-mortem analysis.

As a consequence, this invention provides software developers, including developers of distributed component-based systems, with the ability to understand and analyze the behavior of their software while it is executing. The VSA can help find performance bottlenecks, understand system structure, and isolate behavioral problems.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention.

It will be apparent to those of ordinary skill that the collection aspects of the invention can be implemented either in the operating system or in middleware. Furthermore, the implementation can be implemented in any desirable manner, e.g. by splitting it into separate pieces such as filter-specifying, event-firing, data collection, and analysis/presentation. For example, by including one or more pieces in the operating system, the potential utilization of the invention can be widespread.

For example, those of ordinary skill within the art will appreciate that in one embodiment a virtual-machine style system (e.g. a Java system) could automatically insert the implementing features of this invention into all programs at the virtual machine level.

Alternatively, a hardware-based system could automatically generate out-of-band signals at the hardware level in accordance with the concepts disclosed herein.

In addition, a data-bound system (e.g. an Oracle database) could use data triggers to get similar results.

Finally, as future operating systems are developed, the innovations herein could be applied to an agent-based operating system that is able to automatically migrate to different machines.

Therefore, it is manifestly intended that this invention be limited only by the following claims and equivalents thereof

We claim:

1. A system for analyzing and mapping relationships among entities in a data processing system comprising:

an event concentrator that collects events generated as a result of interactions among a plurality of entities; and a control station coupled to the event concentrator and receiving events from the event concentrator, the control station analyzing the events and mapping relationships among the plurality of entities by correlating machine, process, entity and instance information between the plurality of entities.

2. A system as recited in claim 1, further comprising at least one of an in-process event creator that creates events and sends them to the event concentrator and a dynamic event creator that creates time-based events and sends them to the event concentrator.

3. A system as recited in claim 1, in which an event is identified by one or more event fields, and in which the control station analyzes events and maps relationships among entities based in part on the content of the one or more event fields.

4. A system as recited in claim 3, in which the one or more event fields are from a group comprising arguments, unique i.d., causality i.d., correlation i.d., dynamic event data, exception, return value, security i.d., source component, source handle, source machine, source process, source process name, source session, source thread, target component, target handle, target machine, target process, target process name, target session, and target thread.

5. A system as recited in claim 3, in which the one or more event fields comprise at least one of a default and custom field.

6. A system as recited in claim 1, in which the events comprise a call event and an enter event between two entities, one being a source entity that performs the call event and the other being a target entity that performs the enter event, and in which one or more event fields comprise a unique i.d., causality i.d., and correlation i.d.

7. A system as recited in claim 6, in which the one or more event fields further comprise source component, source machine, source process, and source session for the source entity.

8. A system as recited in claim 6, in which the one or more event fields further comprise target component, target machine, target process, and target session for the target entity.

9. A system as recited in claim 1 in which the control station maps the relationship among the entities in the form of a functional block diagram.

10. A system as recited in claim 1 in which the event concentrator and control station reside on different machines.

11. In a data processing system comprising a plurality of entities, a method comprising:

collecting events generated as a result of interactions among the entities;

analyzing the events; and determining the relationship among the plurality of entities by correlating machine, process, entity and instance information between the plurality of entities.

12. The method recited in claim 11, wherein determining the relationships among the pluralities of entities further comprises:

mapping the relationship among the entities by generating a functional block diagram of the relationships.

13. The method recited in claim 11, wherein the collecting, analyzing and determining can be performed in any suitable order.

14. The method of claim 11, wherein events are identified by one or more event fields.

15. The method of claim 14, wherein determining the relationships among the entities is based in part on the content of the one or more event fields.

16. A computer-readable medium having computer-executable instructions for:

collecting events generated as a result of interactions among entities;

analyzing the events;

determining relationships among the entities by correlating machine, process, entity and instance information between the entities based in part on the content of event fields; and mapping the relationships between the entities by generating a functional block diagram of the relationships.

17. In a data processing system comprising a plurality of entities, an event concentrator, and a control station coupled to the event concentrator, the system comprising:

the event concentrator collecting events generated as a result of interactions among the plurality of entities; and the control station analyzing the collected events and determining the relationship among the plurality of entities by correlating machine, process, entity and instance information between the plurality of entities.

18. The system of claim 17, further comprising the control station mapping the relationship among the plurality of entities.

19. The system of claim 17, in which an event is identified by one or more event fields, and in which the control station analyzes events and maps relationships among the plurality of entities based in part on the content of the event fields.

20. The system of claim 19, in which the events comprise a call event and an enter event between two entities, one being a source entity that performs the call event and the other being a target entity that performs the enter event, and in which the event fields comprise a unique i.d., causality i.d., and correlation i.d.

21. The system of claim 20, in which the event fields comprise source component, source machine, source process, and source session for the source entity.

22. The system of claim 20, in which the event fields comprise target component, target machine, target process, and target session for the target entity.

23. The system recited in claim 17, wherein the data processing system further comprises an in-process event creator, the method further comprising at least one of:

the in-process event creator creating events and sending them to the event concentrator and the dynamic event creator creating time-based events and sending them to the event concentrator.

* * * * *

UNITED STATES PATENT AND TRADEMARK OFFICE
CERTIFICATE OF CORRECTION

PATENT NO. : 6,691,254 B2
DATED : February 10, 2004
INVENTOR(S) : Kaler et al.

It is certified that error appears in the above-identified patent and that said Letters Patent is hereby corrected as shown below:

Column 28,
Line 26, delete "cVSAParameterValueANSIString=0xx0000" and insert therefor
-- cVSAParameterValueANSIString=0x10000 --.

Column 37,
Lines 27 and 52, delete "is" and insert therefor -- are --.

Column 38,
Lines 10, 32 and 66, delete "is" and insert therefor -- are --.

Column 39,
Line 32, delete "is" and insert therefor -- are --.

Signed and Sealed this

Twentieth Day of July, 2004

JON W. DUDAS
*Acting Director of the United States Patent and Trademark Office*